US010599764B2

(12) United States Patent
Campbell et al.

(10) Patent No.: US 10,599,764 B2
(45) Date of Patent: Mar. 24, 2020

(54) OPERATIONS ON IMAGES ASSOCIATED WITH CELLS IN SPREADSHEETS

(71) Applicant: Microsoft Technology Licensing, LLC, Redmond, WA (US)

(72) Inventors: John Campbell, Woodinville, WA (US); Carlos Augusto Otero, Seattle, WA (US); Christian Canton, Bellevue, WA (US); John David Sully, Redmond, WA (US); Samuel C. Radakovitz, Bellevue, WA (US); Matthew Hart Fichtner, Seattle, WA (US); Benjamin Edward Rampson, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/199,836

(22) Filed: Jun. 30, 2016

(65) Prior Publication Data

US 2017/0124041 A1    May 4, 2017

Related U.S. Application Data

(60) Provisional application No. 62/249,884, filed on Nov. 2, 2015, provisional application No. 62/249,869, filed
(Continued)

(51) Int. Cl.
*G06F 17/00* (2019.01)
*G06F 17/24* (2006.01)
(Continued)

(52) U.S. Cl.
CPC .......... *G06F 17/246* (2013.01); *G06F 3/0482* (2013.01); *G06F 3/04817* (2013.01);
(Continued)

(58) Field of Classification Search
CPC .................................................. G06F 17/246
See application file for complete search history.

(56) References Cited

U.S. PATENT DOCUMENTS

| 4,815,029 A | 3/1989 | Barker et al. |
| 5,093,907 A | 3/1992 | Hwong et al. |

(Continued)

FOREIGN PATENT DOCUMENTS

| CN | 101796829 | 8/2010 |
| CN | 102842323 | 12/2012 |

(Continued)

OTHER PUBLICATIONS

Bakke et al., "A spreadsheet-based user interface for managing plural relationships in structured data", Human Factors in Computing Systems, May 7, 2011, 10 pages.
(Continued)

*Primary Examiner* — Andrew T McIntosh

(57) ABSTRACT

Systems and methods for associated one or more images with one or more cells of a spreadsheet are described. As described, a plurality of images may be associated with a single cell or a single image may be associated with a range of cells. Additionally, an image and additional data may be associated with the same cell. Upon associating an image with a cell, various parameters of the image may be displayed for viewing and/or customization by a user. Additionally, sort and/or filter operations may be performed on the spreadsheet based on the various parameters of associated images and/or operations (e.g., fit and/or resize operations) may be performed on various parameters of associated images. An associated image may move with a cell when the cell is reordered within the cell table, or an associated image may be allowed to float over the grid but may be referenced by a cell.

21 Claims, 19 Drawing Sheets

Related U.S. Application Data on Nov. 2, 2015, provisional application No. 62/357,292, filed on Jun. 30, 2016, provisional application No. 62/357,284, filed on Jun. 30, 2016.

(51) Int. Cl.

| | | |
|---|---|---|
| *G06F 3/0484* | (2013.01) | |
| *G06T 11/60* | (2006.01) | |
| *G06F 3/0482* | (2013.01) | |
| *G06F 3/0488* | (2013.01) | |
| *G06F 3/16* | (2006.01) | |
| *G06F 3/0481* | (2013.01) | |
| *G06T 11/20* | (2006.01) | |
| *G10L 15/26* | (2006.01) | |
| *G06K 9/00* | (2006.01) | |
| *G10L 13/033* | (2013.01) | |
| *G06F 17/21* | (2006.01) | |
| *G06F 17/22* | (2006.01) | |
| *G11B 27/00* | (2006.01) | |
| *G06T 1/00* | (2006.01) | |

(52) U.S. Cl.
CPC ...... *G06F 3/04842* (2013.01); *G06F 3/04845* (2013.01); *G06F 3/04847* (2013.01); *G06F 3/04883* (2013.01); *G06F 3/162* (2013.01); *G06F 3/165* (2013.01); *G06F 17/212* (2013.01); *G06F 17/2288* (2013.01); *G06F 17/245* (2013.01); *G06K 9/00* (2013.01); *G06K 9/00442* (2013.01); *G06K 9/00449* (2013.01); *G06K 9/00463* (2013.01); *G06T 11/206* (2013.01); *G06T 11/60* (2013.01); *G10L 13/033* (2013.01); *G10L 15/26* (2013.01); *G11B 27/00* (2013.01); *G06T 1/0007* (2013.01); *G06T 2200/24* (2013.01)

(56) References Cited

U.S. PATENT DOCUMENTS

| 5,226,118 | A | 7/1993 | Baker et al. |
|---|---|---|---|
| 5,418,898 | A * | 5/1995 | Zand .................. G06F 17/246 715/255 |
| 5,717,939 | A | 2/1998 | Bricklin et al. |
| 5,850,629 | A | 12/1998 | Holm et al. |
| 6,055,549 | A | 4/2000 | Takano |
| 6,088,708 | A | 6/2000 | Burch |
| 6,138,130 | A | 10/2000 | Adler et al. |
| 6,262,736 | B1 | 7/2001 | Nelson |
| 6,282,551 | B1 | 8/2001 | Anderson |
| 6,289,312 | B1 | 9/2001 | Raman |
| 6,289,513 | B1 | 9/2001 | Bentwich |
| 6,377,965 | B1 | 4/2002 | Hachamovitch et al. |
| 6,415,305 | B1 | 7/2002 | Agrawal et al. |
| 6,496,832 | B2 | 12/2002 | Chi et al. |
| 6,640,234 | B1 | 10/2003 | Coffen |
| 6,701,485 | B1 | 3/2004 | Igra et al. |
| 6,779,151 | B2 | 8/2004 | Cahill et al. |
| 6,785,660 | B1 | 8/2004 | Fedor et al. |
| 6,988,241 | B1 | 1/2006 | Guttman et al. |
| 7,047,484 | B1 | 5/2006 | Becker et al. |
| 7,350,141 | B2 | 3/2008 | Kotler et al. |
| 7,350,142 | B2 | 3/2008 | Kraft |
| 7,424,668 | B2 | 9/2008 | DeSpain |
| 7,594,172 | B2 | 9/2009 | Fish |
| 7,639,873 | B2 | 12/2009 | Qian |
| 7,647,551 | B2 | 1/2010 | Vigesaa et al. |
| 7,761,782 | B1 | 7/2010 | Warren et al. |
| 7,779,000 | B2 | 8/2010 | Vigesaa et al. |
| 7,783,966 | B2 | 8/2010 | Mitsui |
| 7,849,395 | B2 | 12/2010 | Ellis et al. |
| 7,853,867 | B2 | 12/2010 | Egilsson |
| 7,885,811 | B2 | 2/2011 | Zimmerman et al. |
| 7,962,436 | B2 | 6/2011 | Brelage et al. |
| 8,018,518 | B2 | 9/2011 | Nobels |
| 8,091,024 | B2 | 1/2012 | Graeber |
| 8,121,842 | B2 | 2/2012 | Shih et al. |
| 8,161,372 | B2 | 4/2012 | Ellis et al. |
| 8,166,385 | B2 | 4/2012 | Garcia-Molina et al. |
| 8,185,445 | B1 | 5/2012 | Perlmuter |
| 8,416,984 | B2 | 4/2013 | Liang et al. |
| 8,510,266 | B1 | 8/2013 | Ho |
| 8,515,241 | B2 | 8/2013 | Forsyth et al. |
| 8,516,389 | B2 | 8/2013 | Fujimoto et al. |
| 8,527,866 | B2 | 9/2013 | Sutter et al. |
| 8,640,022 | B2 | 1/2014 | Waldman et al. |
| 8,645,832 | B2 | 2/2014 | Pea et al. |
| 8,862,646 | B1 | 10/2014 | Murayama et al. |
| 9,020,999 | B2 | 4/2015 | Rai Bhatti |
| 9,042,653 | B2 | 5/2015 | Lin et al. |
| 9,066,145 | B2 | 6/2015 | Kilar et al. |
| 9,098,484 | B2 | 8/2015 | Viry |
| 9,124,856 | B2 | 9/2015 | Deshpande et al. |
| 9,129,234 | B2 | 9/2015 | Campbell et al. |
| 9,141,938 | B2 | 9/2015 | Goldberg |
| 9,256,589 | B2 | 2/2016 | Chitilian et al. |
| 9,270,728 | B2 | 2/2016 | Duncker et al. |
| 9,280,533 | B2 | 3/2016 | Rochelle et al. |
| 9,317,963 | B2 | 4/2016 | Ruble et al. |
| 9,449,031 | B2 | 9/2016 | Barrus et al. |
| 10,366,157 | B2 | 7/2019 | Campbell et al. |
| 2003/0233616 | A1 | 12/2003 | Gilinsky |
| 2004/0143788 | A1 | 7/2004 | Aureglia |
| 2004/0246376 | A1 | 12/2004 | Sekiguchi et al. |
| 2005/0246642 | A1 | 11/2005 | Valderas et al. |
| 2006/0012568 | A1 | 1/2006 | Halcrow et al. |
| 2006/0071942 | A1 | 4/2006 | Ubillos |
| 2006/0072848 | A1 | 4/2006 | Razzano |
| 2006/0106618 | A1 | 5/2006 | Racovolis et al. |
| 2006/0143651 | A1 | 6/2006 | Kim |
| 2006/0179012 | A1 | 8/2006 | Jacobs |
| 2006/0212469 | A1 | 9/2006 | Babanov et al. |
| 2006/0214776 | A1 | 9/2006 | Oflaherty et al. |
| 2006/0218483 | A1 | 9/2006 | Weitzman et al. |
| 2007/0047780 | A1 | 3/2007 | Hull et al. |
| 2007/0124319 | A1 | 5/2007 | Platt et al. |
| 2007/0136652 | A1 | 6/2007 | Ellis et al. |
| 2007/0282976 | A1 | 12/2007 | Matsuda |
| 2008/0016436 | A1 | 1/2008 | Liu et al. |
| 2008/0147501 | A1 | 6/2008 | Gilliam |
| 2008/0156171 | A1 | 7/2008 | Guldi |
| 2008/0215959 | A1 | 9/2008 | Lection |
| 2008/0235625 | A1 | 9/2008 | Holm et al. |
| 2008/0276159 | A1 | 11/2008 | Narayanaswami et al. |
| 2008/0294903 | A1 | 11/2008 | Miyazaki |
| 2008/0301546 | A1 * | 12/2008 | Moore .................. G06T 11/60 715/243 |
| 2009/0006466 | A1 | 1/2009 | Ellis |
| 2009/0006939 | A1 | 1/2009 | DeSpain et al. |
| 2009/0044090 | A1 | 2/2009 | Gur et al. |
| 2009/0164880 | A1 | 6/2009 | Lection |
| 2009/0228837 | A1 | 9/2009 | Suzuki |
| 2009/0319542 | A1 | 12/2009 | Le Brazidec |
| 2010/0058163 | A1 * | 3/2010 | Garcia-Molina ... G06F 17/2258 715/220 |
| 2010/0083079 | A1 | 4/2010 | Rapp et al. |
| 2010/0095198 | A1 | 4/2010 | Bultrowicz |
| 2010/0128855 | A1 | 5/2010 | Demo et al. |
| 2010/0211575 | A1 | 8/2010 | Collins et al. |
| 2010/0214299 | A1 | 8/2010 | Robertson et al. |
| 2011/0029561 | A1 | 2/2011 | Slaney |
| 2011/0035652 | A1 | 2/2011 | McGarry |
| 2011/0040720 | A1 * | 2/2011 | Zangwill .................. G06N 5/04 706/52 |
| 2011/0066933 | A1 | 3/2011 | Ludwig |
| 2011/0078560 | A1 | 3/2011 | Weeldreyer |
| 2011/0181617 | A1 | 7/2011 | Tsuda |
| 2011/0209048 | A1 | 8/2011 | Scott |
| 2011/0252299 | A1 | 10/2011 | Lloyd et al. |
| 2012/0013539 | A1 | 1/2012 | Hogan et al. |
| 2012/0013540 | A1 | 1/2012 | Hogan |

(56) References Cited

U.S. PATENT DOCUMENTS

| | | | |
|---|---|---|---|
| 2012/0039546 A1* | 2/2012 | Berger | G06F 17/30274 |
| | | | 382/305 |
| 2012/0066574 A1 | 3/2012 | Lee et al. | |
| 2012/0069028 A1 | 3/2012 | Bouguerra | |
| 2012/0189203 A1 | 7/2012 | Lin et al. | |
| 2012/0313957 A1 | 12/2012 | Fisher et al. | |
| 2012/0324421 A1 | 12/2012 | Boeckenhauer et al. | |
| 2013/0035075 A1 | 2/2013 | Seetharaman et al. | |
| 2013/0036346 A1 | 2/2013 | Cicerone | |
| 2013/0055058 A1 | 2/2013 | Leong et al. | |
| 2013/0067305 A1 | 3/2013 | Golan | |
| 2013/0110884 A1 | 5/2013 | Eakins | |
| 2013/0117651 A1 | 5/2013 | Waldman et al. | |
| 2013/0198666 A1 | 8/2013 | Matas et al. | |
| 2014/0047312 A1 | 2/2014 | Ruble et al. | |
| 2014/0104279 A1 | 4/2014 | Albrecht | |
| 2014/0119673 A1 | 5/2014 | Rathnavelu | |
| 2014/0122516 A1 | 5/2014 | Brewer et al. | |
| 2014/0164890 A1 | 6/2014 | Fox et al. | |
| 2014/0244668 A1 | 8/2014 | Barrus et al. | |
| 2014/0337733 A1 | 11/2014 | Rodriguez | |
| 2014/0337753 A1* | 11/2014 | McKellar | G06F 9/4443 |
| | | | 715/747 |
| 2014/0359417 A1 | 12/2014 | Bar-On | |
| 2014/0372850 A1 | 12/2014 | Campbell et al. | |
| 2014/0372857 A1 | 12/2014 | Otero et al. | |
| 2014/0372858 A1 | 12/2014 | Campbell et al. | |
| 2014/0372952 A1 | 12/2014 | Otero et al. | |
| 2015/0050010 A1 | 2/2015 | Lakhani et al. | |
| 2015/0100880 A1 | 4/2015 | Matas et al. | |
| 2015/0142418 A1 | 5/2015 | Byron | |
| 2015/0161250 A1 | 6/2015 | Elbaz | |
| 2015/0199118 A1* | 7/2015 | Berger | G06F 3/04845 |
| | | | 715/838 |
| 2015/0378979 A1 | 12/2015 | Hirzel et al. | |
| 2016/0026376 A1 | 1/2016 | Schultink | |
| 2016/0026613 A1 | 1/2016 | Vogel | |
| 2016/0070733 A1 | 3/2016 | Gould | |
| 2016/0093079 A1 | 3/2016 | Grams | |
| 2017/0124040 A1 | 5/2017 | Campbell et al. | |
| 2017/0124042 A1 | 5/2017 | Campbell et al. | |
| 2017/0124049 A1 | 5/2017 | Campbell et al. | |
| 2017/0124050 A1 | 5/2017 | Campbell et al. | |
| 2017/0124057 A1 | 5/2017 | Canton et al. | |
| 2017/0124740 A1 | 5/2017 | Campbell et al. | |
| 2017/0337040 A1 | 11/2017 | Salvi et al. | |
| 2019/0258709 A1 | 8/2019 | Campbell et al. | |

FOREIGN PATENT DOCUMENTS

| | | |
|---|---|---|
| EP | 1645972 | 4/2006 |
| KR | 20140146350 | 12/2014 |
| WO | 157744 | 8/2001 |
| WO | 2005050973 | 6/2005 |
| WO | 2007118228 | 10/2007 |

OTHER PUBLICATIONS

PCT International Search Report in PCT/US2016/059852, dated Jan. 25, 2017, 15 pages.

PCT Invitation to Pay Additional Fees in PCT/US2016/060180, dated Feb. 9, 2017, 8 pages.

U.S. Appl. No. 15/199,846, Office Action dated Jun. 26, 2017, 20 pages.

Brian C. Whitmer, "Brigham Young University Improving Spreadsheets for Complex Problems", All These and Dissertations, Paper 1713, Apr. 8, 2008, http://scholarsarchive.byu.edu/cgi/viewcontent.cgl?artcile=2712&tcontext=etd, pp. 1-7, 15-26.

"How to insert picture into excel cell", Published on: May 30, 2013 Available at: http://trumpexcel.com/2013/05/insert-picture-into-excel-cell/.

"Anchor image to a cell", Published on: Jan. 14, 2012 Available at: http://apache-poi.1045710.n5.nabble.com/Anchor-image-to-a-cell-td4302682.html.

Klement, Scott, "Load Images into Your HSSF Spreadsheets", Published on: Dec. 11, 2008 Available at: http://www.easy400.net/hssfcgi/documentation/20081211.html.

"How to resize pictures to fit cells in Excel?", Published on: Jan. 15, 2013 Available at: http://www.extendoffice.com/documents/excel/1060-excel-resize-picture-to-fit-cell.html.

Levoy, Marc, "Spreadsheets for Images", In Proceedings of 21st International ACM Conference on Computer Graphics and Interactive Techniques, Jul. 24, 1994, 8 pages.

"How to insert multiple pictures and resize them at once in Excel?", Published on: Oct. 9, 2014 Available at: http://www.extendoffice.com/documents/excel/1156-excel-insert-multiple-pictures.html.

"Combine the contents of multiple cells", Retrieved on: Jan. 25, 2016 Available at: https://support.office.com/en-us/article/Combine-the-contents-of-multiple-cells-3A86C317-6B91-4F1D-8781-203320AEFDCE.

French, Ted, "Concatenate Text Data in Google Spreadsheets", Published on: Jun. 15, 2014 Available at: http://spreadsheets.about.com/od/exceltextfunctions/ss/2014-06-15-google-spreadsheets-concatenate-text-strings.htm#step1.

Javaid, Usman, "Excel 2010: Merge Cells (Concatenation)", Published on: Mar. 25, 2010 Available at: http://www.addictivetips.com/microsoft-office/excel-2010-merge-cells-concatenation/.

"How to Concatenate Cells in Excel", Published on: Jul. 9, 2007 Available at: https://wagda.lib.washington.edu/gishelp/tutorial/concatenate.pdf.

5 Ways to Extract Video Frames and Save to Images, Published on: Apr. 7, 2016, https://www.raymond.cc/blog/extract-video-frames-to-images-using-vlc-media-player/, 12 pages.

An Introduction to Data Validation in Excel, Published on: Mar. 15, 2014, http://trumpexcel.com/2014/03/learn-all-about-data-validation-in-excel/, 4 pages.

Azzarello, Pat, "Group Report: Improving Computer Audio and Music Production Systems User Interfaces", In Proceedings of Tenth Annual Interactive Music Conference, Oct. 13, 2005, 12 pages.

Canton et al., "Compound Data Types", Oct. 2, 2015, 16 pages.

Canton et al., "Condensed Core Design", Jul. 30, 2015, 312 pages.

Canton et al., "Rich Data Types", Jul. 30, 2015, 217 pages.

Chang, et al., "A Spreadsheet Model for Handling Streaming Data", In Proceedings of the 33rd Annual ACM Conference on Human Factors in Computing Systems, Apr. 18, 2015, 4 pages.

Chang, et al., "A spreadsheet model for using web service data", In Proceedings of IEEE Symposium on Visual Languages and Human-Centric Computing, Jul. 28, 2014, 8 pages.

Chang, et al., "A Spreadsheet Tool for Creating Web Applications Using Online Data", In Proceedings of CHI Workshop on End User Development in the Internet of Things Era, vol. 12, Issue 2, Apr. 18, 2015, 6 pages.

Create an Excel Drop Down list with Search Suggestions, Published on: Oct. 19, 2013, http://trumpexcel.com/2013/10/excel-drop-down-list-with-search-suggestions/, 11 pages.

Dalgleish, Debra, "Excel List of All MP3 Files in a Directory", Published on: May 5, 2009, http://blog.contextures.com/archives/2009/05/05/excel-list-of-all-mp3-files-in-a-directory/, 3 pages.

Deliver content using spreadsheet templates, Published on: Sep. 21, 2015, https://support.google.com/youtube/answer/6066171?hl=en, 3 pages.

Eastonz, Trevor, "Embed a Video in Microsoft Excel—It's a breeze", Published on: Jul. 18, 2013.

Embedded Metadata in WAVE Files, Retrieved on: Apr. 25, 2016, http://www.avpreserve.com/wp-content/uploads/2014/04/EmbeddedMetadata.pdf, 10 pages.

French, Ted, "Convert Measurements in Excel", Published on: Mar. 18, 2011, http://spreadsheets.about.com/od/excel2010functions/ss/2011-03-18-Convert-Measurements-In-Excel-2010.htm, 4 pages.

Hacid, et al., "A Database Approach for Modeling and Querying Video Data", In Proceedings of the15th International Conference on Data Engineering, vol. 12, No. 5, Sep. 2000, 22 pages.

(56) References Cited

OTHER PUBLICATIONS

Harvey, Greg, "How to Edit and Format Inserted Pictures in Excel 2013", Published on: Jan. 2013, http://www.dummies.com/how-to/content/how-to-edit-and-format-inserted-pictures-in-excel-.html, 3 pages.
How to: Use Text-to-Speech in Excel 2002, Retrieved on: Jul. 7, 2016, https://support.microsoft.com/en-us/kb/288986, 4 pages.
Høydahl, Jan, "Cominvent AS—Enterprise Search Consultants", Published on: Jan. 25, 2012, http://www.cominvent.com/2012/01/25/super-flexible-autocomplete-with-solr/, 4 pages.
In-Cell Dropdown and Validation in Spreadsheets, Published on: Aug. 26, 2010, http://googledrive.blogspot.in/2010/08/in-cell-dropdown-and-validation-in.html, 27 pages.
Insert Images into Google Spreadsheet Cells, Published on: Apr. 15, 2016, https://www.bettercloud.com/monitor/the-academy/insert-images-into-google-spreadsheet-cells/, 3 pages.
Keng, Kuek Ser Kuang, "Edit video using spreadsheet—GS Video", Published on: Dec. 24, 2015, https://www.youtube.com/watch?v=-bwFdhJg1MA, 2 pages.
Lim, Jon, "Google Spreadsheets: COUNT with Multiple Values in Cells", Published on: Apr. 7, 2014, http://jonlim.ca/2014/04/google-spreadsheets-count-multiple-values-cells/, 5 pages.
Machlis, Sharon, "How to create an automatically updating Google spreadsheet", Published on: Dec. 8, 2013, http://www.computerworld.com/article/2469616/business-intelligence/business-intelligence-79661-how-to-create-an-automatically-updating-spreadsheet.html, 2 pages.
Powerful transcription that's ready for work, Published on: Dec. 17, 2015, http://australia.nuance.com/dragon/transcription-solutions/index.htm, 5 pages.
Puls, Ken, "Using VLOOKUP to return a picture", Published on: Feb. 7, 2014, http://www.cga-pdnet.org/pdf/vlookupforpictures.pdf, 7 pages.
Reynolds, Janine, "New in Smartsheet: See Images in Your Sheets", Published on: Jan. 15, 2016, https://www.smartsheet.com/blog/new-in-smartsheet-embed-images, 16 pages.
Rivendell—Scenario: breakaway from normal progaming to playout audiobook chapters, for a length of time and rejoing normal programming. And how to load and playout the audiobook discs/tracks in order, published on: Apr. 3, 2016, https://thebrettblog.wordpress.com/, 31 pages.
Sartain, JD., "How to create relational databases in Excel 2013", Published on: Aug. 7, 2014, http://www.pcworld.com/article/2462281/how-to-create-relational-databases-in-excel-2013.html, 11 pages.
Singh, et al., "Transforming Spreadsheet Data Types using Examples", In Proceedings of Annual Symposium on Principles of Programming Languages, Oct. 26, 2015, 13 pages.
Trevi, Javier, "Showing all available MySQL data types when creating a new table with MySQL for Excel", Published on: Jul. 23, 2014, https://blogs.oracle.com/MySqlOnWindows/entry/showing_all_available_mysql_data, 8 pages.
Trying to open audio files from spreadsheet using windows API, Retrieved on: Apr. 25, 2016, http://stackoverflow.com/questions/34459965/trying-to-open-audio-files-from-spreadsheet-using-windows-api, 3 pages.
Use Formula AutoComplete, Retrieved on: Oct. 26, 2015, https://support.office.com/en-us/article/Use-Formula-AutoComplete-6d13daa5-e003-4431-abab-9edef51fae6b, 4 pages.
Vaziri, et al., "Stream Processing with a Spreadsheet", In Proceedings of European Conference on Object-Oriented Programming, Jul. 28, 2014, 25 pages.
Virostek, Paul, "The Power User's Guide to Soundminer Metadata", Published on: Jun. 24, 2014, http://www.creativefieldrecording.com/2014/06/24/the-power-users-guide-to-soundminer-metadata/, 12 pages.
Wyatt, Allen, "Conditionally Playing an Audio File", Published on: Oct. 10, 2011 http://excel.tips.net/T006559_Conditionally_Playing_an_Audio_File.html, 2 pages.
Wyatt, Allen, "Displaying Images based on a Result", Published on: Apr. 10, 2011, http://excel.tips.net/T003128_Displaying_Images_based_on_a_Result.html, 10 pages.
Wyatt, Allen, "Displaying Images based on a Result", Published on: Oct. 28, 2011, http://excel.tips.net/T003128_Displaying_Images_based_on_a_Result.html, 9 pages.
Wyatt, Allen, "Hiding Graphics when Filtering", Retrieved on: Jul. 8, 2016, http://excel.tips.net/T003866_Hiding_Graphics_when_Filtering.html, 2 pages.
Wyatt, Allen, "Inserting a Sound File in Your Worksheet", Published on: Apr. 10, 2011, http://excel.tips.net/T002864_Inserting_a_Sound_File_in_Your Worksheet.html, 2 pages.
Wyatt, Allen, "Inserting a Voice Annotation in Your Worksheet", Published on: Oct. 19, 2011, http://excel.tips.net/T002870_Inserting_a_Voice_Annotation_in_Your_Worksheet.html, 2 pages.
Wyatt, Allen, "Sorting with Graphics", Published on: Oct. 28, 2011, http://excel.tips.net/T002954_Sorting_with_Graphics.html, 2 pages.
"PhotoSpread Quick User's Manual", WebArchive online PDF, Jul. 8, 2011, 7 pages, http://web.archive.org/web/20110708161116/http://infolab.stanford.edu/~paepcke/shared-documents/photospread/photospreadmanual010309.pdf.
Chang, et al., "Creating interactive web data applications with spreadsheets", In Proceedings of the 27th annual ACM symposium on User interface software and technology, Oct. 5, 2014, pp. 87-96.
Kandel et al., "PhotoSpread: A Spreadsheet for Managing Photos", The 26th Annual Chi Conference on Human Factors in Computing Systems, Conference Proceedings, Apr. 5, 2005, in Florence, Italy, 10 pages.
"Customizing Points", May 25, 2014, https://developers.google.com/chart/interactive/docs/points, 9 pages.
"How to add image as background into chart in Excel?" Jul. 2, 2014, https://www.extendoffice.com/documents/excel/1435-excel-add-image-background-to-chart.html, 10 pages.
"Use a Picture in a Chart", Apr. 22, 2016, https://support.office.com/en-ie/article/use-a-picture-in-a-chart-c53cf530-160b-4a3e-9b38-efe6cb858d10, 3 pages.
"Sort data in a range or table" WebArchive Microsoft Office Support Webpage, Sep. 24, 2015, 8 pages, http://web.archive.org/web/20150924210037/https://support.office.com/en-us/article/sort-data-in-a-range-or-table-ce451a63-478d-42ba-adba-b6ebd1b4fa24.
"Spreadsheet plugin for Lightroom", Apr. 22, 2016, http://diswantsho.com/spreadsheet-plugin-for-lightroom/, 6 pages.
Agarwal, Amit., "How to Insert Images in your Google Spreadsheet Cells", Mar. 9, 2016, http://www.labnol.org/internet/images-in-google-spreadsheet/18167/, 2 pages.
Hasler et al., "A High Performance Interactive Image Spreadsheet" Computers in Physics, American Institute of Physics, Woodbury, NY, vol. 8, No. 3, May 1994, 18 pages.
Lafond, Gael., "eAtlas Image Metadata Editor Application—Tag photos with metadata", Mar. 20, 2016, http://eatlas.org.au/tools/image-metadata-editor, 15 pages.
PCT International Search Report in PCT/US2016/059876, dated Jan. 25, 2017, 15 pages.
PCT International Search Report in PCT/US2016/060177, dated Jan. 25, 2017, 16 pages.
PCT International Search Report in PCT/US2016/060192, dated Jan. 25, 2017, 15 pages.
Piersol, "Object-oriented spreadsheets: the analytic spreadsheet package", 1st Annual Conference on Object-Oriented Programming Systems, Languages, and Applications, Portland, Oregon, Jun. 1986, 6 pages.
Waldock, Jeff., "Applying mathematics to digital image processing using a spreadsheet", In Journal of MSOR Connections, vol. 10, Issue 3, Nov. 2010, pp. 11-16.
Wood, Mark., "Learn how to use Apple's spreadsheet program, Numbers", May 4, 2015, http://www.macworld.co.uk/how-to/mac-software/how-to-use-apple-numbers-speadsheet-3609483/, 9 pages.
PCT International Search Report in PCT/US2016/060025, dated Apr. 7, 2017, 23 pages.
Lee, "Tips and Tricks: Images in cells", Nov. 30, 2010, https://drive.googleblog.com/2010/11/tips-and-tricks-images-in-cells.html, 6 pages.
"Indexed color—Wikipedia", Apr. 21, 2015, 6 pages, https://en.wikipedia.org/w/index.php?title=indexed_color&oldid=657815639.

(56) References Cited

OTHER PUBLICATIONS

"Spreadsheets (change book settings in bulk)", Sep. 23, 2014, https://support.google.com/books/partner/answer/3058975?hl=en, 11 pages.
U.S. Appl. No. 15/199,846, Office Action dated Oct. 26, 2017, 22 pages.
U.S. Appl. No. 15/199,820, Amendment and Response filed Dec. 20, 2017, 16 pages.
U.S. Appl. No. 15/199,846, Amendment and Response filed Dec. 26, 2017, 15 pages.
U.S. Appl. No. 15/199,846, Advisory Action dated Jan. 5, 2018, 3 pages.
U.S. Appl. No. 15/199,846, Amendment and Response filed Jan. 26, 2018, 15 pages.
U.S. Appl. No. 15/199,820, Office Action dated Sep. 20, 2017, 16 pages.
U.S. Appl. No. 15/199,846, Amendment and Response filed Sep. 26, 2017, 14 pages.
PCT Second Written Opinion in PCT/US2016/060192, dated Sep. 11, 2017, 8 pages.
Sundarsean et al., Management and Analysis of Cmaer Trap Data: Alternative Approaches, Bulletin of the Ecological Socierty of America, vol. 92, No. 2, 201--04-01, pp. 188-195.
PCT Second Written Opinion in PCT/US2016/060177, dated Sep. 14, 2017, 9 pages.
PCT International Search Report and Written Opinion in PCT/US2016/060180, dated Jul. 12, 2017, 22 pages.
Han et al., "Situational data integration with data services and nested table", Service Oriented Computing and Applications, vol. 7, No. 2, Apr. 27, 2012, pp. 129-150.
PCT International Preliminary Report on Patentability in PCT/US2016/060177, dated Jan. 5, 2018, 10 pages.
PCT International Preliminary Report on Patentability in PCT/US2016/060192, dated Jan. 5, 2018, 9 pages.
"Non Final Office Action Issued in U.S. Appl. No. 15/339,101", dated Sep. 10, 2018, 26 Pages.
"Non Final Office Action Issued in U.S. Appl. No. 15/340,886", dated Oct. 2, 2018, 17 Pages
"Final Office Action Issued in U.S. Appl. No. 15/340,187", dated Jan. 2, 2019, 52 pages.
"Non-Final Office Action Issued in U.S. Appl. No. 15/340,201", dated Jan. 2, 2019, 14 pages.
"Final Office Action Issued in U.S. Appl. No. 15/340,886", dated May 3, 2019, 21 Pages.
"Advisory Action Issued in U.S. Appl. No. 15/340,187", dated Mar. 26, 2019, 5 Pages.
"Non-Final Office Action Issued in U.S. Appl. No. 15/340,187", dated May 1, 2019, 60 Pages.
U.S. Appl. No. 15/340,187, Office Action dated May 18, 2018, 32 pages.
U.S. Appl. No. 15/199,820, Office Action dated Apr. 26, 2018, 16 pages.
U.S. Appl. No. 15/199,846, Notice of Allowance dated Mar. 20, 2018, 10 pages.
PCT International Preliminary Report on Patentability in PCT/US2016/059852, dated May 8, 2018, 11 pages.
PCT International Preliminary Report on Patentability in PCT/US2016/060025, dated May 8, 2018, 16 pages.
PCT International Preliminary Report on Patentability in PCT/US2016/060180, dated May 8, 2018, 15 pages.
PCT International Preliminary Report on Patentability in PCT/US2016/059876, dated May 8, 2018, 8 pages.
"Notice of Allowance Issued in U.S. Appl. No. 15/340,187", dated Sep. 18, 2019, 9 Pages.
"Non Final Office Action Issued in U.S. Appl. No. 15/340,886", dated Sep. 26, 2019, 21 Pages.
"Final Office Action Issued in U.S. Appl. No. 15/340,201", dated Jul. 11, 2019, 15 Pages.
"Non-Final Office Action Issued in U.S. Appl. No. 15/199,820", dated Jul. 17, 2019, 24 pages.

* cited by examiner

OPERATIONS ON IMAGES ASSOCIATED WITH CELLS IN SPREADSHEETS

RELATED APPLICATIONS

This application claims priority to U.S. Provisional Application No. 62/249,884, entitled "Compound Data Types," filed on Nov. 2, 2015; U.S. Provisional Application No. 62/249,869, entitled "Rich Data Types," filed Nov. 2, 2015; U.S. Provisional Application No. 62/357,292, entitled "Compound Data Objects," filed on Jun. 30, 2016; and U.S. Provisional Application No. 62/357,284, entitled "Rich Data Types," filed on Jun. 30, 2016; the entire disclosures of which are hereby incorporated in their entireties herein by reference.

BACKGROUND

Today, images may be added to spreadsheets, but the images "float" over the grid. In this case, the images are not associated with any particular cell, nor are the images related to data within the spreadsheet. Accordingly, when operations are performed on the spreadsheet, e.g., sort, filter, cell resizing, etc., the images do not behave as a user expects. That is, rather than moving with cells when the cells are reordered within the spreadsheet, the images may become randomly scattered within the spreadsheet. In this case, e.g., after a filter or sort operation, images may obscure various cells and data and may need to be manually repositioned within the spreadsheet. Not only so, but images cannot be fit to a cell size or resized when a cell is resized. Moreover, current spreadsheets are ill-suited for providing new features in a touch- or mobile-first world where images play a much bigger role.

It is with respect to these and other general considerations that embodiments have been described. Also, although relatively specific problems have been discussed, it should be understood that the embodiments should not be limited to solving the specific problems identified in the background.

SUMMARY

The disclosure generally relates to a system and methods for associated one or more images with one or more cells of a spreadsheet. In aspects, when an image file is associated with one or more cells, the image file may be treated as a new type of value in the one or more cells. In some aspects, a plurality of images may be associated with a single cell or a single image may be associated with a range of cells. In further aspects, both an image and additional data may be associated with a single cell. In some cases, an associated image may be provided as background for the cell and the additional data may be displayed over the associated image; in other cases, the associated image may be displayed adjacent the additional data, wrapped by the additional data, etc.

Upon associating an image with a cell, various parameters associated with the image may be identified and surfaced for viewing and/or manipulation by a user. Moreover, spreadsheet operations (e.g., sort and/or filter operations) may be performed based on the parameters of associated images. Additionally, based on user preference, fit and/or resize operations may be performed on an associated image. In aspects, an associated image may move with a cell when the cell is reordered within the cell table. Alternatively, an associated image may be allowed to float over the grid but, unlike prior systems, the associated image may be referenced by a function in a cell and operations may be performed on the associated image.

In aspects, a system is provided that includes a processing unit and a memory storing computer executable instructions that, when executed by the processing unit, cause the system to perform a method. The method includes receiving a selection of at least one cell of a spreadsheet, wherein the at least one cell is associated with at least one image, and retrieving one or more parameters of the at least one image. The method further includes exposing one or more operations and performing an operation on at least one parameter of the at least one image.

In further aspects, a method for performing operations on a range of cells within a spreadsheet is provided. The method includes receiving a selection of a range of cells within a spreadsheet, wherein the range of cells is associated with a plurality of images, and retrieving one or more parameters for each of the plurality of images. The method further includes exposing one or more operations based at least in part on the one or more parameters and performing an operation on the range of cells.

In still further aspects, a computer-readable storage medium is provided that stores computer executable instructions. The computer executable instructions, when executed by at least one processing unit, cause a computing device to receive a selection of at least one cell of a spreadsheet, wherein the at least one cell is associated with a plurality of images, and to provide a user interface (UI) element for displaying the plurality of images. The computer executable instructions further causing the computing device to expose one or more operations for manipulating the plurality of images and to perform an operation on the plurality of images.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 5A illustrates an interface showing one or more images associated with one or more cells of a spreadsheet, according to an example embodiment.

FIG. 8B illustrates an interface showing one or more images and additional data associated with one or more cells of a spreadsheet, according to a second example embodiment.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As described above, the disclosure generally relates to systems and methods for associated one or more images with one or more cells of a spreadsheet. Images may be associated with cells by embedding an image in a cell, by anchoring an image to a cell and/or by referencing an image in a function associate with the cell. In some aspects, a plurality of images may be associated with a single cell or a single image may be associated with a plurality of cells. In further aspects, both an image and additional data may be associated with a single cell. For instance, the associated image and the additional data may be referenced in a compound data type associated with the cell. In some cases, an associated image may be provided as background for the cell and the additional data may be displayed over (i.e., on top of) the associated image; in other cases, the associated image may be displayed adjacent the additional data (e.g., above, below, to the right or left), wrapped by the additional data, etc.

Upon associating an image with a cell, various parameters associated with the image may be identified and surfaced to a user. Additionally, various operations may be exposed for manipulating the various parameters of an associated image. Further, spreadsheet operations (e.g., sort and/or filter operations) may be performed based on the identified parameters of associated images. Fit and/or resize operations may be performed on an associated image, either automatically or by user selection. For example, an associated image may be fit to a cell size such that the image is bounded by the cell border; additionally or alternatively, an associated image may be resized with a cell when the cell is resized. In further aspects, an associated image may move with a cell when the cell is reordered within the cell table. Alternatively, an associated image may be allowed to float over the grid; however, unlike prior systems, the associated image may still be referenced by a function in a cell and operations may be performed on the associated image. It is with respect to these and other general considerations that embodiments have been made.

Figure 1:
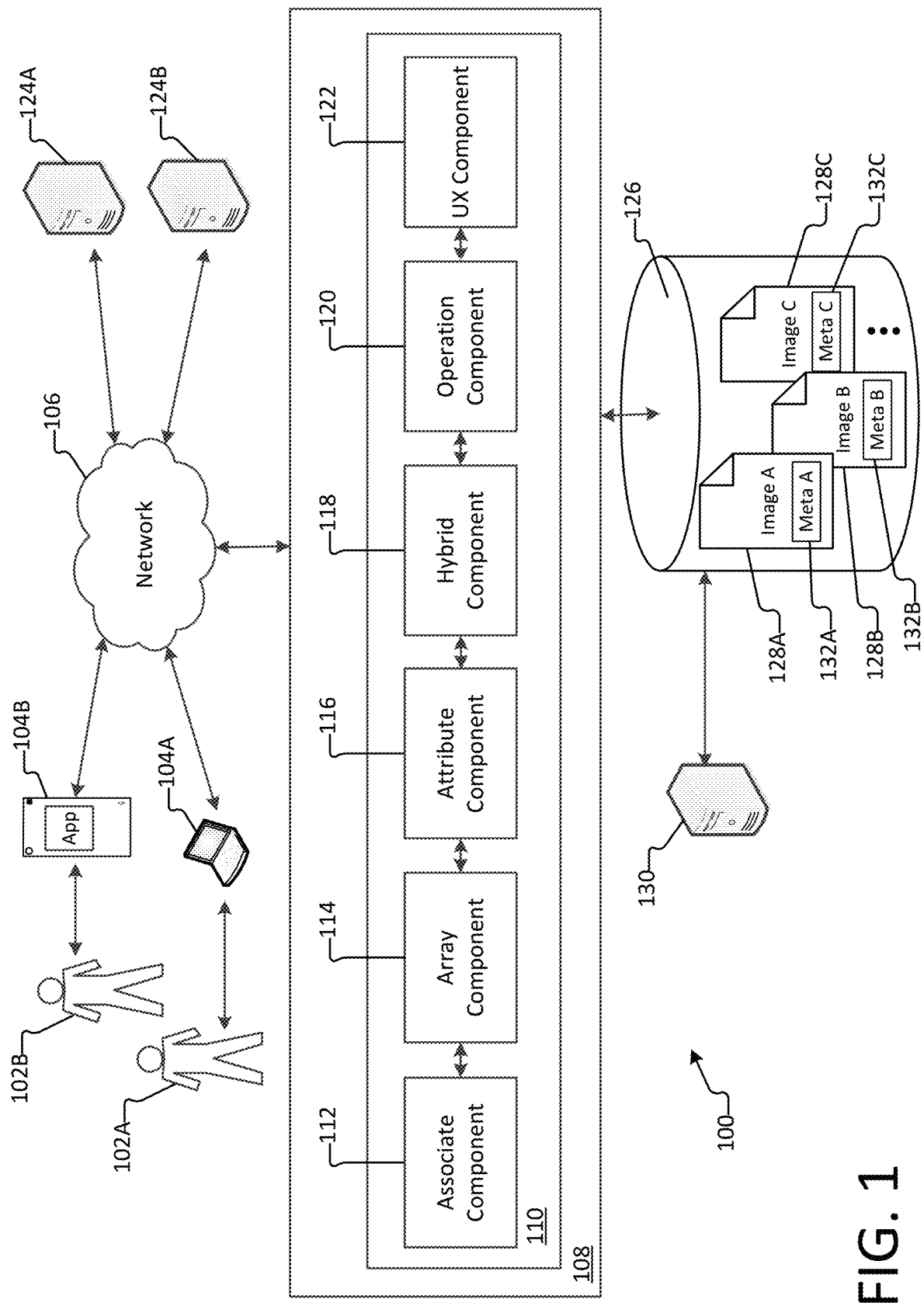
FIG. 1 illustrates a system for associating one or more images with one or more cells in a spreadsheet, according to an example embodiment.

FIG. 1 illustrates a system for associating one or more images with one or more cells in a spreadsheet, according to an example embodiment.

System 100 may include one or more client computing devices 104 (e.g., client computing devices 104A and 104B) that may execute a client version of a spreadsheet application capable of associating images with cells in a spreadsheet. In some examples, the client spreadsheet application may execute locally on a client computing device 104. In other examples, a client spreadsheet application (e.g., a mobile app on a thin client computing device 104) may operate in communication (e.g., via network 106) with a corresponding server version of spreadsheet application 110 executing on one or more server computing devices, e.g., server computing device 108. In still other aspects, rather than executing a client version of a spreadsheet application, the one or more client computing devices 104 may remotely access, e.g., via a browser over network 106, the spreadsheet application 110 implemented on the server computing device 108 or multiple server computing devices (e.g., in a distributed computing environment such as a cloud computing environment).

As illustrated by FIG. 1, a server version of spreadsheet application 110 is implemented by server computing device 108. As should be appreciated, the server version of spreadsheet application 110 may also be implemented in a distributed environment (e.g., cloud computing environment) across a plurality of server computing devices (not shown). Moreover, as should be appreciated, either a client or a server version of the spreadsheet application 110 may be capable of associating one or more images with cells of a spreadsheet. While a server version of the spreadsheet application 110 and associated components 112-122 are shown and described, this should not be understood as limiting. Rather, a client version of spreadsheet application 110 may similarly implement components 112-122 on a client computing device 104.

In a basic configuration, the one or more client computing devices 104 are personal or handheld computers having both input elements and output elements operated by one or more users 102 (e.g., user 102A and user 102B). For example, the one or more client computing devices 104 may include one or more of: a mobile telephone; a smart phone; a tablet; a phablet; a smart watch; a wearable computer; a personal computer; a desktop computer; a laptop computer; a gaming device/computer (e.g., Xbox®); a television; and the like. This list is exemplary only and should not be considered as limiting. Any suitable client computing device for executing a client spreadsheet application and/or remotely accessing spreadsheet application 110 may be utilized.

In some aspects, network 106 is a computer network such as an enterprise intranet and/or the Internet. In this regard, the network 106 may include a Local Area Network (LAN), a Wide Area Network (WAN), the Internet, wireless and wired transmission mediums. In further aspects, server computing device 108 may communicate with some components of the system via a local network (e.g., an enterprise intranet), whereas server computing device 108 may communicate with other components of the system via a wide area network (e.g., the Internet). In addition, the aspects and functionalities described herein may operate over distributed systems (e.g., cloud computing systems), where application functionality, memory, data storage and retrieval, and various processing functions may be operated remotely from each other over a distributed computing network, such as the Internet or an intranet.

As described above, the spreadsheet application 110 may be implemented on a server computing device 108. In a basic configuration, server computing device 108 may include at least a processing unit and a system memory for executing computer-readable instructions. In some aspects, server computing device 108 may comprise one or more server computing devices 108 in a distributed environment (e.g., cloud computing environment). Server computing device 108 may provide data, including image data and image attributes, associated with cells of a spreadsheet to and from the one or more client computing devices 104 and/or one or more other server computing devices (e.g., server computing devices 124A and/or 124B) via network 106.

As used herein, each image may be stored as an image file in a file format identified by a file extension, such as .jpeg, .png, .gif, .tiff, etc., and may be retrieved based on a file locator, which may be a uniform resource locator (URL) identifying a file path to a local storage location or a remote storage location. In aspects, one or more image files (e.g., image files 128A, 128B, and 128C) may be stored in a storage location (e.g., storage 126) accessible to spreadsheet application 110. An image may be defined by image data (e.g., raw pixel data, an array of pixel values, or other data for rendering the image) and image attributes (e.g., opacity, color palette, resolution, aspect ratio, image dimensions, author, creation date and/or time, file name, tags, file size, GPS location information, etc.). As should be appreciated, each image attribute may be defined by an attribute-value pair. That is, an image attribute (e.g., image height) may be paired with a value for that attribute (e.g., 1.04 inches) for a particular image.

In at least some examples, image attributes may be organized in a data structure (e.g., a table, array, etc.) based on attribute-value pairs (e.g., for attribute "height" a value may be "1.04 inches"; for attribute "width" a value may be "1.39 inches"; for attribute "rotation" a value may be "0°"; and the like). For instance, a first column of attributes may be paired with a second column of values corresponding to the attributes, where each row of the dual-column array corresponds to an attribute-value pair. As should be appreciated, attribute-value pairs associated with image attributes may be organized and stored in any suitable data structure. In further examples, image attributes (e.g., organized by attribute-value pairs) may be appended as metadata to an image file comprising image data. For instance, as illustrated, metadata 132A may be appended to image file 128A, metadata 132B may be appended to image file 128B, and metadata 132C may be appended to image file 128C. Alternatively, the image attributes may be stored in a separate location or database from the image files and may be referenced by or otherwise indexed to the image files (not shown).

As may be appreciated, image data may include an array of pixel values that encodes, for example, RGB, RGBA or YUV color space information, which is data in a machine-readable format for rendering the combination of colors, luminance, chrominance and/or opacity for each portion or tile of an image. In some aspects, the number of pixels may be represented dimensionally, e.g., "3552×2000" pixels. In contrast, image attributes may describe the image file, image data and/or the rendered image in a human-readable format. For example, some image attributes may describe the image data by specifying a quantity (e.g., opacity value, luminance or brightness value, etc.) or a quality (e.g., high-red color palette, high opacity, low luminance, etc.) of the image data. Other image attributes may describe image specifications, such as image size, image aspect ratio, image resolution, etc. Still further image attributes may provide details regarding the image file, such as creation date/time, author, etc.

In at least some examples, one or more image files may be stored in different storage locations within a distributed environment (e.g., cloud computing environment) accessible to spreadsheet application 110 over a network, e.g., network 106. As described herein, the location of an image file in storage may be represented by a file locator, which may be a URL to local storage (e.g., C:\Pictures\elephant1.jpeg) or a URL to remote storage accessible over a network (e.g., http://www.pics.com/tree.png). Additionally, an image file may be referenced by name (e.g., "elephant1.jpeg") to locate it within the local workbook file. With respect to remote storage, a URL may provide a file path to a storage location hosted by a third party (e.g., Dropbox®, etc.), in a public or private cloud storage location (e.g., OneDrive®, iCloud®, Amazon® Cloud Drive, etc.), in an enterprise storage location (e.g., SharePoint®, etc.), in a public storage location accessed over the Internet, and the like. In other aspects, the image file may be referenced within a function of the spreadsheet by a globally unique name rather than by a URL. A globally unique name can be any string, e.g., "elephant," or "elephant1" or "elephant.jpg," that uniquely identifies the image file within the spreadsheet workbook. For instance, to call the image file from another cell in the spreadsheet, the function "=elephant" may be used in the cell. However, if the same name is used on different sheets of a spreadsheet to return different values, the name may be qualified by the sheet on which it appears in order to create a unique name, e.g., "Sheet1!OctoberEarnings" and "Sheet2! OctoberEarnings."

As illustrated in FIG. 1, the spreadsheet application 110 may include various components for associating one or more images with one or more cells of a spreadsheet, including an associate component 112, an array component, 114, an attribute component 116, a hybrid component 118, an operation component 120, a UX component 122, and the like. In aspects, each component may communicate and pass data between the other components. The various components may be implemented using hardware, software, or a combination of hardware and software. Moreover, the various components may be executed on a single server computing device (e.g., server computing device 108), on multiple server computing devices (e.g., server computing devices 124A, 124B and/or 130), or locally on a client computing device (e.g., client computing device 102A or 102B).

As described above, the spreadsheet application 110 may be configured to associate one or more images with one or more cells of a spreadsheet. As should be appreciated, while examples and descriptions provided below may generally reference associating a single image with a single cell, the methods and systems described may similarly be applied for multiple images over multiple cells. In cases where application of the methods or systems may differ with respect to associating multiple images with a single cell and/or associating a single image with multiple cells, additional disclosure will be provided.

In aspects, associate component 112 may associate one or more images with one or more cells of a spreadsheet. In some aspects, associate component 112 may associate an image by directly embedding the image into a cell. For instance, the image file, along with associated image data and image attributes, may be embedded in the cell as a value and the image may be drawn in the same pixelated space within the spreadsheet as the cell. In aspects, rather than a function, a name of the embedded image may be provided in a formula bar depicting the contents of the cell. In further aspects, an embedded image may be drawn as background (or fill) for the cell, allowing additional data to be entered into the cell; alternatively, the cell may contain only the embedded image. An image embedded within a cell may further be "fit" to a cell size, i.e., bounded by the cell border, and may move with the cell when the cell is relocated within the spreadsheet (e.g., in response to a sort or filter operation). In this regard, an embedded image may behave in substantially the same or similar way as alphanumeric data (e.g., textual data, numeric data, formulas, and the like) and, thus, may behave predictably within the spreadsheet in response to operations performed on the spreadsheet.

In further aspects, associate component 112 may associate an image by anchoring the image as a value within a cell of the spreadsheet. For example, the image may be anchored within a cell based on a function in the formula bar of the cell that identifies the file locator (e.g., a globally unique name or URL) for the image file (e.g., =IMAGE("http://www.mattspics.com/weather/rainyday.png")). Alternatively, an image file may be associated with a cell without using a globally unique name or URL by selecting an "Insert" operation in the toolbar and using a dialog filtered to image types to find and insert the image file. In that case, the formula for the cell may specify an array containing two images as: "=IMAGE(4two.png, red.png)". Alternatively, the images may be identified without a formula, for instance, the names of the images may simply be listed without the "=IMAGE" operator, e.g., "4two.png, red.png" or "<Image>4two.png, red.png".

In some cases, an image anchored within a cell may be fit to a cell size, i.e., bounded by the cell border. In other cases, associate component 112 may anchor a portion of the image (e.g., a top left corner of the image) to a portion of a cell (e.g., top left corner of the cell). In this case, the image may not be fit to the cell size, but may be displayed smaller than the cell (e.g., inside the cell border with at least some white space) or displayed larger than the cell (e.g., extending beyond the cell border onto other cells). Whether fit to a cell or not, when an image is anchored to a cell, the image may move with the cell when the cell is relocated within the spreadsheet (e.g., in response to a sort or filter operation). In this way, an anchored image may behave in substantially the same or similar way as alphanumeric data (e.g., textual data, numeric data, formulas, and the like) and, thus, may behave predictably within the spreadsheet in response to operations performed on the spreadsheet.

In still other aspects, the associate component 112 may associate an image with the spreadsheet but may allow the image to float over the grid. When an image is allowed to float over the grid (e.g., over one or more cells of the spreadsheet), the image may be displayed with the spreadsheet but may or may not move with cells as they are relocated within the spreadsheet (e.g., in response to sort or filter operations). In some examples, although the image may be allowed to float, the image may be referenced (e.g., by globally unique name) in one or more functions within the spreadsheet such that one or more operations may be performed on the image and/or one or more operations may be performed on the spreadsheet based on attributes of the image. In this case, when cells are relocated the image may or may not move with the cells, but operations may be performed on the image and/or the spreadsheet based on the function referencing the image.

Similarly, whether or not the image is anchored, floating or even displayed within the spreadsheet, the image may be referenced (e.g., by globally unique name) in one or more functions such that one or more operations may be performed on the image and/or one or more operations may be performed on the spreadsheet based on attributes of the image. For instance, the image may not be displayed in the spreadsheet unless and until a condition associated with the function that references the image is satisfied (e.g., display referenced image as background when revenue number hits "X").

In still other examples, e.g., for back compatibility with legacy spreadsheet applications, an image may be displayed within a spreadsheet and may be allowed to float over one or more cells but may not be referenced within the spreadsheet. For example, an embedded or anchored image may be "popped out" and allowed to float such that a legacy spreadsheet application is able to handle the spreadsheet (i.e., open, display and operate on data within the spreadsheet). In this case, the image may be treated as a legacy object outside of the cell table (referred to herein as "legacy float"), the image may or may not move with relocated cells within the spreadsheet, and operations may not be performed on the image. In this regard, an image associated with a spreadsheet as a legacy float image may behave unpredictably when operations are performed on the spreadsheet. To avoid this unpredictable behavior, legacy versions of the spreadsheet application may not display the image, while current versions may either respect or disregard any changes to the legacy floating image made by the legacy version.

In an example, consider a realtor visiting a residential property. The realtor may wish to take a photo of the property on his or her mobile device and may further wish to associate the photo with a spreadsheet. For instance, the realtor may wish to associate the photo with a row of a spreadsheet including cells with data describing the property (e.g., price, address, number of bedrooms, number of bathrooms, etc.). In some aspects, the realtor may open a mobile version of the spreadsheet application (e.g., spreadsheet application 110), may select a cell within the spreadsheet, and may select the photo to insert into the cell. In aspects, the mobile version of the spreadsheet application may automatically associate the image with the selected cell. In other aspects, the realtor may select a cell within the spreadsheet and activate a "take photo" icon for taking a photo and inserting the photo into the cell.

In some aspects, a user may "change a state" of an image with respect to a cell at any time. That is, a user may make a selection to "pop out" an image from display within a cell to display outside (or over) a cell or cells (e.g., in cases where the image is difficult to view within the cell). Alternatively, a user may make a selection to convert an image from a floating image to an image that is anchored or embedded within a cell. In this case, the floating image may be selected (e.g., by right click) and may be anchored or embedded to a selected cell. A user may also make a selection to convert an image from embedded or anchored in a cell to floating. In this case, the image may no longer be represented in the formula bar of the cell and may be displayed as dissociated from the cell (e.g., in another location within the spreadsheet). As should be appreciated, UI controls (e.g., provided in an image toolbar, provided upon right click of a mouse, etc.) may allow the state of an image to be changed at any time.

Array component 114 may associate a plurality of images with one or more cells of a spreadsheet. Similar to associate component 112, array component 114 may associate a plurality of images with a cell by directly embedding each image into the cell (e.g., in a collage arrangement). Alternatively, array component 114 may associate a plurality of images with a cell by anchoring the plurality of images to the cell based on a function identifying the file locators (e.g., globally unique names or URLs) for each of the plurality of images. In other aspects, array component 114 may associate a plurality of images with a cell by based on a function identifying a folder in which the plurality of images is located. In still other aspects, array component 114 may associate the plurality of images with the spreadsheet by referencing a globally unique name for each of the plurality of images, but may allow the plurality of images to float over one or more cells. In at least some aspects, array component 114 may associate the plurality of images with one another (e.g., in an array) in addition to associating the plurality of images with a cell and/or a spreadsheet.

In an example, consider a realtor visiting a residential property. The realtor may wish to take a number of photos of the property on his or her mobile device and may further wish to associate the photos with a spreadsheet. For instance, the realtor may wish to associate the photos with a row of a spreadsheet that includes cells with data describing the property (e.g., price, address, number of bedrooms, number of bathrooms, etc.). In some aspects, the realtor may open a mobile version of the spreadsheet application (e.g., spreadsheet application 110), may select a cell within the spreadsheet, and may select the photos to insert into the cell. In aspects, the mobile version of the spreadsheet application may automatically associate the plurality of photos in an array and insert the array in the selected cell. In other aspects, the realtor may select a cell within the spreadsheet and activate a "take photo" icon for taking a plurality of photos and inserting the photos in the cell. In still other aspects, the realtor may download the plurality of images and save the images in a folder on a desktop computing device. The realtor may then associate the folder with a selected cell in a spreadsheet. In this case, the spreadsheet application may automatically create an array from the folder of images (e.g., with an associated UI element) and may associate the array with the selected cell. As should be appreciated, any number of options for taking photos and associating the photos with one or more cells of a spreadsheet are conceivable and may be implemented in accordance with the methods and systems disclosed herein.

In aspects, attribute component 116 may retrieve parameters for each image associated with a spreadsheet. As detailed above, parameters retrieved for an image may include image data (e.g., an array of pixel values) and/or associated image attributes (e.g., image descriptors). In some aspects, attribute component 116 may retrieve parameters from a compound data type, as will be described further below. For instance, attribute component 116 may retrieve image data, image attributes, additional data, and/or formatting attributes from a compound data type. In aspects, attribute component 116 may retrieve parameters for an image and/or additional data at any time, for example, in response to a selection to associate the image with a spreadsheet, in response to a selection to manipulate the image, in response to a selection to perform a spreadsheet operation, and the like.

Hybrid component 118 may associate different types of data with a single cell. In some cases, hybrid component 118 may provide the image as background for the cell and may display the additional data over the image. Alternatively, the image may be displayed in one portion of the cell and the additional data may be displayed in another portion of the cell (e.g., above, below, to either side, or wrapping the image). As detailed above, image data may include an array of pixel values for rendering an image. Additional data may include any type of data other than image data. For example, additional data may include textual data, numeric data, formulas, and the like (hereinafter referred to as "alphanumeric data"). Alternatively, additional data may include charts, videos, audio files, etc.

In a first aspect, hybrid component 118 may associate the image with the additional data in a structured format, such as an array, record, or table, which is referred to herein as a "compound data type." In aspects, when an image is provided as background (or fill) for a cell, use of a compound data type may not be necessary to associate different types of data with the cell; however, when the image and the additional data are displayed in different areas of the same cell, use of a compound data type may provide advantages. For example, when the image and the additional data are associated with a cell using a compound data type, layout properties for the image and the additional data may also be organized in the structured format. In some cases, compound data types may even be nested within each other.

The structure of a compound data type may be leveraged in complex calculations, thereby providing a model for referencing and using different aspects of the data. For example, each component of a compound data type may be represented by a formula or a function. Such individual representation of components facilitates the creation of structures in a single cell where calculations can reference back to other components of the compound data type. For instance, any of the fields of the compound data type can be dereferenced and acted on. That is, a formula may be constructed to get the value of a special field ("=GetAttribute(<field name>)"), an operator may be used to get the value (e.g., the dot "." operator, "=A1.aspectratio"), or a unique name may be used to get the value (e.g., if cell A1 has a unique name, "OctoberEarningsRecording.aspectratio"). In this way, each field is available to the "calc chain" (e.g., a calculation engine for the spreadsheet) and/or formulas within a spreadsheet.

A compound data type may include data types such as: image data, image attributes, alphanumeric data, audio data, video data, charts, and the like. In aspects, a compound data type may be an object referencing an image file (including image data and metadata), as well as additional data (e.g., any other type of data), in a structured format. In some aspects, additional data may be described in terms of attribute-value pairs, arrays, vectors, etc. In this case, hybrid component 118 may leverage the natural attribute-value descriptors for organizing the additional data within the structured format of a compound data type. As should be appreciated, in some aspects, an image itself may be represented by a compound data type. For example, as described above, an image file may comprise image data (e.g., an array of pixel values) and associated metadata (e.g., including image attributes). The image attributes may be described in terms of attribute-value pairs and/or may be organized in any suitable structured format, e.g., an array of values, a record with an array of fields, a table, an array of vectors, etc. For example, for attribute "height" a value may be "1.04 inches"; for attribute "width" a value may be "1.39 inches"; etc. Thus, an image may be represented by a compound data type in which the image data and the image attributes are stored in (or referenced by) a structured format. In aspects, an image represented by a compound data type may be associated with a cell.

Further, an image and additional data may be represented by a compound data type. For example, the image, including image data (e.g., an array of pixel values) and image attributes (e.g., attribute-value pairs corresponding to image attributes), may be associated with additional data (e.g., data describing the content of the image) in a single compound data type. For example, consider an image of a car. In this case, an image file for the image may include image data (e.g., an array of pixel values) for rendering the image of the car and associated metadata including image attributes (e.g., attribute-value pairs) defining aspects of the image, such as image resolution, image aspect ratio, image color palette, etc. In some examples, additional data may describe or be related to the content of the image, such as a year, make, model, color, price, condition, etc., of the car depicted in the image. In this case, the additional data may also be represented by attribute-value pairs (e.g., content attributes). For instance, an attribute "year" may have a value "2015"; an attribute "make" may have a value "BMW"; an attribute "model" may have a value "Z4"; etc. In other examples, the additional data may not necessarily be represented by attribute-value pairs. For instance, the additional data may be a single numeric value that is the output of a formula (e.g., total revenue value, sum of a range of cell values, average value over a range of cell values, etc.). In still other examples, additional data may be represented as an array or vector of data, as well as any other primitive type (strings, numbers, etc.).

Further still, the additional data may be described by formatting attributes that may be represented by attribute-value pairs. For example, where the additional data is alphanumeric data, an attribute "font size" may have a value "11 pt."; an attribute "font color" may have a value "red"; an attribute "font" may have a value "Calibri"; etc. Furthermore, layout attributes may define a relative arrangement and/or dynamic display of image data, image attributes and additional data. For instance, layout attributes may define how to display data (e.g., image displayed above, below, to the left or the right of additional data, etc.) and/or which data should be dynamically displayed as a cell is resized (e.g., image icon displayed in small cell, with more data progressively displayed as the cell is enlarged). Layout attributes may also be defined in terms of attribute-value pairs, e.g., an attribute "alignment" may have value "top" or "left"; an attribute "progressive display" may have numerical values in order of priority such as 1-10, and the like.

Based on the above examples, hybrid component 118 may create a compound data type including the image data (e.g., an array of pixel values), image attributes (e.g., attribute-value pairs describing the image), additional data (e.g., represented as attribute-value pairs, arrays, vectors, etc., corresponding to content and/or formatting of the additional data) and/or layout attributes (e.g., attribute-value pairs describing relative alignment or progressive display of image and additional data) in a structured format. In some aspects, rather than the compound data type including actual data representing the image data, image attributes, additional data (including content and/or formatting attributes), and/or layout attributes, the compound data type may include an array of fields with references or pointers to the actual data, which may be stored as a record in any suitable database or otherwise. As should be appreciated, different types of additional data (e.g., chart data, video data, audio data, etc.) may be described by different sets of attribute-value pairs, or other data not represented by attribute-value pairs (e.g. an array of pixel data for instance), but may also be represented within the structured format of a compound data type.

In aspects, when a compound data type is associated with a cell, all or some portion of the data represented by the compound data type may be displayed within the cell. For example, an image (e.g., of a car) may be displayed in the same cell with additional data describing the content of the image (e.g., data depicting the year, make, model, price, etc., of the car). In some aspects, while image attributes may be included in the compound data type, the image attributes may not be displayed in the cell with the image and additional data. Rather, in aspects, image attributes may be retrieved from the compound data type and displayed upon a user selection (e.g., right click on the image). As will be described further below, UX component 122 may provide UI controls for determining how to display the image, image attributes and/or the additional data within a cell (e.g., image displayed adjacent text on left or right, image displayed above or below text, text wrapping image, text displayed over image, certain image attributes displayed, and the like) and UI controls for manipulating one or more of the image data, image attributes and/or additional data within the cell.

In a second aspect, hybrid component 118 may associate one or more images and additional data with a cell without creating a compound data type. For example, hybrid component 118 may associate one or more images as "fill" (or "background") in a cell and may allow other types of data, such as alphanumeric data, to be displayed over the one or more images in the cell. In some cases, the additional data may merely be the output of a formula (e.g., total revenue number) displayed over an image. Hybrid component 118 may also associate an image as fill for a range of cells. For instance, a single image may fill a 4×8 range of cells (e.g., four rows by eight columns of cells), or any other range of cells. The range of cells may correspond to or be compatible with an image aspect ratio for the image, but any range of cells is possible (e.g., by adjusting the image aspect ratio, displaying only a portion of the image across the range of cells, and the like). In aspects, the image may be bound to a top left and a bottom right corner of the range of cells. When columns and/or rows of cells are inserted or deleted within the range of cells, altering the range, the image may be redrawn across the altered range of cells accordingly (e.g., based on settings for a fixed or adjustable image aspect ratio, etc.). When an image is associated as fill for a cell or a range of cells, operations for manipulating image attributes (e.g., resolution, opacity, translucency, aspect ratio, etc.) may be provided in the same or a different user interface (UI) element (e.g., ribbon, toolbar, menu, dropdown, etc.) from operations for manipulating the additional data, such as operations for manipulating alphanumeric attributes (e.g., font type, font size, font color, font alignment, etc.) or attributes of other types of data (e.g., videos, audio files, charts, etc.).

In further aspects, hybrid component 118 may allow for adjusting a contrast between the image and the additional data within a cell or a range of cells. For example, when additional data is alphanumeric data, generally accepted contrast ratios may optimize visibility of the alphanumeric data with respect to a background image. In aspects, hybrid component 118 may use an algorithm to target the generally accepted contrast ratios by manipulating image attributes and/or alphanumeric attributes. For example, for a darker image, contrast may be increased by altering the alphanumeric formatting attributes to a lighter font color or by altering the image attributes to increase brightness (or luminance). Alternatively, e.g., for a lighter image, contrast may be increased by altering the alphanumeric formatting attributes to a darker font color or by outlining the font in black. For an image with a red color palette, a red font color for alphanumeric data may be automatically adjusted to increase contrast, e.g., to a black font color or by outlining the red font color in black. As should be appreciated, any number of adjustments may be made to increase the contrast between the image and additional data of any type. In some cases, hybrid component 118 may automatically manipulate the image attributes and/or attributes of other data types to target accepted contrast ratios. In other cases, a user may manually manipulate contrast based on a user preference.

In some aspects, hybrid component 118 may allow for adjusting an opacity and/or translucency of an associated image to improve visibility of additional data within a cell or a range of cells. For instance, where an image is provided as background for a cell, an opacity of the image may be decreased (or a translucency may be increased) to improve visibility of the additional data (e.g., alphanumeric data) vis-à-vis the image. When opacity is decreased (or translucency is increased), the image becomes more transparent, allowing alphanumeric data to appear more crisp and visible to the human eye. In other aspects, hybrid component 118 may allow a color palette of an image to be faded such that additional data appears more visible with respect to the image. In some cases, hybrid component 118 may automatically manipulate the image attributes to adjust color fading, opacity and/or translucency. In other cases, a user may manually manipulate color fading, opacity and/or translucency based on a user preference.

Operation component 120 may perform operations on images associated with cells of a spreadsheet or may perform operations on a spreadsheet based on attributes of images associated with one or more cells. Operations may be performed on images either automatically or by user selection. For example, with reference to optimizing contrast or adjusting opacity above, operations may automatically be performed on attributes of an image (or attributes of additional data) by operation component 120. Alternatively, custom processing may be performed by a user, including image processing on image data (e.g., on the array of pixels) or on image attributes (e.g., size, aspect ratio, color palette, etc.). Additionally, operations may be performed on the spreadsheet based on parameters of associated images (e.g., sort, filter, conditional formatting operations).

In other examples, a user may select an operation for application to an image (e.g., "fit image to cell") and operation component 120 may automatically calculate and make adjustments to image attributes to perform the operation. For example, in order to fit an image to a cell, image attributes (e.g., height, width, aspect ratio) may automatically be adjusted to fit the size of the image to coincide with the size of a cell. In some examples, an image may be fit to one of a cell height (e.g., "fit vertically") or a cell width (e.g., "fit horizontally"). In some cases, options for fitting an image to a cell may be incorporated into a function for the cell. For example, a value of "0" may be associated with a "fit to cell" option, a value of "1" may be associated with a "fill cell" option, a value of "2" may be associated with a "fit horizontally" option, and a value of "3" may be associated with a "fit vertically" option. In this case, a function for an image that is "fit to cell" may be represented as: fx=IMAGE("http://www.mattspics.com/weather/rainyday.png",0). In other cases, rather than using mapped variables, short sting arguments may be provided for fitting an image to a cell or for filling a cell, e.g., "FillCell." In this case, a function for an image that "fills a cell" may be represented as:fx=IMAGE("http://www.mattspics.com/weather/rainyday.png", FillCell).

Alternatively, operation component 120 may fit the cell to the image such that the cell conforms to an image size. In this case, cell attributes (e.g., cell height, cell width) may be automatically adjusted to coincide with a size of the image. Furthermore, in this case, other cells within a row and/or a column associated with the re-fit cell may also conform to the height and/or width dimensions of the image. As should be appreciated, the above examples are provided for purposes of explanation and should not be understood as limiting.

In additional examples, when a cell is resized, operation component 120 may resize an image associated with the resized cell, either automatically or by a user selection. In aspects, an image may be resized to fill all or any portion of a resized cell. As should be appreciated, a cell may be resized by increasing and/or decreasing a cell height and/or by increasing and/or decreasing a cell width, either automatically or by user selection. When resizing the image, in some cases, an image aspect ratio may be fixed (or locked); and in other cases, an image aspect ratio may be adjustable. For example, when an image aspect ratio is fixed (or locked), the image may be enlarged or contracted such that an area of the image is maximized and white space is minimized within the resized cell. In other examples, when an image aspect ratio is fixed (or locked), the image may be resized to completely fill the resized cell and one or more portions of the resized image may be cropped as necessary. In contrast, when an image aspect ratio is adjustable, the image may be resized such that the image aspect ratio coincides with a cell aspect ratio of the resized cell. In still other examples, an image aspect ratio may be partially adjustable. For example, the image may be allowed to stretch in one dimension (e.g., height) but not in another (e.g., width) when a cell is resized. As should be appreciated, the examples described above are not intended to be exhaustive and an image may be resized by any suitable means, either automatically or by user selection.

In other aspects, image attributes, image data, etc., may be surfaced in a user interface (e.g., by UX component 122) and operation component 120 may perform operations in response to a user selection. For example, operation component 120 may receive a selection to change a state of an image. As used herein, a "state of an image" may refer to a type of association of the image with a cell and/or spreadsheet, e.g., embedded, anchored, floating, arrayed, background, etc. Changing the state of an image may involve converting the image from one state to another, e.g., from anchored to floating, from arrayed to independent, from background to foreground, from background to independent, from embedded to floating, and the like. Operation component 120 may also perform any number operations on any number of image attributes, such as adjusting an image aspect ratio, an image height, an image width, an image resolution, an image opacity, an image brightness, an image color palette, an image rotation, an image fit, and the like.

Additionally or alternatively, operation component 120 may perform any number of operations on image data, e.g., allowing for image processing of raw pixel data. For example, the spreadsheet may surface the raw pixel data for viewing by a user. Additionally, operations may be exposed so that users can manipulate the raw pixel data, e.g., by changing the RGBA values directly in the cell (e.g., via a user interface). In aspects, an array of pixel values or an array of records (e.g. a two-dimensional (2D) array of record types having four values for R, G, B, A) may be surfaced to enable a user to manipulate the image data. The examples described are not intended to be exhaustive and any number of operations may be performed on images associated with cells by any suitable means, either automatically or by user selection.

Operation component 120 may also analyze content of an image and return results as metadata to the image. In some cases, the analysis may be performed in conjunction with a service. For example, an image may be sent to a service for face/object recognition, which may return names of people, animals, places or things within the image. The names may then be appended to the image as metadata and surfaced for display in a user interface.

Operation component 120 may further perform operations on a spreadsheet based on attributes of images associated with a range of cells. For example, operations may include sort, filter, and conditional formatting, as well as data cleaning operations, ETL (which stands for extract, transform, load, e.g. Power Query), and modelling (e.g. Power Pivot). In further examples, in response to receiving an indication to perform a sort or filter operation on a range of cells within a spreadsheet, operation component 120 may relocate cells within the range of cells based on image attributes, e.g., based on color palette, aspect ratio, opacity, brightness of images, author, and the like. Additionally, operations may be performed based on metadata appended to the image, e.g., GEO location, creation data/time, names resulting from face/object recognition, etc. Additionally or alternatively, operation component 120 may perform conditional formatting on the spreadsheet based on image attributes. For example, a heat map may be displayed over cells associated with image such that cells associated with images having an earlier creation date may be turned redder, while cells associated with images having a later creation date may be turned greener. In aspects, the conditional formatting may be customized by a user based on any selected image attribute. As should be appreciated, any number of image attributes may be associated with images and operations may be performed on the spreadsheet based on any image attribute surfaced (or identified) by attribute component 116, or otherwise.

UX component 122 may communicate with operation component 120 to provide one or more user interfaces for exposing available operations for manipulating image data and/or image attributes. As used herein, the term "expose" refers to providing access for user selection and/or input. Selections and/or inputs for operations may be received by gesture, touch, mouse input, keyboard input, etc. For example, UX component 122 may provide UI controls for selecting fit and resize operations for performing on an image, as described above. UI controls may also be provided for changing a state of an image, for example, from anchored to floating or, conversely, from floating to anchored, and the like. Additionally or alternatively, an image may be "popped out" from background to being displayed independently in a cell. Further, UI controls may be provided for manipulating image data and/or image attributes. For instance, UI controls may be provided for manipulating image data, e.g., for performing image processing, etc., and UI controls may be provided for manipulating image attributes, e.g., adjusting height, width, aspect ratio, resolution, color palette, and the like. As should be appreciated, UX component 122 may provide any number of user interfaces (e.g., dropdown menus, popup menus, ribbons, toolbars, etc.) for exposing operations to manipulate image data and/or image attributes.

For cells associated with more complex objects, e.g., an array of images or one or more images with additional data, UX component 122 may provide additional functionality and UI controls. For instance, UI controls may be provided for selecting a layout (or alignment) between an image and additional data within a single cell and/or between multiple images within a single cell, e.g., an image may be displayed above, below, to the right or left of, or wrapped by additional data, etc. Additionally, UX component 122 may display various views of data associated with a compound data type, e.g., display of data may vary based on cell size and/or various user interfaces may be provided. For instance, a minimal amount of data may be displayed in a small cell (e.g., an icon representation of the image), but successively more data may be displayed as the cell is enlarged (e.g., rendered image, image name, additional data about the content of the image, various image attributes, etc.). Additionally or alternatively, UX component 122 may provide a popup window for displaying data associated with the compound data type and/or a formatting tool bar for manipulating data associated with the compound data type. As should be appreciated, UX component 122 may retrieve and surface more or less data associated with a compound data type based on user preference or selection.

Similarly, where multiple images are associated with a single cell, UX component 122 may provide a UI element for displaying an array of images. For example, in a default collapsed view (e.g., collapsed UI element), less than the full array of images may be displayed within the cell. In some aspects, in the collapsed view, UX component 122 may provide a timer to cycle display of each image within the cell. The collapsed UI element may further include a visual indication that multiple images are associated with the cell (e.g., a stack indicator, scroll control, etc.). In response to selection of a UI control (e.g., right click, button, menu, etc.), the collapsed view may expand to reveal the full array of images. Images may be displayed within an expanded UI element in any suitable arrangement (e.g., linear, carousel, grid, etc.) for viewing and interacting with the array of images. For instance, an image may be selected and removed from the array of images associated with a first cell and cut/pasted or drag/dropped into a second cell, or an image may be deleted from the array altogether. In some cases, the whole array may be "spilled" into a range of cells, e.g., with each image spilling into (or being associated with) a different cell of the range of cells. Additionally, a new image may be added to an array images by opening the expanded UI element (e.g., by right click activation) and by inserting the new image into a selected position within the array. As detailed above, any number of different user interfaces may be provided by UX component 122 for viewing and/or manipulating image data, image attributes and/or additional data.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2:
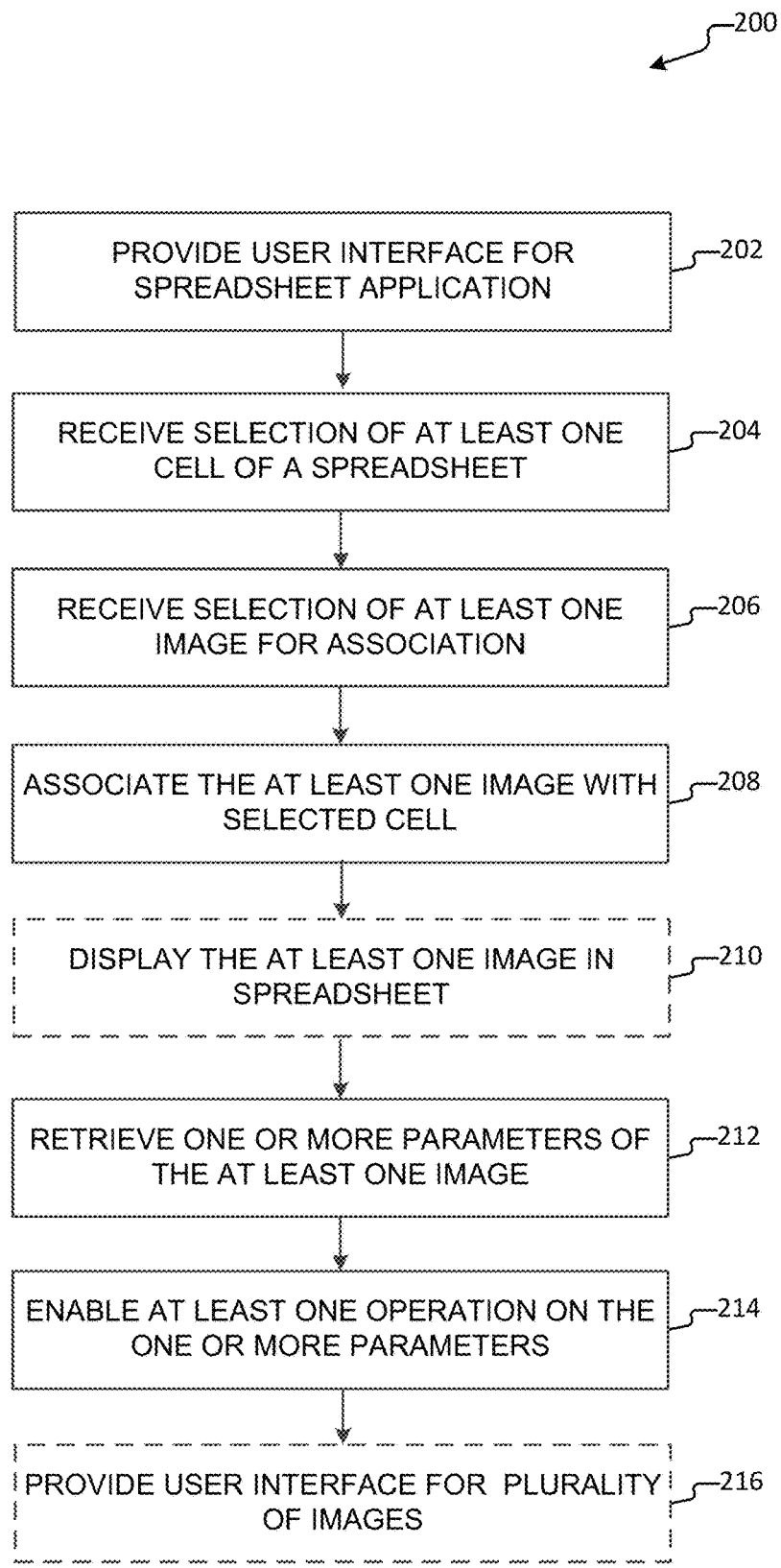
FIG. 2 illustrates a method for associating one or more images with one or more cells of a spreadsheet, according to an example embodiment.

FIG. 2 illustrates a method for associating one or more images with one or more cells of a spreadsheet, according to an example embodiment.

Method 200 begins with provide interface operation 202, where a spreadsheet application may provide (or cause to be provided) a user interface to a user. For example, a UX component (e.g., UX component 122) may facilitate a user experience (UX) by providing the user interface of a spreadsheet application (e.g., spreadsheet application 110) via a display. Selections and/or inputs may be received by the user interface based on gestures, touch, mouse movements, and the like. The user interface may operate in conjunction or communication with one or more other components of the spreadsheet application (e.g., associate component 112, array component 114, attribute component 116, hybrid component 118, and operation component 120) to associate one or more images with one or more cells of the spreadsheet.

At select cell operation 204, at least one cell of a spreadsheet may be selected, either automatically (e.g., based on a function) or by user selection. That is, in some aspects, operations may call (or select) a cell without requiring user input, e.g., operations such as 'data refresh,' 'import from such and such data source,' 'copy paste,' etc. In other aspects, a spreadsheet application (e.g., spreadsheet application 110) may provide the spreadsheet to a user, the spreadsheet including one or more sheets, each sheet having a plurality of rows and columns of cells. Cells may be selected by highlighting or otherwise identifying the cell or range of cells using a gesture, touch, mouse click, keyboard input, and the like. When a single cell is selected, the cell may be identified in a toolbar of the user interface by a cell identifier that specifies a location of the cell within the spreadsheet. For example, a cell identifier of "A1" specifies that the cell is located in column A, row 1 of the spreadsheet, while a cell identifier of "B5" specifies that the cell located in column B, row 5 of the spreadsheet. The cell identifier may further be displayed adjacent to a formula bar (or "fx bar") identifying the contents of the cell in the toolbar of the user interface. When a range of cells is selected, the cell at the top left corner of the range may be displayed by a cell identifier next to the formula bar, with the range of cells being represented by a range identifier including cell identifiers for the cell at the top left corner and the cell at the bottom right corner (e.g., A1:C5).

At select image operation 206, a selection or indication to associate at least one image with the at least one cell may be received, either automatically (e.g., based on a function) or by user selection. That is, in some aspects, operations may call (or select) an audio file for association with a cell without requiring user input, e.g., operations such as 'data refresh,' 'import from such and such data source,' 'copy paste,' etc. In other aspects, a UX component (e.g., UX component 122) may provide a user interface for receiving the selection to associate the at least one image by a gesture, touch, mouse movement, keyboard input, and the like. In some aspects, in response to a selection of a cell (or a range of cells), a menu may be provided for inserting or associating various objects (including images) with the selected cell (or range of cells). Alternatively, a user may indicate an intention to associate an image with a selected cell by manually entering a function that references the image into a formula bar associated with the selected cell. As should be appreciated, the user interface may receive an indication to associate the at least one image with the selected cell by any suitable means.

At associate image operation 208, the at least one image may be associated with the selected cell of the spreadsheet. Associate image operation 208 may be performed by an associate component (e.g., associate component 112) and/or an array component (e.g., array component 114) of a spreadsheet application (e.g., spreadsheet application 110). As used herein, the term "associate" may include any form of linking one or more images to one or more cells within a spreadsheet. In aspects, an image that is "associated" with a cell may be treated as a value within the cell. In aspects, upon a selection to associate the image with the selected cell, a menu may be provided with various options for identifying a file locator for the image. For example, the menu may provide for browsing a local file structure or a remote storage location to identify a URL for the image. Alternatively, a globally unique name for the image may be identified. In further aspects, a menu may provide selections for directly embedding the image into the selected cell, for anchoring the image to the cell, or for referencing the image in a cell.

For example, a user may manually associate (or embed) the at least one image in the selected cell by drag/drop or copy/paste functions. In this case, a name of the image or, rather than a name, an interactive image icon may be displayed in the formula bar. Additionally, a user may anchor the image to the selected cell by entering a file locator for the image within a function, e.g., fx=IMAGE("C:\Pictures\elephant1.jpeg") or fx=IMAGE("http://www.mattspics.com/weather/rainyday.png"). When more than one image is selected for association with a cell, the file locators for each image may be represented within the function associated with the selected cell, e.g., fx=IMAGE("C:\Pictures\elephant1.jpeg","http://www.mattspics.com/weather/rainyday.png"). Alternatively, a user may reference an image (e.g., by globally unique name, etc.) within a formula of a cell. For example, an image may be referenced within a formula of the selected cell for performing an operation (e.g., when revenue hits "X", display referenced image as background). Additionally, one or more image files may be associated with a cell without using a globally unique name or URL by selecting an "Insert" operation in the toolbar and using a dialog filtered to image types to find and insert the image file. In that case, the formula for the cell may specify an array containing two images as: "=IMAGE (4two.png, red.png)". Alternatively, an image may be identified without a formula, for instance, the names of the image may simply be listed without the "=IMAGE" operator, e.g., "4two.png" or "<Image> 4two.png".

At optional display operation 210 (identified by dashed lines), the at least one image may be displayed in the spreadsheet. In some cases, the at least one image may be displayed in the at least one cell. In other cases, the image may not be displayed in the least one cell but may float over the grid. For example, in some aspects, when the at least one image is embedded within the selected cell, the image may be displayed within the cell border and may move with the selected cell when operations are performed on the spreadsheet. Additionally, fit and/or resize operations may be performed on the embedded image, either automatically or by user selection. In other aspects, when the at least one image is anchored to the selected cell, the image may move with the selected cell when operations are performed on the spreadsheet. However, in this case, the at least one image may be allowed to extend beyond the cell border to overlay additional cells of the spreadsheet. In still further aspects, the at least one image may be associated by reference to a selected cell (e.g., by referencing the globally unique name of the image within a function associated with the selected cell) such that operations may be performed on the image and/or operations may be performed on the spreadsheet based on attributes of the image. However, in this case, the image may or may not move with the selected cell when operations are performed on the cell (e.g., sort, filter, etc.) but may float over the grid within the spreadsheet. As should be appreciated, the at least one image may be displayed in a spreadsheet by any suitable means.

At retrieve parameters operation 212, image data and/or image attributes (collectively "parameters") may be retrieved for the at least one image associated with the selected cell. Retrieve parameters operation 212 may be performed by an attribute component (e.g., attribute component 116) of a spreadsheet application (e.g., spreadsheet application 110). In some aspects, image data may be retrieved from an image file and image attributes may be retrieved from metadata appended to the image file. In other aspects, parameters (e.g., image data, image attributes, additional data, formatting attributes, etc.) may be retrieved from a data structure of a compound data type. As should be appreciated, once an image is associated with the selected cell, any number of parameters may be retrieved for the associated image. In at least some aspects, the retrieved parameters may further be surfaced in a user interface or otherwise for manipulation by a user.

At enable operation 214, at least one operation may be enabled on one or more parameters of the at least one image. In aspects, enable operation 214 may be performed by an operation component (e.g., operation component 120) of a spreadsheet application (e.g., spreadsheet application 110). A user interface may provide options for sizing the image and/or for sizing the selected cell. For example, a user may select an option for fitting the image to a size of the cell or for fitting the selected cell to the size of the image. In some cases, by default, the size of a cell (e.g., as defined by a cell height and a cell width) may automatically be fit to the size of an associated image. In response to fitting the size of the selected cell to the image, sizes of additional cells within a row and/or a column associated with the selected cell may also be adjusted. As should be appreciated, other operations for sizing or fitting images to cells (or cells to images) are possible. For instance, the sizes of both a cell and an associated image may be fit such that the image is of appropriate size to be viewed by a user, but not so large so as to prevent other data (e.g., rows and columns) from being displayed within the spreadsheet. Additionally, where multiple images are associated with a cell, or multiple images are associated with different cells within a row and/or a column of the spreadsheet, the cells within the row and/or the column may be fit to the image having the largest height and/or the image having the largest width (which may not necessarily involve the same image where sizes and/or aspect ratios of the images differ). Additionally, options may be provided for resizing an image when a cell is resized, for displaying more or less data of a compound data type when a cell is resized, and the like.

As should be appreciated, at enable operation 214, additional operations may also be enabled. For example, the additional operations may include an option to change a state of an associated image, e.g., from anchored to floating, from background to foreground, from background to independent, from embedded to floating, from arrayed to spilled, from floating to anchored, and the like. Options may also be provided for customizing various image attributes. For instance, options for manipulating image attributes such as height, width, aspect ratio, resolution, and the like, may be provided in a user interface. The above examples are offered for purposes of describing the aspects herein and should not be considered limiting.

Enable operation 214 may further enable spreadsheet operations to be performed based on image attributes and/or content attributes of the at least one image associated with the selected cell. For example, a range of cells may be sorted or filtered based on image attributes of the at least one image (e.g., sorted or filtered based on color palette, brightness, creation date/time, author, etc.) and/or content attributes of the at least one image (e.g., type of car depicted, type of animal depicted, etc.). As should be appreciated, any number of operations performed on the spreadsheet may be performed based on image attributes of the associated image.

At optional provide operation 216 (identified by dashed lines), a user interface may be provided when a plurality of images is associated with the selected cell. Optional provide operation 216 may be performed by a UX component (e.g., UX component 122) of a spreadsheet application (e.g., spreadsheet application 110). This additional functionality may be provided in response to a selection to associate a plurality of images with a selected cell (e.g., in a popup menu) and/or may be provided in a toolbar, ribbon, or otherwise, within the user interface. In some aspects, display options for the plurality of images may be provided in the user interface. For instance, options for displaying the plurality of images in various configurations (e.g., linear, carousel, grid, etc.) may be provided. In some cases, while the plurality of images may be associated with a single cell, display of the plurality of images may overlay additional cells of the spreadsheet. For example, in a linear configuration, the plurality of images may be displayed horizontally (e.g., overlaying portions of a row or rows adjacent to or near the associated cell(s)) or may be displayed vertically (e.g., overlaying portions of a column or columns adjacent to or near the associated cell(s)). In a grid or carousel configuration, the plurality of images may overlay portions of a block of cells (e.g., including both rows and columns) adjacent to or near the associated cell(s). As should be appreciated, other configurations for displaying a plurality of images are possible.

In further aspects, at optional provide operation 216, a user interface (UI) element may be provided by a UX component (e.g., UX component 122) in order to display, interact with and/or manipulate the plurality of images. For example, the UI element may enable a collapsed view and an expanded view of the plurality of images. In the collapsed view (collapsed UI element), less than all of the plurality of images (e.g., one image, two images, or other suitable number) may be displayed within the selected cell at any one time. The collapsed view may further provide a visual indication that multiple images are associated with the selected cell (e.g., a stack indicator, scroll control, etc.). In some aspects, the collapsed UI element may further include a timer such that display of each image of the plurality of images may cycle within the selected cell. To switch to an expanded view, a UI control may be selected (e.g., by right click, button, menu, etc.) and the collapsed view may expand to reveal all of the plurality of images. In the expanded view, the plurality of images may be displayed in any suitable arrangement (e.g., linear, carousel, grid, etc.) and may overlay additional cells of the spreadsheet for viewing and interacting with the plurality of images. A user may interact with the expanded view by translating through the plurality of images to view, add, delete, edit, or otherwise manipulate images within the array. In some aspects, a control may be provided for "playing" the plurality of images as a slideshow. In this regard, further controls may be provided for animating display of the plurality of images, e.g., fade-out, fade-in, perceived three-dimensional pop-out display, etc.

As should be appreciated, operations 202-216 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 3:
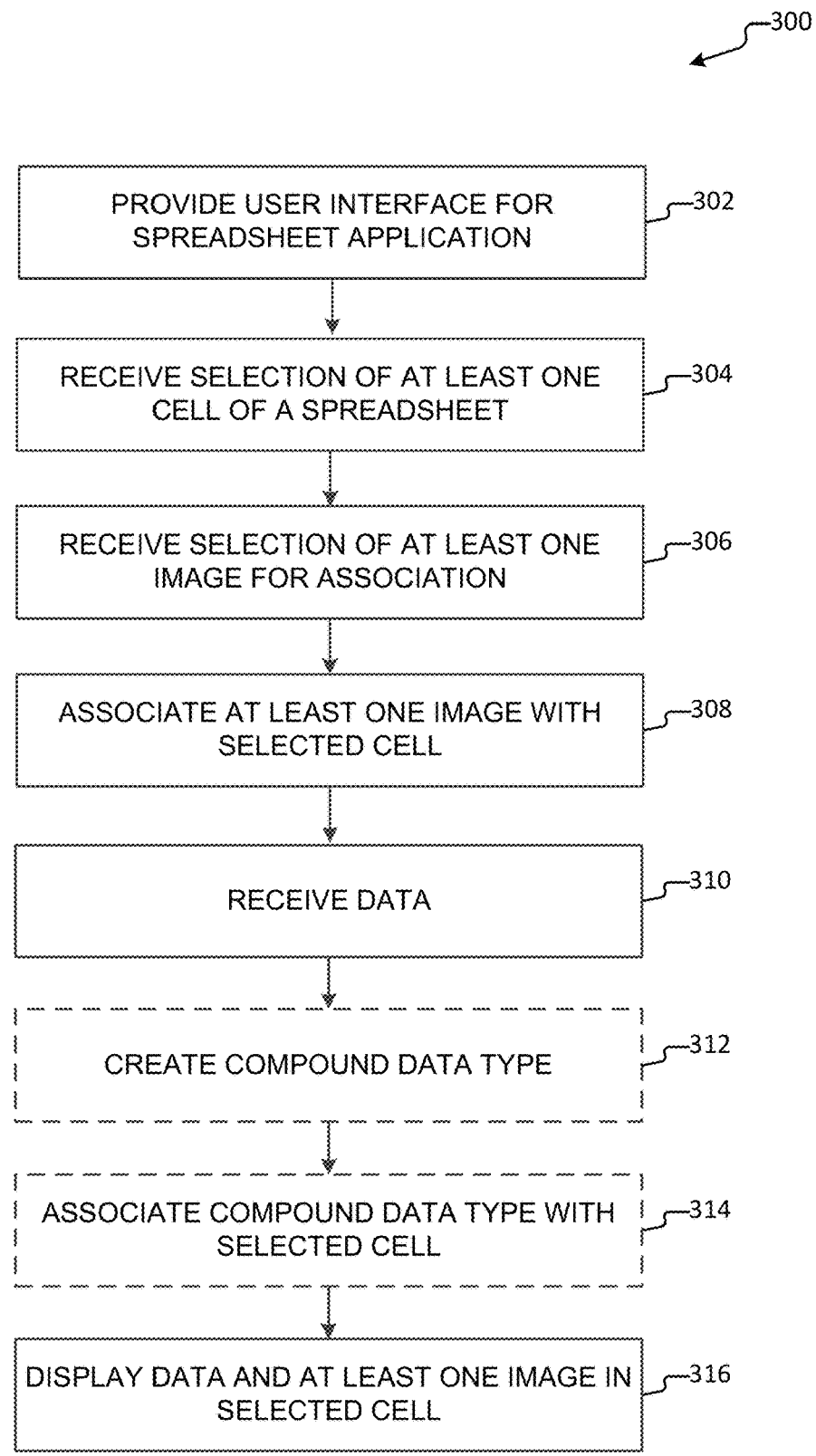
FIG. 3 illustrates a method for associating one or more images and additional data with one or more cells of a spreadsheet, according to an example embodiment.

FIG. 3 illustrates a method for associating one or more images and additional data with one or more cells of a spreadsheet, according to an example embodiment.

Method 300 begins with provide interface operation 302, where a spreadsheet application may provide (or cause to be provided) a user interface to a user. For example, similar to provide interface operation 202, a UX component may facilitate a user experience (UX) by providing a user interface (UI) of a spreadsheet application via a display. Selections and/or inputs may be received by the user interface based on gestures, touch, mouse movements, keyboard input, and the like. Additionally, the user interface may operate in conjunction or communication with one or more other components of the spreadsheet application (e.g., associate component 112, array component 114, attribute component 116, hybrid component 118, and operation component 120) to associate one or more images with one or more cells of the spreadsheet.

At select cell operation 304, similar to select cell operation 204, at least one cell may be selected, either automatically (e.g., based on a function) or by user selection. In some aspects, operations may call (or select) a cell without requiring user input, e.g., operations such as 'data refresh,' 'import from such and such data source', 'copy paste,' etc. In other aspects, a spreadsheet application may provide a spreadsheet to a user, the spreadsheet including one or more sheets, each sheet having a plurality of rows and columns of cells. Cells may be selected by highlighting or otherwise identifying the cell or range of cells using a gesture, touch, mouse click, keyboard input, and the like. For instance, when a single cell is selected, the cell may be identified in a toolbar of the user interface by a cell identifier that specifies a location of the cell within the spreadsheet. The cell identifier may further be displayed adjacent to a formula bar (or "fx bar") identifying the contents of the cell. Alternatively, when a range of cells is selected, the cell at the top left corner of the range may be displayed by a cell identifier next to the formula bar, with the range of cells being represented by a range identifier including the cell identifiers for the cell at the top left corner and the cell at the bottom right corner.

At select image operation 306, similar to select image operation 206, a selection or indication to associate at least one image with the selected cell may be received, either automatically (e.g., based on a function) or by user selection. That is, in some aspects, operations may call (or select) at least one image for association with a cell without requiring user input, e.g., operations such as 'data refresh,' 'import from such and such data source,' 'copy paste,' etc. In other aspects, a UX component may provide a user interface for receiving the selection to associate the image by a gesture, touch, mouse movement, keyboard input, and the like. In some aspects, in response to a selection of a cell, a menu may be provided for inserting or associating various objects (including images) with the selected cell. In further aspects, a user may indicate an intention to associate one or more images with a selected cell by manually entering a function referencing the one or more images into a formula bar associated with the selected cell. In still other aspects, a user may open a mobile version of the spreadsheet application, may select the at least one cell and may take a photo using a camera associated with the mobile device. In this case, the photo may automatically be selected for association with the cell. In other cases, a user may take a photo first and then open the mobile spreadsheet application to associate the photo with a cell of the spreadsheet. As should be appreciated, the user interface may receive an indication to associate one or more images with one or more cells by any suitable means.

At associate image operation 308, similar to associate image operation 208, the at least one image may be associated with the selected cell of the spreadsheet. In aspects, upon a selection to associate an image with the selected cell, a menu may be provided with various options for identifying a file locator for the image. For example, the menu may provide for browsing a local file structure or a remote storage location to identify a URL for the image. Alternatively, a globally unique name for the image may be identified. In further aspects, a menu may provide selections for directly embedding the image into the selected cell, for anchoring the image to the cell, or for referencing the image in a cell. As described above, an image may be associated with a cell by any suitable means.

At receive data operation 310, data may be received in addition to the at least one image selected for association with the cell. For example, a UX component of a spreadsheet application may provide a user interface for receiving the additional data (e.g., by attachment, direct entry into a text box, copy/paste, drag/drop, etc.). Alternatively, the additional data may be input into the formula bar associated with the selected cell, or the additional data may be a numeric value resulting from a function in the formula bar associated with the selected cell. In some cases, the additional data may include alphanumeric data (e.g., textual data, numeric data, formulas, and the like). Alternatively, additional data may include charts, videos, audio files, or any other type of data. As should be appreciated, the additional data may comprise any data in any format.

In some aspects, the additional data may describe or be related to the content of the at least one image and may be represented by attribute-value pairs (e.g., content attributes). For instance, referring back to the example image of the car, additional data may include attribute-value pairs such as "year—2015"; "make—BMW"; "model—Z4"; etc. As well, the additional data may be described by formatting attribute-value pairs such as "font size—11 pt."; "font color—red"; "font—Calibri"; "decimals—2"; "currency—Y"; etc. In other aspects, the additional data may not necessarily be represented by attribute-value pairs. For instance, the additional data may be a single numeric value that is the output of a formula (e.g., total revenue value, sum of a range of cell values, average value over a range of cell values, etc.). In still other aspects, additional data can be represented as arrays or vectors of data as well as any other primitive type (strings, numbers, etc.). Additionally, layout attributes may define a relative arrangement and/or dynamic display of image data, image attributes and additional data. For instance, layout attributes may also be defined by attribute-value pairs, e.g., "alignment—top" or "progressive display—1", etc.

At optional create operation 312 (identified by dashed lines), a compound data type may be created to include the selected one or more images and the additional data. For example, a hybrid component (e.g., hybrid component 118) of a spreadsheet application (e.g., spreadsheet application 110) may associate the additional data and the one or more images in a structured manner, such as an array of raw data, an array of record types, or a table. As noted above, in some cases, the additional data may include content attributes (which may be described in terms of attribute-value pairs) and may be defined by formatting attributes (which may also be described in terms of attribute-value pairs). Additionally, image attributes may be represented in terms of attribute-value pairs. In this case, a compound data type may be created, including the image data (e.g., an array of pixel values) with image attributes (e.g., described by attribute-value pairs), additional data (e.g., including content attributes and/or formatting attributes described by attribute-value pairs) and/or layout attributes (e.g., described in terms of attribute-value pairs) in a structured format. In some aspects, the compound data type may not include actual data representing one or more of the image data, image attributes, additional data and/or layout attributes, but the compound data type may include an array of fields with references or pointers to the actual data, which may be stored as a record in any suitable database or otherwise. As should be appreciated, different types of data (e.g., chart data, video data, audio data, etc.) may be described by different sets of attribute-value pairs, but may also be represented within the structured format of a compound data type.

At optional associate operation 314 (identified by dashed lines), similar to associate image operations 208 and 308, the compound data type may be associated with the selected cell of the spreadsheet. In some aspects, optional associate operation 314 may replace associate image operation 308. That is, in some cases, the image may not be associated with the selected cell prior to receiving additional data, but both the image and the additional data may be associated with the selected cell at the same time as a compound data type. As detailed above, the term "associate" may include any form of linking the compound data type to the selected cell (or a range of cells) within a spreadsheet. In aspects, a compound data type that is "associated" with a cell may be treated as a plurality of values within the cell.

For example, the compound data type may be anchored within the selected cell (or a range of cells). In this case, a file locator for the compound data type may be inserted into the formula bar associated with the selected cell or range of cells. When a compound data type is anchored to a cell, the compound data type (i.e., the image and the additional data represented by the compound data type) may move with the cell (or range of cells) when operations are performed on the spreadsheet. In further aspects, the compound data type may be referenced within the selected cell but may be allowed to float over the grid. In this case, operations may be performed on the compound data type and/or operations may be performed on the spreadsheet based on the compound data type, but the image and the additional data may or may not move with the selected cell. As should be appreciated, a compound data type may be associated with a cell or a range of cells by any suitable means.

At display operation 316, the additional data and the at least one image may be displayed. For example, as described above, when the at least one image is associated as fill (or background) for a cell or a range of cells, the additional data may be displayed over the at least one image. In some cases, a contrast between the at least one image and the additional data may be manipulated to optimize visibility of the additional data, either automatically or by user selection. Alternatively, an opacity and/or translucency of the image may be manipulated to optimize visibility of the additional data, either automatically or by user selection. When the at least one image is not associated as fill for the selected cell, the additional data and the at least one image may be arranged within the cell in any suitable alignment or layout. For example, the additional data may be displayed adjacent to the at least one image on the left or right, displayed above or below the image, wrapping the image, and the like. As should be appreciated, the additional data and the at least one image may be displayed according to any suitable alignment or layout, either automatically or based on user selection.

Additionally, at display operation 316, the image and the additional data may be fit to the cell size or the selected cell may be fit to a size appropriate for the image and the additional data. In some cases, the amount of data associated with the compound data type that is displayed may be based on the cell size, and as a cell is resized, the amount of data displayed may dynamically change. Alternatively, the image and the additional data may be allowed to overlay additional cells of the spreadsheet. The above examples are provided for purposes of explanation only and should not be understood as limiting.

As should be appreciated, operations 302-316 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 4:
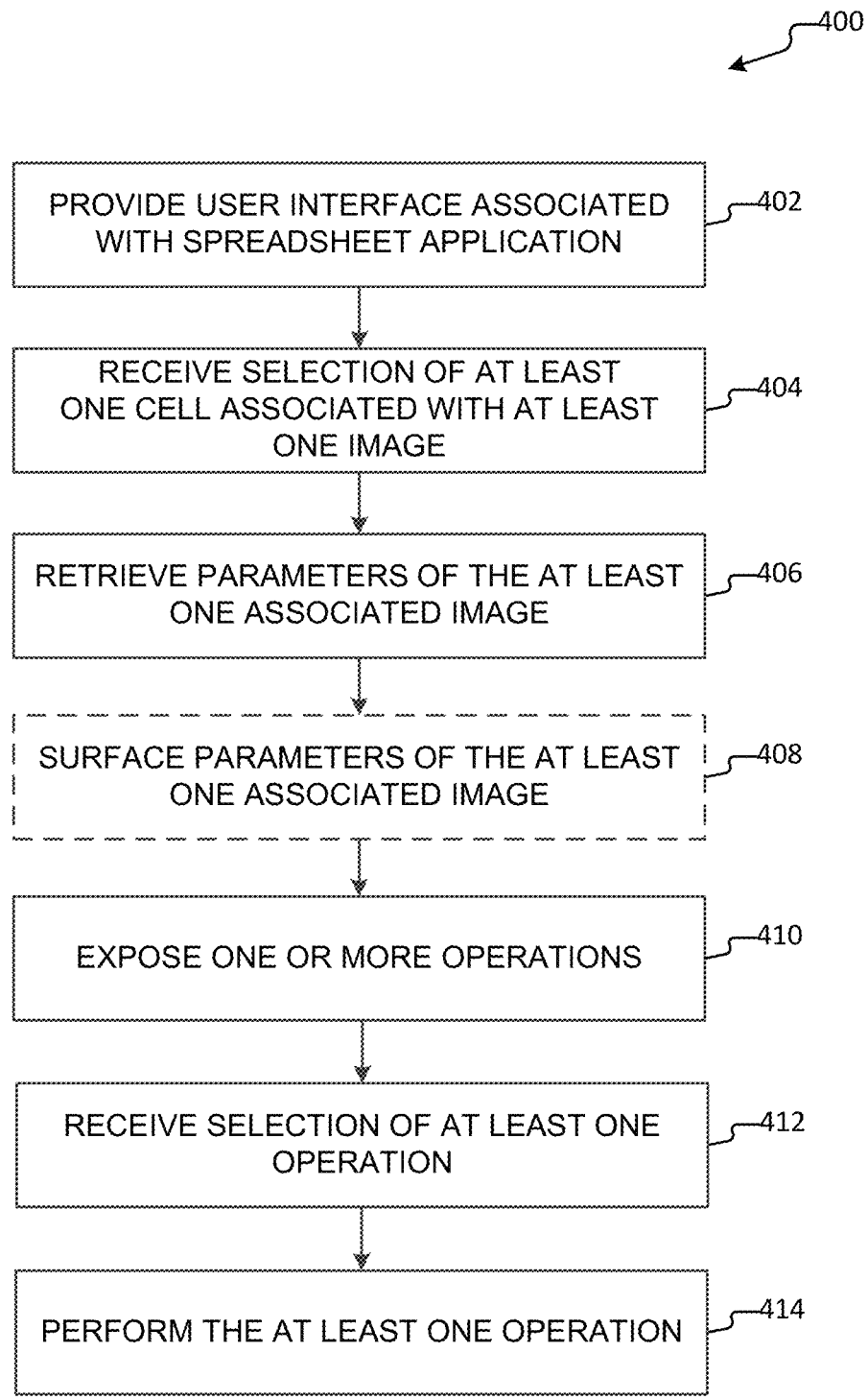
FIG. 4 illustrates a method for exposing one or more operations based on one or more images associated with cells of a spreadsheet, according to an example embodiment.

FIG. 4 illustrates a method for exposing one or more operations based on one or more images associated with cells of a spreadsheet, according to an example embodiment.

Method 400 begins with provide interface operation 402, where a spreadsheet application may provide (or cause to be provided) a user interface to a user. For example, similar to provide interface operations 202 and 302, a UX component may facilitate a user experience (UX) by providing a user interface (UI) of a spreadsheet application via a display. Selections and/or inputs may be received by the user interface based on gestures, touch, mouse movements, keyboard inputs, and the like. Additionally, the user interface may operate in conjunction or communication with one or more other components of the spreadsheet application (e.g., associate component 112, array component 114, attribute component 116, hybrid component 118, and operation component 120) to manipulate one or more images associated with one or more cells of a spreadsheet.

At select cell operation 404, at least one cell having at least one associated image may be selected, either automatically (e.g., based on a function) or by user selection. In some aspects, operations may call (or select) a cell without requiring user input, e.g., operations such as 'data refresh,' 'import from such and such data source', 'copy paste,' etc. As detailed above, in other aspects, a spreadsheet application may provide a spreadsheet to a user, the spreadsheet including one or more sheets each having a plurality of rows and columns of cells. Cells having one or more associated images may be selected by highlighting or otherwise identifying the cell or range of cells using a gesture, touch, mouse click, keyboard input, and the like. When a single cell is selected, the cell may be identified next to a formula bar of the user interface by a cell identifier that specifies a location of the cell within the spreadsheet. When a range of cells is selected, the cell at the top left corner of the range may be displayed by a cell identifier next to the formula bar, with the range of cells being represented by a range identifier including cell identifiers for the cell at the top left corner and the cell at the bottom right corner.

At retrieve parameters operation 406, one or more parameters may be retrieved for the at least one image associated with the selected cell or range of cells. In aspects, retrieve parameters operation 406 may be performed by an attribute component of a spreadsheet application. For example, in response to selecting a cell having at least one associated image, image data and/or image attributes associated with the image may be identified. As noted above, an image may be defined by image data (e.g., an array of pixel values or other data for rendering the image) and image attributes (e.g., opacity, color palette, resolution, aspect ratio, image dimensions, author, creation date and/or time, file name, tags, file size, GPS location information, etc.). In aspects, image attributes may be appended as metadata to an image file comprising image data. In this case, image data may be extracted (e.g., retrieved) from an image file and image attributes may be extracted (e.g., retrieved) from metadata associated with the image file.

In some cases, a compound data type may be associated with the selected cell. In this case, retrieve parameters operation 406 may retrieve one or more parameters for the associated image and/or additional data from the compound data type. For instance, image data (e.g., an array of pixel values for rendering the image), image attributes (e.g., height, width, aspect ratio, creation date and/or time, file name, file size, etc.), additional data (e.g., data describing the content of the image), formatting attributes (e.g., formatting for the additional data) and/or layout attributes (e.g., regarding layout between the image and additional data) may be retrieved from the compound data type.

At optional surface parameters operation 408 (identified by dashed lines), the image data, image attributes, additional data and/or formatting attributes (e.g., collectively "parameters") retrieved may be "surfaced" such that the parameters may be presented to a user in a readable format. In aspects, a user interface may be provided for presenting some or all of the identified parameters. For instance, a formatting toolbar (e.g., formatting toolbar 914) may be provided that includes a number of tabs for viewing and manipulating various image attributes. In one example, a sizing tab may display image attributes directed to image size and orientation such as "height," "width," "rotation," "scale height," "scale width," "aspect ratio," as well as displaying an original size for the image. In other examples, tabs associated with the formatting toolbar may provide image attributes, such as resolution, sharpness, luminance, color palette, opacity, transparency, author, creation date/time, and the like. In some cases, e.g., where both an image and additional data are associated with a single cell, the formatting toolbar may display layout attributes between the image and the additional data, such as contrast, alignment, background opacity and/or translucency, and the like. As should be appreciated, any parameter identified by retrieve parameters operation 406 may be displayed in any suitable interface.

Further, at expose operation 410, one or more operations may be exposed to a user. The one or more operations may include operations for manipulating parameters of the image (or additional data) and/or operations for performing manipulations of the spreadsheet based at least in part on the one or more parameters. For example, UI controls (e.g., +/− controls) or input fields may be provided for manipulating the one or more parameters, e.g., the image attributes detailed above. In this regard, a user may directly input values to adjust image attributes up or down based on user preference. For instance, with reference to image attributes displayed by the sizing tab, the values for "height," "width," "rotation," "scale height," and "scale width" may be adjusted by direct input and/or adjusted up or down using +/− controls. In some aspects, a preview of an image may be provided within the formatting toolbar such that changes to the image may be viewed prior to acceptance. Additionally or alternatively, a "reset" button may be provided to return adjusted parameters back to an original version of the image. As should be appreciated, the above examples of parameters are not exhaustive and any parameter may be surfaced and adjusted based on one or more exposed operations.

At expose operation 410, the formatting toolbar may also provide UI controls for turning certain settings on or off. For instance, a selection may be provided for "locking aspect ratio" and a further selection may be provided for locking the aspect ratio "relative to an original size" of the image. With reference to sizing an image, additional selections may be provided for "moving and sizing" the image with a cell, "moving without sizing" the image with a cell, and "not moving or sizing" the image with a cell. Operations such as printing an associated image or printing the image and additional data associated with a selected cell may also be provided. In some aspects, image data (e.g., an array of pixel values for rendering the image) may be surfaced and operations for manipulating the image data may be exposed to a user. In this regard, image processing may be enabled for images within a spreadsheet. For example, users may manipulate the raw pixel data, e.g., by changing the RGBA values directly in the cell (e.g., via a user interface). In aspects, an array of pixel values or an array of records (e.g. a 2D array of record types having four values for R, G, B, A) may be surfaced to enable a user to manipulate the image data. As should be appreciated, the above examples are provided for purposes of explanation only and should not be understood as limiting. Indeed, any of the operations described herein may be exposed via any suitable user interface for access by a user.

In still further examples, at expose operation 410, one or more operations for manipulating the spreadsheet based at least in part on the retrieved parameters may be exposed to a user. For example, in response to selection of a range of cells, a user interface may provide options for filtering or sorting the range of cells based on one or more parameters of associated images. For example, the range of cells may be sorted based on image attributes such as sizes of associated images (e.g., "Sort Largest to Smallest" or "Sort Smallest to Largest"), brightness of associated images (e.g., "Sort Light to Dark" or "Sort Dark to Light"), creation dates of associated images (e.g., "Sort Newest to Oldest" or "Sort Oldest to Newest"), and the like. Options for filtering the range of cells may similarly be based on one or more parameters of associated images. As described above, an image may be defined by image data (e.g., an array of pixel values or other data for rendering the image) and image attributes (e.g., opacity, color palette, resolution, aspect ratio, image dimensions, author, creation date and/or time, file name, tags, file size, GPS location information, etc.). In aspects, the range of cells may be sorted based on any identifiable image attribute of associated images.

At receive selection operation 412, a selection of one or more operations may be received. For instance, a selection may be received for manipulating any of the parameters identified herein (e.g., the image attributes detailed above). In this case, a user may select to adjust a setting, perform image processing functions, adjust a value of an image attribute, view or manipulate additional data, and the like. Additionally or alternatively, a user may select to perform an operation on a range of cells based at least in part on parameters of images associated with the range of cells, as described above. A selection may be received as direct input, activation of a control, or otherwise. The selection may be received in the form of a gesture, touch, mouse click, keyboard input, or otherwise. As should be appreciated, a selection to perform one or more operations on an image or additional data associated with a cell, or one or more operations on a range of cells based on parameters of associated images, may be received by any suitable means.

At perform operation 414, one or more operations may be performed. For instance, an operation may be performed on an image and/or additional data associated with a selected cell. Alternatively, an operation on a range of cells may be performed based on parameters of images and/or additional data associated with the range of cells. Indeed, any of the operations described herein may be selected and performed. In aspects, a cell preview and/or an image preview may further be provided such that changes may be viewed as they are implemented. Based on the preview, a user may "accept" changes before they are implemented. In this regard, a user may manipulate display of an image and/or additional data associated with a cell, manipulate one or more parameters associated with an image, manipulate the spreadsheet based on parameters of the image, etc.

As should be appreciated, operations 402-414 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 5A:
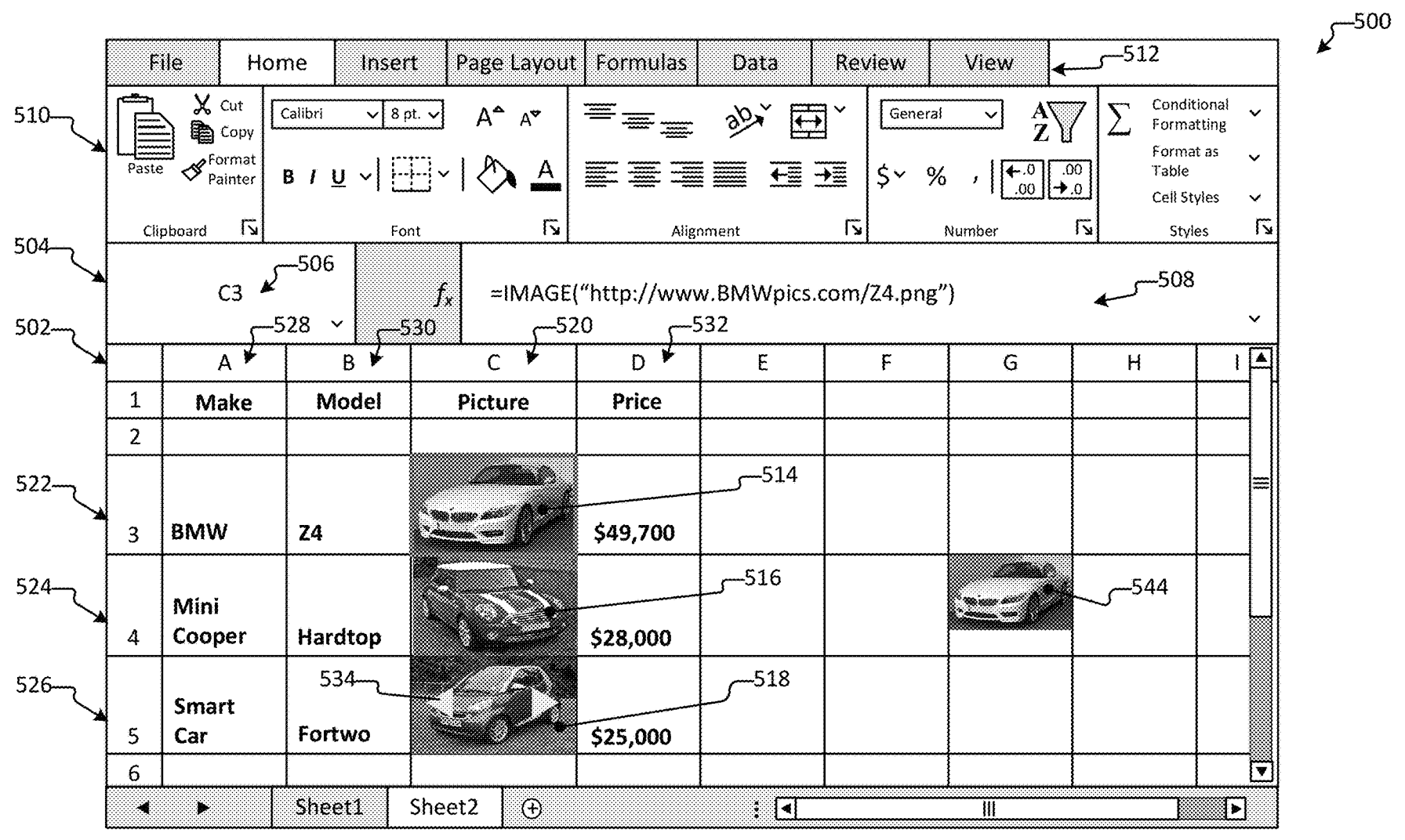

FIG. 5A illustrates an interface showing one or more images associated with one or more cells of a spreadsheet, according to an example embodiment.

As illustrated, an interface 500 of a spreadsheet application is provided. Interface 500 includes a spreadsheet 502, a navigation ribbon 504 (including a cell identifier 506 and a formula bar 508), and a toolbar 510. Interface 500 further includes a plurality of tabs 512 for accessing various aspects and operations of the spreadsheet application. As illustrated, cell C3 is selected, as indicated by thickened and/or colored outlining of the cell border of cell C3. However, a selection of a cell may be indicated by any suitable means, such as highlighting, shading, perceived three-dimensional enlargement, and the like. As shown, a cell identifier 506 (e.g., "C3") for the selected cell is displayed in navigation ribbon 504. Additionally, formula bar 508 displays a function calling a file locator, e.g., fx=IMAGE("http://www.BM-Wpics.com/Z4.png"), for the image (i.e., image 514) displayed within cell C3.

In some aspects, upon hovering over an image, various image attributes associated with the image may be displayed (e.g., in a popup window) (not shown). For example, upon hovering over image 514, a popup window may display the following image attributes (not shown): name: car2; type: JPEG; size: 2.46 MB; created: May 22, 2013; pixels: 3552× 2000; location: 34.121 45.314.

As further illustrated, image 514 is "fit" to cell C3. That is, image 514 is bounded by the cell border of cell C3. Moreover, a cell size for cell C3 has been resized such that both a cell height and a cell width have been increased to accommodate image 514. In this case, the resizing of cell C3 can be appreciated by comparison to cells maintaining a default size with a default cell height and default cell width (e.g., cells A1, A2, B1, B2, etc.). Similarly, all cells associated with column "C" (i.e., column 520), which includes cells C3-C5, have also been resized to increase a cell width so as to accommodate the image 514 in cell C3, as well as image 516 in cell C4 and image 518 in cell C5. As shown, images 514, 516 and 518 are substantially the same size; however, as detailed above, where associated images are of different sizes, a column may be resized to accommodate the associated image having the greatest image width and/or the associated images may be resized to be substantially the same or similar size. Additionally, as shown, all cells associated with row 3 (i.e., row 522), row 4 (i.e., row 524) and row 5 (i.e., row 526) have also been resized to increase a cell height to accommodate images 514, 518 and 520. Again, in this case, images 514, 518 and 520 are substantially the same size; however, where images are not the same size, a row may be resized to accommodate the associated image having the greatest image height and/or the associated images may be resized to be substantially the same or similar size.

FIG. 5A also illustrates a scroll control 534 associated with image 518. In aspects, the scroll control 534 indicates that a plurality of images is associated with cell C5. In further aspects, the scroll control 534 may enable a user to scroll backward (e.g., by activating the back arrow) or forward (e.g., by activating the forward arrow) through the plurality of images. In some cases, as described further with respect to FIG. 5C, the scroll control or another UI control may be activated to launch a user interface (not shown in FIG. 5A) for displaying and/or interacting with each of the plurality of images. As detailed above, the user interface may allow a user to view all of the plurality of images and to add, delete, edit, or otherwise manipulate the plurality of images associated with a cell.

Figure 5B:
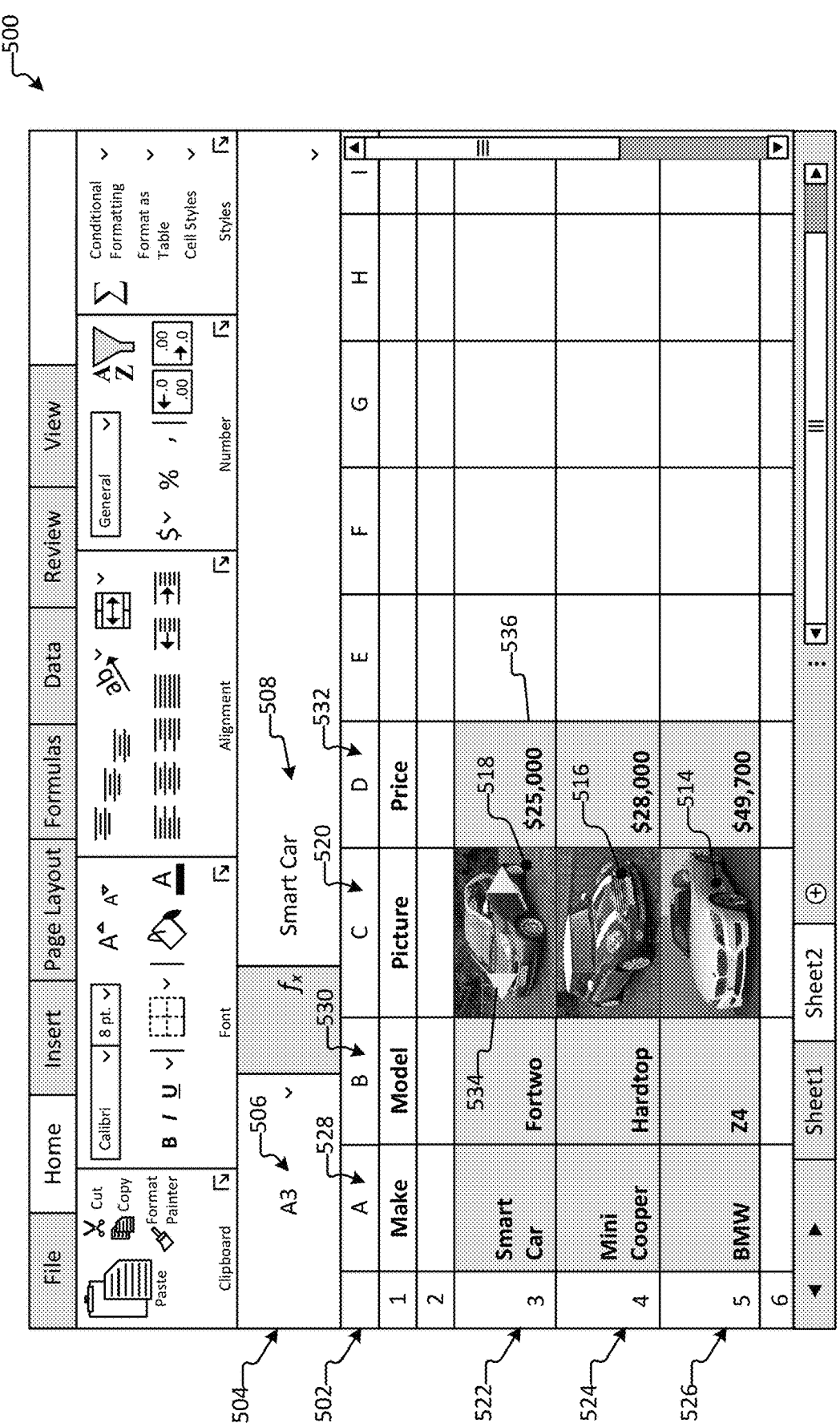
FIG. 5B illustrates an interface showing an outcome of a spreadsheet operation performed on a range of cells with associated images in a spreadsheet, according to an example embodiment.

As further illustrated by FIG. 5A, images 514-518 are pictures of different automobiles. In this case, additional data describing images 514-518 within cells C3-C5 of column 520 is stored in cells within adjacent rows and/or columns. For example, in column "A" (i.e., column 528), cells A3, A4 and A5 contain data regarding the "makes" of the automobiles shown in images 514, 516, and 518, respectively. In column "B" (i.e., column 530), cells B3, B4 and B5 contain data regarding the "models" of the automobiles shown in images 514, 516 and 518, respectively. Cells D3, D4 and D5 of column "D" (i.e., column 532) contain data regarding the "prices" of the automobiles shown in images 514, 516 and 518, respectively. As detailed above, when images are associated with cells of a spreadsheet application according to the methods and systems described herein, operations performed on the spreadsheet, e.g., sort and filter operations, may also operate on the images. That is, the images may move with the cells with which they are associated, as further illustrated by FIG. 5B.

In further aspects, as illustrated by FIG. 5A, an image in one cell may be referenced by another cell. For instance, the function associated with cell G4 may be "fx=C3". In this case, the image of the BMW represented in cell C3 is associated with cell G4 as image 544. As illustrated, image 544 is "fit horizontally" and aligned at the top of cell G4. As shown, image 514 in cell C3 is downloaded to the cell from a URL to a service (e.g., "http://www.BMWpics.com/Z4.png"). Based on the function in cell G4 (e.g., "=C3"), image 544 is downloaded from the same URL. When the spreadsheet application is offline, cashed versions of images 514 and 544 may be displayed in cells C3 and G4. In other aspects, the function associated with G4 may be "fx=C5" (not shown). In this case, the array of images associated with cell C5 may be associated with cell G4 (not shown). In still further aspects, an image may be referenced in a function and may be displayed only when a condition of the function is satisfied.

As should be appreciated, the various devices, components, etc., described with respect to FIG. 5A are not intended to limit the systems and methods to the particular components described. Accordingly, additional topology configurations may be used to practice the methods and systems herein and/or some components described may be excluded without departing from the methods and systems disclosed herein.

FIG. 5B illustrates an interface showing an outcome of a spreadsheet operation performed on a range of cells associated with a plurality of images in a spreadsheet, according to an example embodiment.

Similar to FIG. 5A, FIG. 5B shows interface 500 of a spreadsheet application including spreadsheet 502 and navigation ribbon 504, which includes cell identifier 506 and formula bar 508. In this case, a ranges of cells 536 (e.g., A3:D5) is shown as selected (e.g., by shading) and the cell at the top left corner of the range (i.e., cell A3) is identified by cell identifier 506 (e.g., "A3") in the navigation pane 504. Additionally, the contents of cell A3 (e.g., alphanumeric data "Smart Car") are displayed in formula bar 508.

As detailed above, when images are associated with cells of a spreadsheet application according to the methods and systems described herein, operations performed on the spreadsheet, e.g., sort and filter operations, may also operate on the images. As illustrated, a sort operation was performed on range 536 in which the data associated with column 530 (i.e., cells B3, B4 and B5) was alphabetically sorted and reordered such that the model "Fortwo" is now displayed in the top row of the range (e.g., row 522) above the model "Hardtop," which is displayed above the model "Z4." As further illustrated, after performing the sort operation, data and images associated with cells A3:D5 within the range 536 maintained relationships within their respective rows. For example, cells including data relating to the model "Fortwo" were also reordered to the top row (e.g., row 522) of the range 536. That is, the cell including alphanumeric data "Smart Car," the cell including image 518, and the cell including alphanumeric data "$25,000" have been reordered from row 526 to row 522 in response to the sort operation. As should be further appreciated, the plurality of images associated with image 518 have also been reordered from row 526 to row 522, as indicated by scroll control 534. Similarly, the cell including alphanumeric data "BMW," the cell including image 514, and the cell including alphanumeric data "$49,700" have been reordered from row 522 to row 526 in response to the sort operation. As should be appreciated, previous ordering of the data in cell B3-B5, as well as alphabetical reordering of the data within cells B3-B5, places alphanumeric data "Hardtop" within row 524 in both cases. Accordingly, the cell including alphanumeric data "Mini Cooper," the cell including image 516, and the cell including alphanumeric data "$28,000" remain in row 524 following the sort operation.

Thus, as illustrated by FIG. 5B, images associated with cells of a spreadsheet move with the cells when operations are performed on the spreadsheet. In this regard, unlike prior systems where images float on top of cells of a spreadsheet and do not behave predictably when operations are performed on the spreadsheet, images according to the disclosed embodiments move with associated cells and behave predictably (i.e., maintain established relationships with the data in other cells) when operations are performed on the spreadsheet.

As should be appreciated, the various devices, components, etc., described with respect to FIG. 5B are not intended to limit the systems and methods to the particular components described. Accordingly, additional topology configurations may be used to practice the methods and systems herein and/or some components described may be excluded without departing from the methods and systems disclosed herein.

Figure 5C:
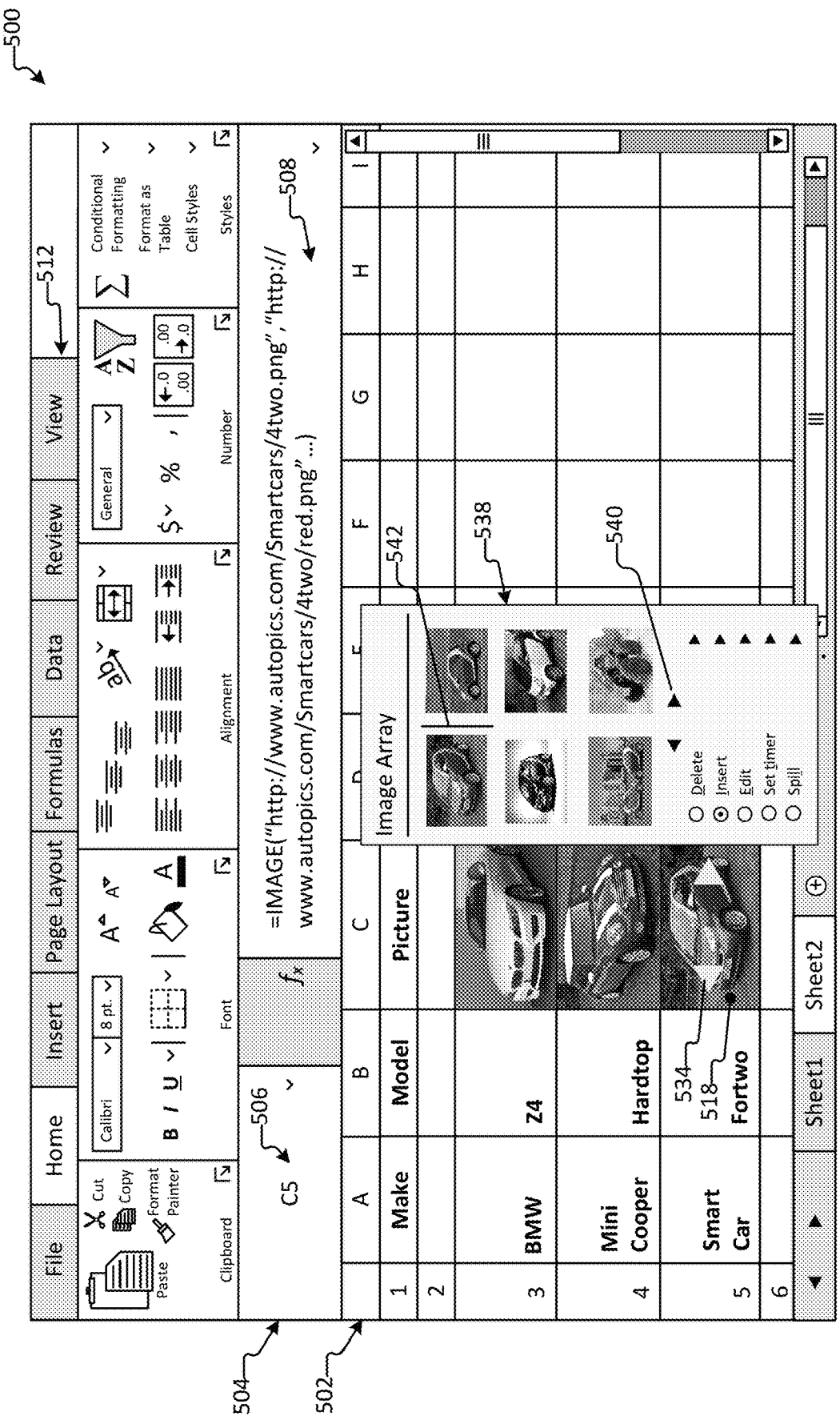
FIG. 5C illustrates an interface showing a UI element for viewing and/or manipulating a plurality of images associated with a cell of a spreadsheet, according to an example embodiment.

FIG. 5C illustrates an interface showing a UI element for viewing and/or manipulating a plurality of images associated with a cell in a spreadsheet, according to an example embodiment.

Similar to FIGS. 5A and 5B, FIG. 5C shows interface 500 of a spreadsheet application including spreadsheet 502 and navigation ribbon 504, which includes cell identifier 506 and formula bar 508. Interface 500 further includes a plurality of tabs 512 for accessing various aspects and operations of the spreadsheet application. As illustrated, cell C5 is selected, as indicated by thickened and/or colored outlining of the cell border of cell C5. As shown, a cell identifier 506 (e.g., "C5") for the selected cell is displayed in navigation ribbon 504. Additionally, formula bar 508 displays a function calling the file locators for a plurality of images (e.g., =IMAGE("http://www.autopics.com/Smartcars/4two.png","http://www.autopics.com/Smartcars/4two/red.png", etc.)) associated with cell C5.

FIG. 5C illustrates image 518 with scroll control 534. As detailed above, the scroll control 534 indicates that a plurality of images is associated with cell C5. In some aspects, the scroll control 534 may enable a user to scroll backward (e.g., by activating the back arrow) or forward (e.g., by activating the forward arrow) one at a time through the plurality of images within the cell. Alternatively, the scroll control 534 or another UI control may be activated to launch user interface 538 for displaying and/or interacting with each of the plurality of images.

As illustrated, user interface 538 displays each of the plurality of images associated with cell C5 in a grid configuration. As detailed above, user interface 538 may display the plurality of images in any suitable configuration, e.g., linear, carousel, etc. User interface 538 may further provide options for performing operations on the plurality of images. For instance, a "Delete" option may be provided for removing one or more images from the array. In aspects, in response to selection of the "Delete" option, a secondary interface may open for selecting one or more images for removal from the array and, in some cases, a confirmation to remove the selected one or more images. User interface 538 may also provide an "Insert" option for adding one or more images to the array. Translation control 540 enables a user to translate through the images to a position (identified by place marker 542) for inserting a new image. In aspects, in response to selection of the "Insert" option, a secondary interface may open for finding and associating file locator(s) for the additional one or more images with the selected cell.

User interface 538 may further provide an "Edit" option for manipulating one or more images of the array. In aspects, in response to selection of the "Edit" option, a secondary formatting interface may open for surfacing one or more image attributes of the plurality of images, for example, similar to formatting toolbar 914 illustrated by FIG. 9. Additionally, the formatting interface may expose one or more operations, enabling a user to manipulate image attributes of the plurality of images. User interface 538 may also include a "Set timer" option for cycling display of each image one at a time within cell C5. In aspects, the timer may cycle on a default schedule in response to selection of the "Set timer" option. Alternatively, in response to selection of the "Set timer" option, a secondary timer interface may open to set a custom cycle time. In some aspects, the "Set timer" option may also provide animation features for cycling, such as twining, fade out, and the like. In further aspects, an option for "Playing" the plurality of images as a slideshow may be provided (not shown). In this case, controls for animating the display of each image may also be provided, as discussed above.

In still further aspects, a "Spill" option may be provided by user interface 538. The Spill option may allow a user to "spill" the array of images into separate cells. For example, upon selection of the Spill option, a secondary interface may open for selecting a range of cells into which the array of images should be spilled. In aspects, each image of the array of images may be spilled and then associated with a cell among the range of selected cells. In alternative options (not shown), a range of cells having associated images may be selected and an option to condense the images into an array for association with a single cell may be provided. The above examples of options for viewing and interacting with a plurality of images are not intended to be exhaustive and should not be understood to be limiting.

As should be appreciated, the various devices, components, etc., described with respect to FIG. 5C are not intended to limit the systems and methods to the particular components described. Accordingly, additional topology configurations may be used to practice the methods and systems herein and/or some components described may be excluded without departing from the methods and systems disclosed herein.

Figure 6:
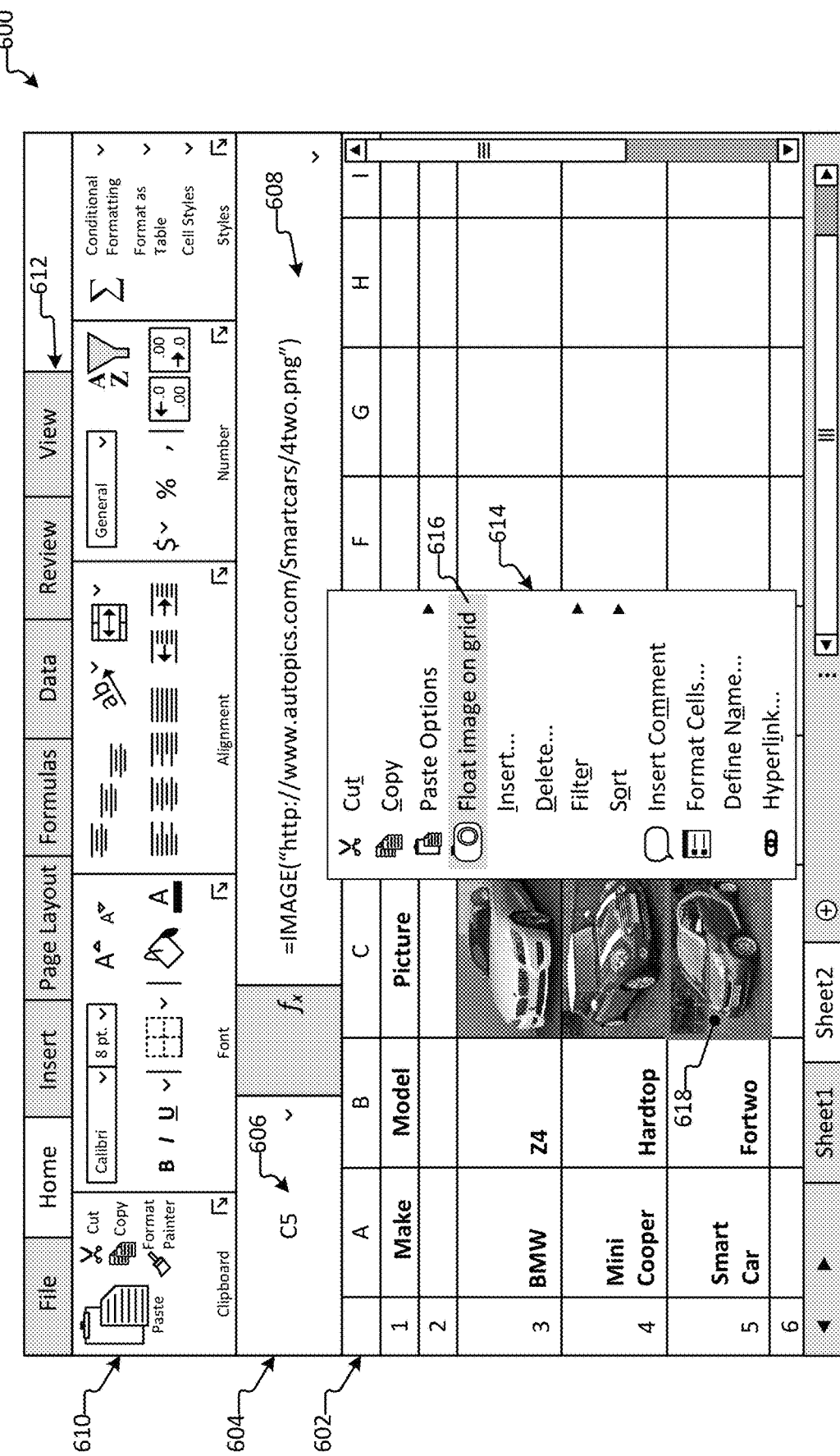
FIG. 6 illustrates an interface showing a popup menu for manipulating one or more images associated with one or more cells of a spreadsheet, according to an example embodiment.

FIG. 6 illustrates an interface showing a popup menu for manipulating one or more images associated with one or more cells of a spreadsheet, according to an example embodiment.

As illustrated, an interface 600 of a spreadsheet application is provided. Interface 600 includes a spreadsheet 602, a navigation ribbon 604 (including a cell identifier 606 and a formula bar 608), and a toolbar 610. Interface 600 further includes a plurality of tabs 612 for accessing various aspects and operations of the spreadsheet application. As further illustrated, cell C5 is selected, as indicated by thickened and/or colored outlining of the cell border of cell C5. However, selection of a cell may be indicated by any suitable means, such as highlighting, shading, perceived three-dimensional enlargement, and the like. As shown, a cell identifier 606 (e.g., "C5") for the selected cell is displayed in navigation ribbon 604. Additionally, formula bar 608 displays a function calling a file locator (e.g., =IMAGE("http://www.autopics.com/Smartcars/4two.png")) for the image (i.e., image 618) displayed within cell C5. In this case, in contrast to image 618, image 618 is not associated with a plurality of images and is not displayed with a scroll control.

As indicated above, cell C5 has been selected. Cell C5 may be selected by clicking the cell, placing a cursor in the cell, touching the cell, etc., for purposes of entering data (e.g., formulas, textual data, numeric data, etc.) or objects (e.g., images, charts, videos, audio files, compound data types, and the like) into the cell. In aspects, upon selecting a cell including an associated image, a popup menu 614 (or other interface) may be provided for manipulating the associated image or other data in the selected cell. In other aspects, popup menu 614 may be provided in response to additional input (e.g., right click, hover over, etc.).

Popup menu 614 may provide any number of options for manipulating data or objects associated with a selected cell. As illustrated, popup menu 614 provides options including "Cut," "Copy" and "Paste." In this case, data or objects may be cut from a cell, copied in a cell and/or pasted to a cell. Additionally, popup menu 614 provides option 616 for "floating an image on grid." As illustrated, option 616 is selected (e.g., shown by shading). As described above, an image that is embedded or anchored within a cell may be "popped out" to float over cells within the spreadsheet. For example, "popping" an image out of cell may change a state of the image (e.g., from anchored to floating or from embedded to floating). In some aspects, when an image floats over the grid, the image may remain associated with a cell or cells (e.g., by reference) such that operations may be performed on the image, but the image may not move with the cell or cells when operations are performed on the spreadsheet.

Additionally, popup menu 614 includes an option to "Insert." The "Insert" option may enable a user to associate data, images or other objects with the selected cell. In a first example, upon selection of the "Insert" option, a menu may provide for associating an image by browsing a local file structure to identify a URL for the image and/or for finding the image in remote storage and inserting a URL for the image. In aspects, the menu may automatically insert the file locator for the identified image in a function in the formula bar associated with the selected cell, e.g., fx=IMAGE ("http://www.mattspics.com/weather/rainyday.png"). In a second example, e.g., where at least one image is already associated with the cell, upon selection of the "Insert" option, a UI element may open that displays the at least one image already associated with the cell. The UI element may further enable a user to scroll through a plurality of associated images and add an image in a selected position within the plurality of associated images. In a third example, where data and/or an image are already associated with the cell, upon selection of the "Insert" option, a UI element may open that enables a user to add data and/or an image (or other object) to the selected cell. In some cases, a compound data type may be created to insert the additional data and/or image to the selected cell. Alternatively, a compound data type may already exist and the additional data and/or image may be added to the compound data type. As should be appreciated, additional examples are possible and the above examples are offered for purposes of explanation and should not be understood as limiting.

Popup menu 614 further includes a "Delete" option. In contrast to the "Insert" option, the "Delete" option may enable a user to delete data, images or other objects from the selected cell. The menus described above with respect to the "Insert" option may similarly apply to the "Delete" option. In addition, popup menu 614 may provide "Filter" and "Sort" options, described further below with respect to FIG. 7. An "Insert Comment" option may enable a user to associate a comment with a cell. The comment may be provided in a bubble, balloon, or otherwise, and in some cases, may be identified by an icon that may be activated to display the comment.

Popup menu 614 may further provide a "Format Cells" option. The "Format Cells" option may enable a user to adjust an alignment of data, an image or an object within a selected cell. For instance, the data may be right, left or center justified. Additionally or alternatively, the "Format Cells" option may enable a user to adjust an alignment between an image and additional data or other object. For example, the additional data may be provided above, below, on either side, or wrapping an image or other object. In some examples, the "Format Cells" operation may allow an image to become background or fill for a cell, allowing additional data to be displayed on top of the image within the cell. The "Format Cells" option may further provide any number of other options, e.g., including options for adjusting a cell border, a cell fill, font of alphanumeric data, formatting of numeric data, and the like.

In further aspects, popup menu 614 may provide a "Define Name" option, which may enable a globally unique name to be assigned to an image or other object. In some aspects, the globally unique name may be associated as metadata to the image file and may serve as a file locator for the image or object. For instance, the globally unique name may be referenced within a function of a cell in order to perform operations on an image (e.g., display the image when a condition of the function is met, perform operations on image attributes, etc.) and/or to perform operations on the spreadsheet based on attributes of the image, and the like. Popup menu 614 may further provide a "Hyperlink" option for inserting a hyperlink to a file, a webpage, or otherwise. As should be appreciated, the options of popup menu 614 described above are not exhaustive and should not be considered to be limiting. Indeed, any number of options may be provided by popup menu 614.

As should be appreciated, the various devices, components, etc., described with respect to FIG. 6 are not intended to limit the systems and methods to the particular components described. Accordingly, additional topology configurations may be used to practice the methods and systems herein and/or some components described may be excluded without departing from the methods and systems disclosed herein.

Figure 7:
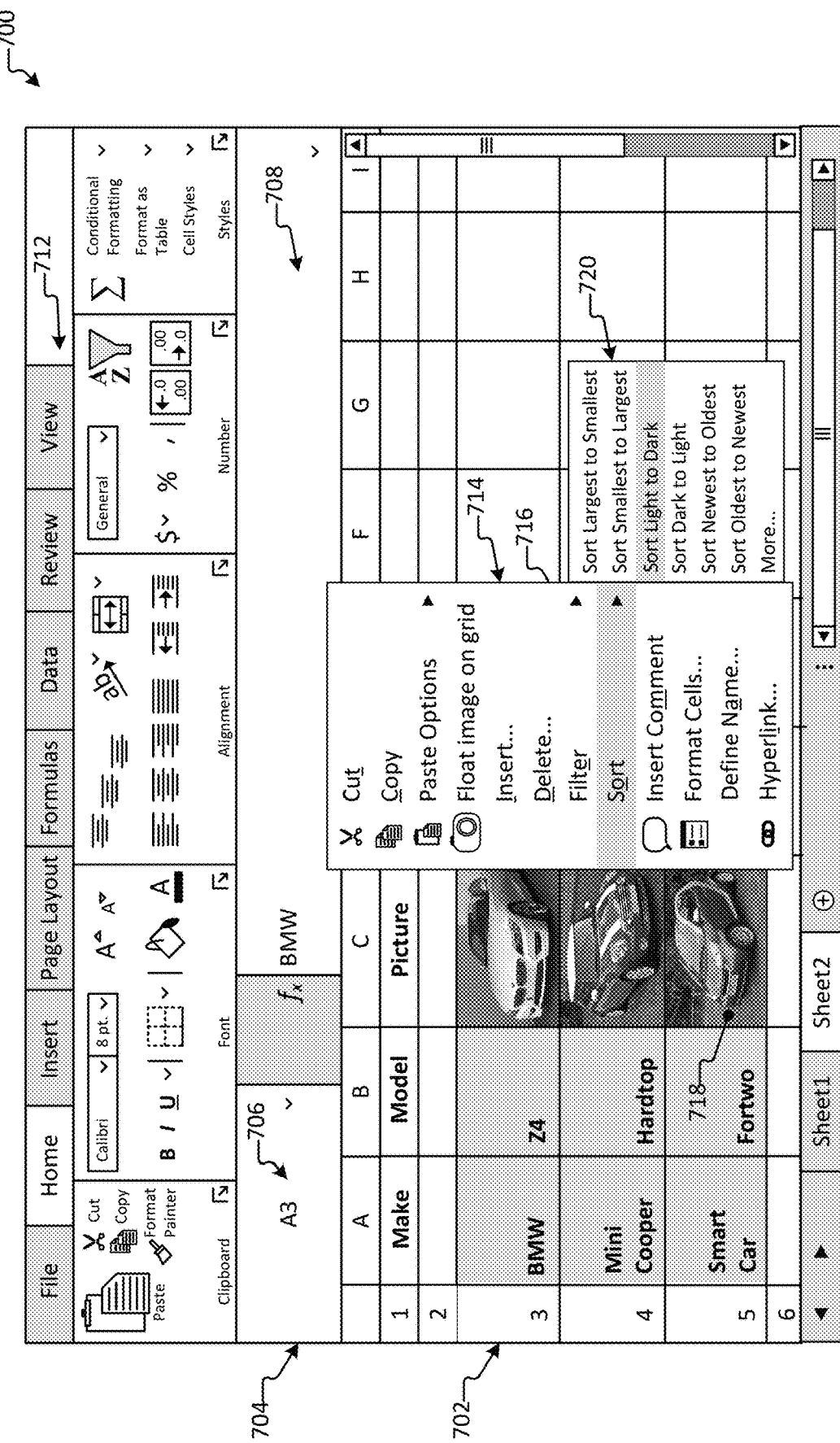
FIG. 7 illustrates an interface showing a popup menu for sorting a range of cells in a spreadsheet based on one or more attributes of images associated with the range of cells, according to an example embodiment.

FIG. 7 illustrates an interface showing a popup menu for sorting a range of cells in a spreadsheet based on one or more attributes of images associated with the range of cells, according to an example embodiment.

As illustrated, an interface 700 of a spreadsheet application is provided. Interface 700 includes a spreadsheet 702 and a navigation ribbon 704, including a cell identifier 706 and a formula bar 708. Interface 700 further includes a plurality of tabs 712 for accessing various aspects and operations of the spreadsheet application. As further illustrated, a range of cells (A3:C5) is selected, as illustrated by shading or highlighting over the range of cells. As shown, cell identifier 706 (e.g., "A3"), identifying a cell at the top left corner of the range of cells, is displayed in navigation ribbon 704. Additionally, the contents of cell A3 is displayed formula bar 708 as: BMW.

As indicated above, the range of cells (i.e., A3:C5) has been selected. The range of cells may be selected by highlighting the range of cells, touching (or swiping) the range of cells, entering "=A3:C5" into the formula bar, etc. In aspects, upon selecting a range of cells including associated images, a first popup menu 714 (or other interface) may be provided for manipulating associated images or other data in the selected range of cells. In other aspects, first popup menu 714 may be provided in response to additional input (e.g., right click, hover over, etc.).

Similar to popup menu 614, first popup menu 714 may provide any number of options for manipulating data or objects associated with the selected range of cells. For instance, first popup menu 714 may provide "Filter" and "Sort" options for filtering or sorting the spreadsheet based on one or more image attributes of the associated images. For example, in response to selecting "Sort" option 716, a second popup menu 720 may be provided. The second popup menu 720 may provide options for sorting the spreadsheet based on image attributes of associated images (e.g., images associated with the selected range of cells). As described above, an image may be defined by image data (e.g., an array of pixel values or other data for rendering the image) and/or image attributes (e.g., opacity, color palette, resolution, aspect ratio, image dimensions, author, creation date and/or time, file name, tags, file size, GPS location information, etc.). Sorting may be performed based on image data and/or image attributes, e.g., sizes of associated images (e.g., "Sort Largest to Smallest" or "Sort Smallest to Largest"), brightness of associated images (e.g., "Sort Light to Dark" or "Sort Dark to Light"), creation dates of associated images (e.g., "Sort Newest to Oldest" or "Sort Oldest to Newest"), and the like. Additionally, sort, filter and conditional formatting operations may be performed on metadata attributes that are not visible or displayed in the cell. For instance, tangible metadata may be identified, e.g., a car dealer's GEO location data that was captured and stored as part of metadata for an image of a vehicle (or gallery of images of the vehicles), and surfaced and/or manipulated in the spreadsheet. In aspects, a spreadsheet may be sorted based on any identifiable image attribute, and in some cases identifiable image data, of associated images.

As should be appreciated, the various devices, components, etc., described with respect to FIG. 7 are not intended to limit the systems and methods to the particular components described. Accordingly, additional topology configurations may be used to practice the methods and systems herein and/or some components described may be excluded without departing from the methods and systems disclosed herein.

Figure 8A:
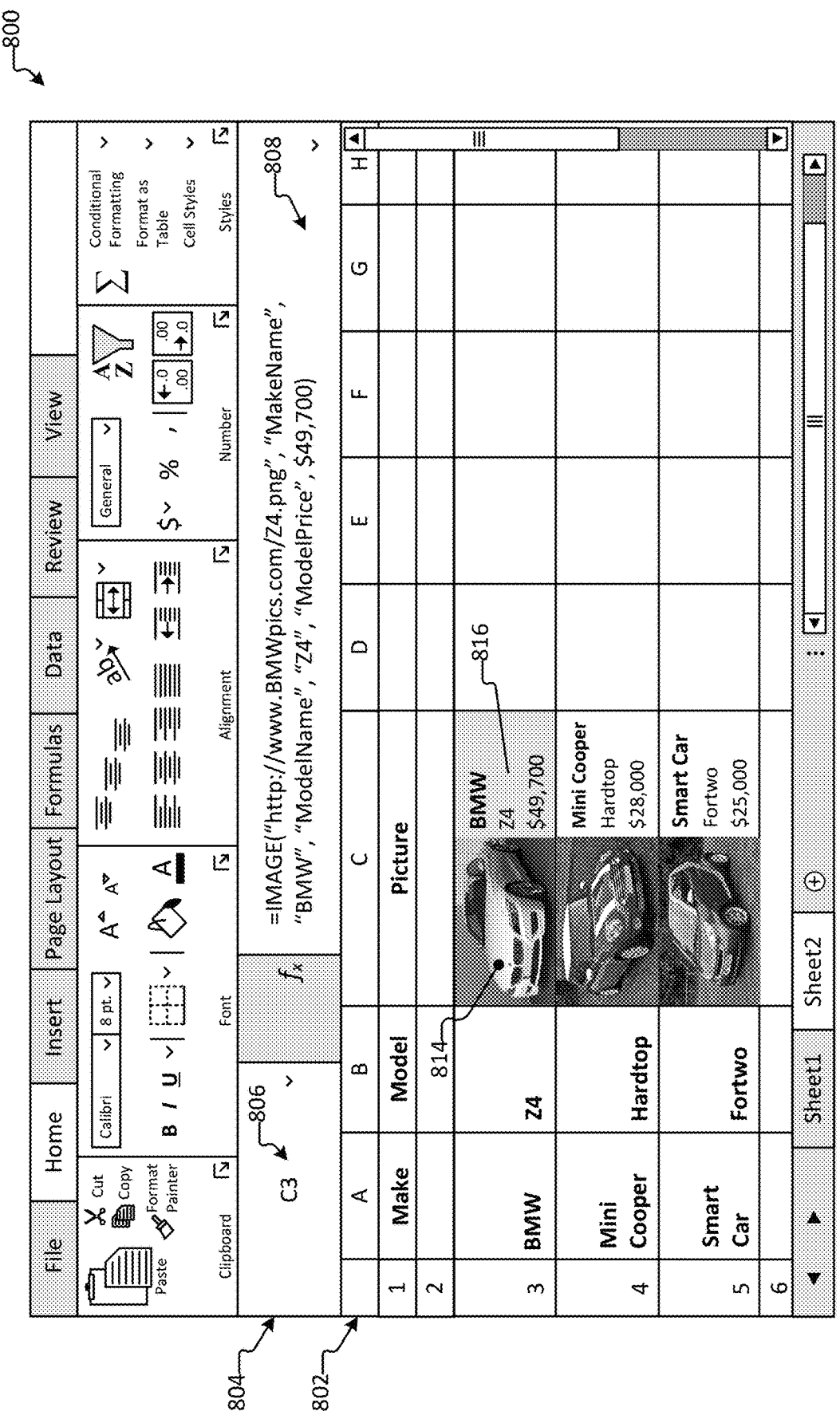
FIG. 8A illustrates an interface showing one or more images and additional data associated with one or more cells of a spreadsheet, according to a first example embodiment.

FIG. 8A illustrates an interface showing one or more images and additional data associated with one or more cells of a spreadsheet, according to a first example embodiment.

As illustrated, an interface 800 of a spreadsheet application is provided. Interface 800 includes a spreadsheet 802 and a navigation ribbon 804, including a cell identifier 806 and a formula bar 808. As further illustrated, cell C3 is selected, as indicated by shading of cell C3. However, selection of a cell may be indicated by any suitable means, such as highlighting, perceived three-dimensional enlargement, outlining of the cell border, and the like. As shown, a cell identifier 806 (e.g., "C3") for the selected cell is displayed in navigation ribbon 804.

As illustrated, cell C3 contains both an image (e.g., image 814) and additional data (e.g., additional data 816). In the illustrated embodiment, image 814 depicts an automobile and additional data 816 describes the automobile, e.g., the make, model and price of the automobile. In some aspects, image 814 and additional data 816 may be associated with a compound data type. In this case, a formula bar 808 for cell C3 may display a function referencing a globally unique name for the compound data type (e.g., the compound data type representing the image 814 and the additional data 816) associated with cell C3. In other aspects, formula bar 808 may display a function describing image 814 and additional data 816 contained in cell C3.

A function representing the compound data type may be identified using a variety of syntax. For instance, the function may surface whatever attribute-value pairs are stored in the compound data type and may be represented as: =IMAGE("http://www.BMWpics.com/Z4.png", "MakeName", "BMW", "ModelName", "Z4", "ModelPrice", $49,700). In this case, a first portion of the function may reference a file locator for image 814, e.g., =IMAGE("http://www.BMWpics.com/Z4.png"), and a second portion of the function may reference additional data 816, e.g., "MakeName", "BMW", "ModelName", "Z4", "ModelPrice", $49,700.

In other aspects, where a user combines an image with an arbitrary set of values (e.g., a record), the function may be represented as: =IMAGE("http://www.BMWpics.com/Z4.png", RECORD("MakeName", "BMW", "ModelName", "Z4", "ModelPrice", $49,700)). In still other aspects, where an image (identified by a ".png" file extension) is added to a compound data type constructed by a user, the image would amount to a value within the compound data type (e.g., a record) and the function may be represented as: =RECORD("Image", Z4.png, "MakeName", "BMW", "ModelName", "Z4", "ModelPrice", $49,700). In still other aspects, a user may create a compound data type and give the compound data type a name (e.g., "AutoResearch"). The next time the compound data type is used, each attribute name is already known as a field in the "AutoResearch" compound data type and only the values need to be called out in the function, which may be represented as: =AUTORESEARCH("http://www.BMWpics.com/Z4.png", "BMW", "Z4", $49,700). Further, the function may simply reference attributes of the image and read the values from metadata, e.g., =RECORD("Image", "http://www.BMWpics.com/Z4.png", "BMW", "ModelName", "Z4", "ModelPrice", Z4.price). In this case, a user may provide custom fields within the compound data type (e.g., record) and, by dereferencing the 'image' field, values may be read from metadata and populated in the user's defined fields in the record.

As should be appreciated, the various devices, components, etc., described with respect to FIG. 8A are not intended to limit the systems and methods to the particular components described. Accordingly, additional topology configurations may be used to practice the methods and systems herein and/or some components described may be excluded without departing from the methods and systems disclosed herein.

Figure 8B:
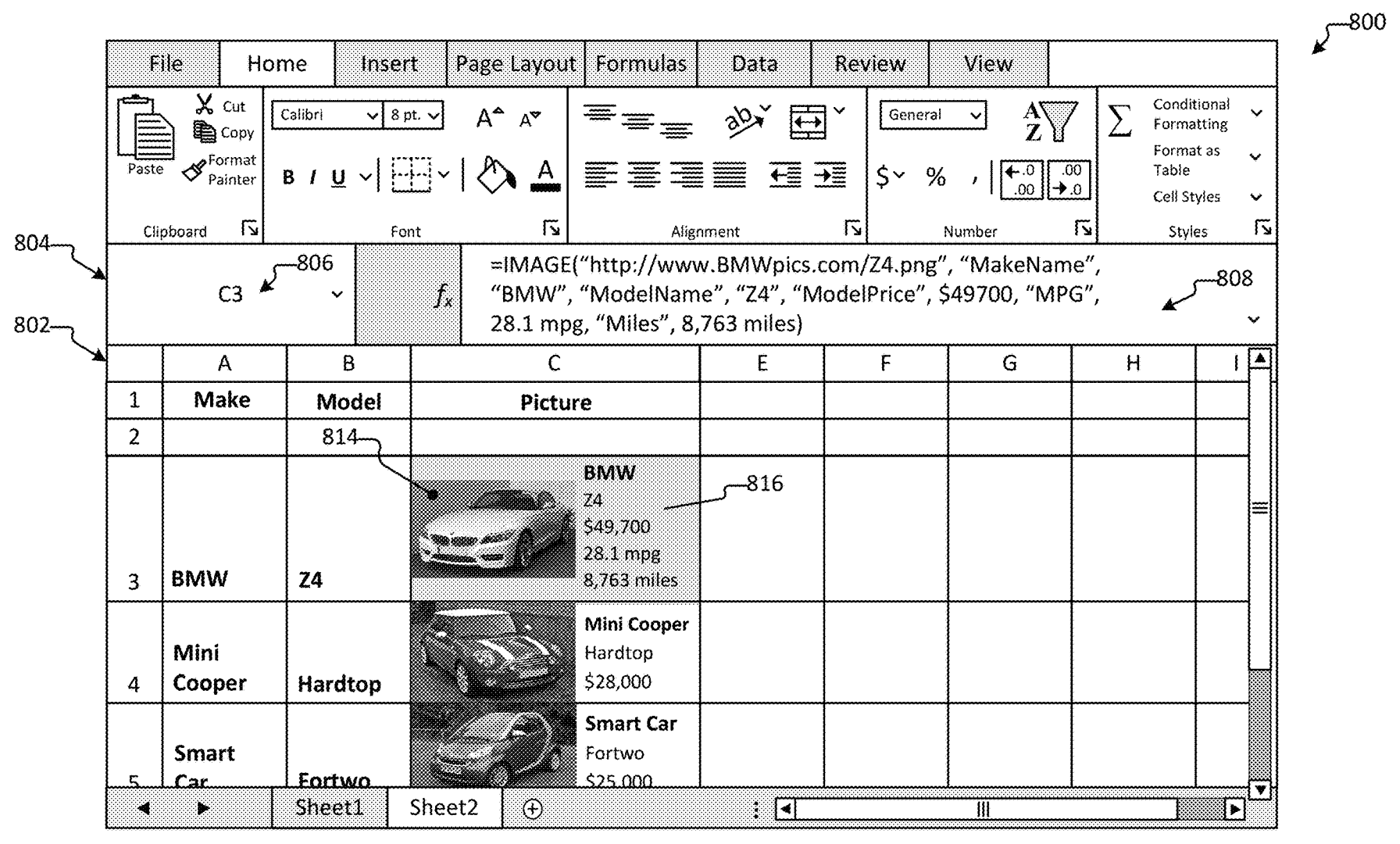

FIG. 8B illustrates an interface showing one or more images and additional data associated with one or more cells of a spreadsheet, according to a second example embodiment.

As illustrated, an interface 800 of a spreadsheet application is provided. Interface 800 includes a spreadsheet 802 and a navigation ribbon 804, including a cell identifier 806 and a formula bar 808. As further illustrated, cell C3 is selected, as indicated by background shading of cell C3. However, selection of a cell may be indicated by any suitable means, such as highlighting, perceived three-dimensional enlargement, outlining of the cell border, and the like. As shown, a cell identifier 806 (e.g., "C3") for the selected cell is displayed in navigation ribbon 804.

Similar to cell C3 of FIG. 8A, cell C3 contains both an image (e.g., image 814) and additional data (e.g., additional data 816). However, cell C3 of FIG. 8B has been resized. In response to resizing cell C3, additional data 816 displays more information regarding the automobile, e.g., miles-per-gallon (mpg) and the mileage of the automobile have been added. As explained above, in some aspects, the display of additional data 816 may be dynamic. For instance, a minimal amount of additional data may be displayed in a small-sized cell, whereas progressively more additional data may be displayed as the cell is enlarged. For instance, in a small-sized cell, an image icon may be displayed, indicating that an image is associated with the cell. In contrast, as the cell is enlarged, a rendering of the image may be displayed along with progressively more additional data, including image attributes such as file name and creation data/time, and information regarding image content, such as image recognition data.

In some aspects, image 814 and additional data 816 may be associated with a compound data type. In this case, a formula bar 808 for cell C3 may display a function referencing a globally unique name for the compound data type (e.g., the compound data type representing the image 814 and the additional data 816) associated with cell C3. Alternatively, formula bar 808 may display a function describing image 814 and additional data 816 contained in cell C3. For instance, the function may be represented as: =IMAGE("http://www.BMWpics.com/Z4.png", "MakeName", "BMW", "ModelName", "Z4", "ModelPrice", $49700, "MPG", "28.1 mpg", "Miles", "8,763 miles"). In this case, a first portion of the function may reference a file locator for image 814 (e.g., =IMAGE("http://www.BMWpics.com/Z4.png") and a second portion of the function may reference additional data 816 (e.g., "MakeName", "BMW", "ModelName", "Z4", "ModelPrice", $49,700, "MPG", "28.1 mpg", "Miles", "8,763 miles"). Alternatively, the function may be represented in any of the forms identified for FIG. 8A above.

As should be appreciated, the various devices, components, etc., described with respect to FIG. 8B are not intended to limit the systems and methods to the particular components described. Accordingly, additional topology configurations may be used to practice the methods and systems herein and/or some components described may be excluded without departing from the methods and systems disclosed herein.

Figure 8C:
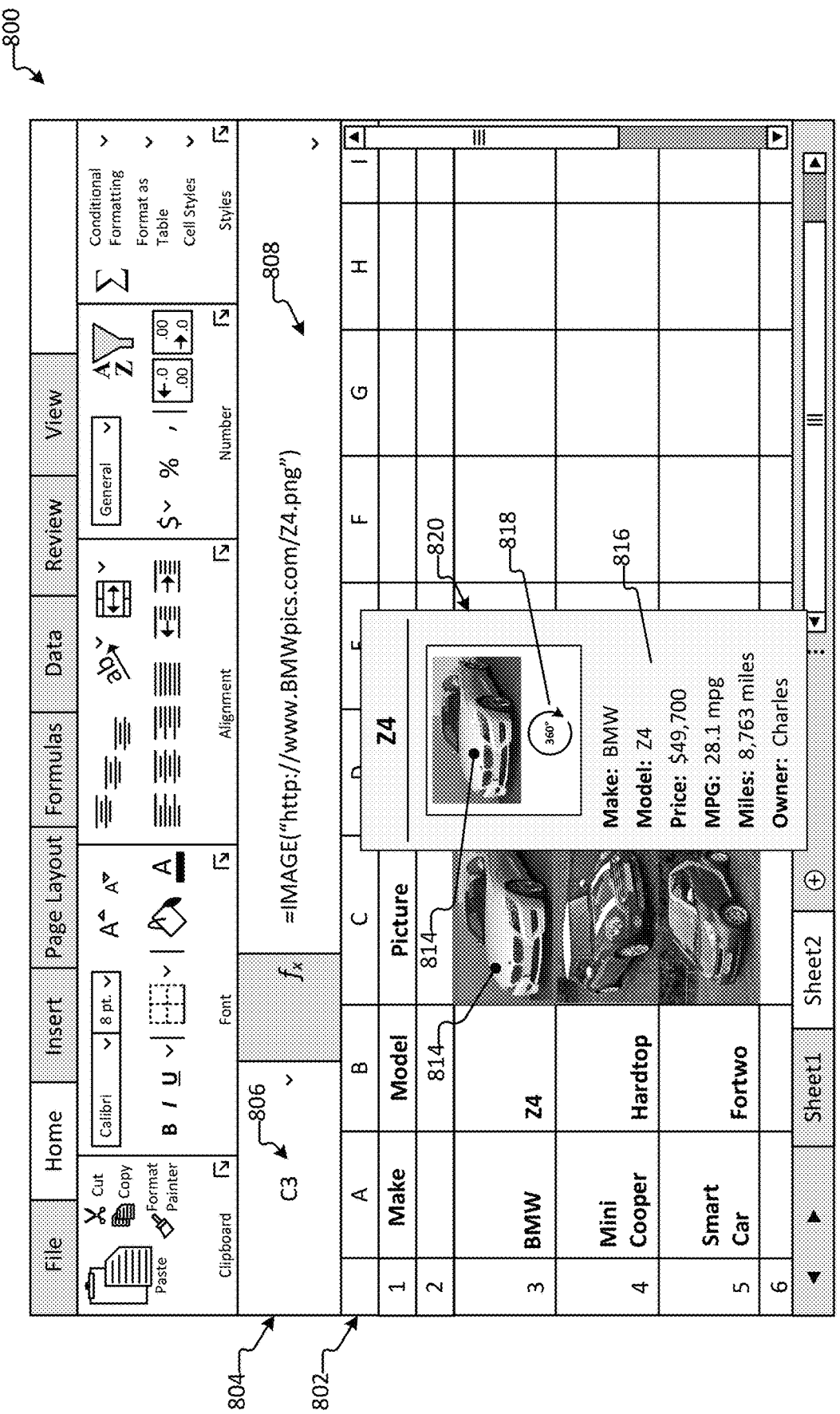
FIG. 8C illustrates an interface showing one or more images and additional data associated with one or more cells of a spreadsheet, according to a third example embodiment.

FIG. 8C illustrates an interface showing one or more images and additional data associated with one or more cells of a spreadsheet, according to a third example embodiment.

As illustrated, an interface 800 of a spreadsheet application is provided. Interface 800 includes a spreadsheet 802 and a navigation ribbon 804, including a cell identifier 806 and a formula bar 808. As further illustrated, cell C3 is selected, as indicated by thickened and/or colored outlining of the cell border of cell C3. However, selection of a cell may be indicated by any suitable means, such as highlighting, shading, perceived three-dimensional enlargement, and the like. As shown, a cell identifier 806 (e.g., "C3") for the selected cell is displayed in navigation ribbon 804. Additionally, formula bar 808 displays a function calling a file locator (e.g., =IMAGE("http://www.BMWpics.com/Z4.png")) for the image (i.e., image 814) displayed within cell C3.

In this case, additional data 816 is not displayed in the same cell as image 814. Rather, additional data 816 is displayed in a popup window 820. For example, in response to selecting cell C3 (e.g., by right click, hover over, etc.), popup window 820 may be displayed. Popup window 820 displays image 814, along with additional data 816, in an organized and stylized layout. For instance, popup window 820 includes a formatted header (e.g., make of the automobile, "Z4"), image 814 displayed in an interactive insert with view control 818 (e.g., allowing for 360° views of the automobile) and additional data 816, including data descriptors for each piece of information. In this regard, popup window 820 provides a user-friendly interface (e.g., organized and stylized) for viewing additional data associated with image 814 upon user selection.

As should be appreciated, the various devices, components, etc., described with respect to FIG. 8C are not intended to limit the systems and methods to the particular components described. Accordingly, additional topology configurations may be used to practice the methods and systems herein and/or some components described may be excluded without departing from the methods and systems disclosed herein.

Figure 9:
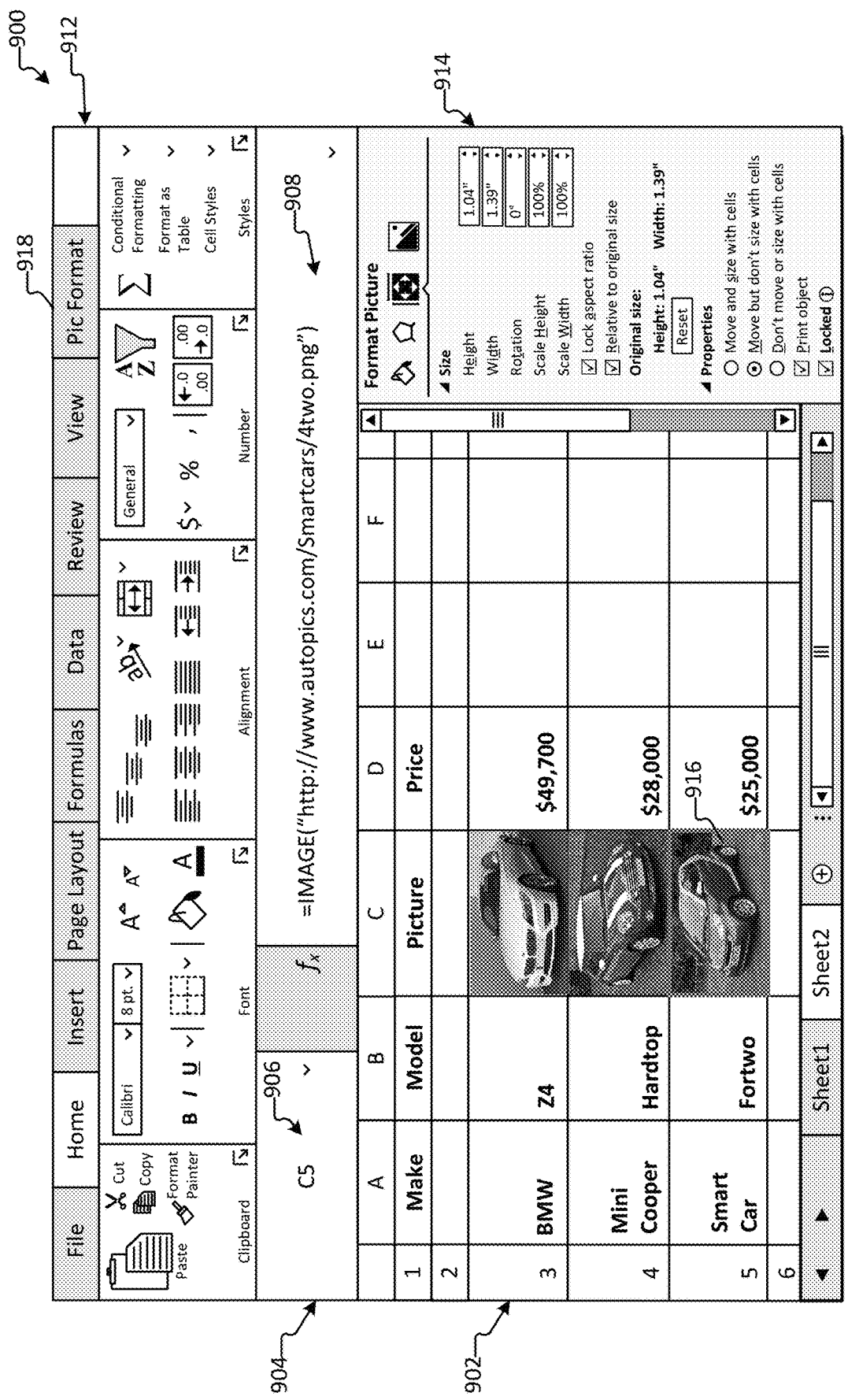
FIG. 9 illustrates an interface showing a formatting toolbar for manipulating one or more attributes of an image associated with a cell of a spreadsheet, according to an example embodiment.

FIG. 9 illustrates an interface showing a formatting toolbar for manipulating one or more attributes of an image associated with a cell of a spreadsheet, according to an example embodiment.

As illustrated, an interface 900 of a spreadsheet application is provided. Interface 900 includes a spreadsheet 902 and a navigation ribbon 904, including a cell identifier 906 and a formula bar 908. Interface 900 further includes a plurality of tabs 912 for accessing various aspects and operations of the spreadsheet application. As further illustrated, cell C5 is selected, as indicated by thickened and/or colored outlining of the cell border of cell C5. However, selection of a cell may be indicated by any suitable means, such as highlighting, shading, perceived three-dimensional enlargement, and the like. As shown, cell identifier 906 (e.g., "C5") for the selected cell is displayed in navigation ribbon 904. Additionally, formula bar 908 displays a function calling a file locator (e.g., =IMAGE("http://www.autopics.com/Smartcars/4two.png")) for an image (i.e., image 916) displayed within cell C5.

In some aspects, in response to selecting a cell that includes an associated image, a formatting toolbar 914 (or other interface) may be provided for manipulating the associated image. In other aspects, a formatting toolbar 914 may be provided in response to additional input (e.g., a right click) within a selected cell. Formatting toolbar 914 may include a number of tabs for viewing and manipulating various image attributes. For instance, a sizing tab may display image attributes directed to image size and orientation such as "height," "width," "rotation," "scale height," "scale width," "aspect ratio," as well as displaying an original size for the image. Additionally, other tabs associated with formatting toolbar 914 may provide image attributes, such as resolution, sharpness, luminance, color palette, opacity, transparency, author, creation date/time, and the like (not shown). In some cases, e.g., where both an image and additional data are associated with a single cell, formatting toolbar 914 may provide relative attributes between the image and the additional data, such as contrast, alignment, background opacity and/or translucency, and the like (not shown). As should be appreciated, any number of image attributes may be displayed in formatting toolbar 914, or any other suitable interface.

Formatting toolbar 914 may also expose one or more operations for manipulating image data and/or image attributes of an associated image. For example, input fields and/or UI controls (e.g., +/− controls) may be provided for one or more of the image attributes displayed by the formatting toolbar 914. In this regard, a user may directly input values for image attributes and/or adjust image attributes up or down based on user preference. For instance, with reference to image attributes displayed by the sizing tab above, values for "height," "width," "rotation," "scale height," and "scale width" may be adjusted by direct input and/or adjusted up or down using +/− controls. In some aspects, a preview (not shown) of an associated image may be provided by the formatting toolbar 914 such that changes to an image may be viewed prior to acceptance. Additionally or alternatively, a "reset" button may be provided to return adjusted parameters back to an original version of the image. As should be appreciated, the above examples of image attributes are not exhaustive and any image attribute may be surfaced and adjusted based on one or more exposed operations.

Formatting toolbar 914 may further provide UI controls for turning certain settings on or off. For instance, a selection may be provided for "locking aspect ratio" and a further selection may be provided for locking the aspect ratio "relative to an original size" of the image. With reference to sizing an image, additional selections may be provided to "move and size" the image with a cell, "move without sizing" the image with a cell, and "don't move or size" the image with a cell. Additional operations, such as printing an associated image or printing the image with additional data, may be provided. In further aspects, image data (e.g., an array of pixel values for rendering the image) may be surfaced and operations for manipulating the image data may be exposed to a user (not shown). In this way, image processing may be enabled for images within a spreadsheet. In some cases, some options may be disabled when certain settings are selected. For example, sizing options may be disabled when a "fit to cell" setting is selected. The above examples are provided for purposes of explanation only and should not be understood as limiting. Indeed, any of the operations described herein may be exposed via any suitable user interface for access to a user.

In other aspects of the present disclosure, rather than providing a formatting toolbar (as illustrated by FIG. 9), a formatting ribbon may be provided (not shown). For example, the formatting ribbon may be provided upon selection of a "Pic Format" tab 918. Options available in a formatting ribbon (not shown) associated with Pic Format tab 918 may include, for instance, moving an image from foreground to background, or background to foreground. Options may also including editing the image (e.g., touchup tools, etc.), adjusting colors, and/or adding artistic effects. Options for sizing the image, cropping the image, changing image orientation (e.g., vertically aligned to horizontally aligned), popping an image out of a cell, changing picture styles, changing picture borders, and/or changing picture layout may also be provided. Any number of options for enabling operations on images associated with cells may be provided in any suitable ribbon, tab, toolbar, and the like.

As should be appreciated, the various devices, components, etc., described with respect to FIG. 9 are not intended to limit the systems and methods to the particular components described. Accordingly, additional topology configurations may be used to practice the methods and systems herein and/or some components described may be excluded without departing from the methods and systems disclosed herein.

FIGS. 10-13 and the associated descriptions provide a discussion of a variety of operating environments in which aspects of the disclosure may be practiced. However, the devices and systems illustrated and discussed with respect to FIGS. 10-13 are for purposes of example and illustration and are not limiting of a vast number of computing device configurations that may be utilized for practicing aspects of the disclosure, as described herein.

Figure 10:
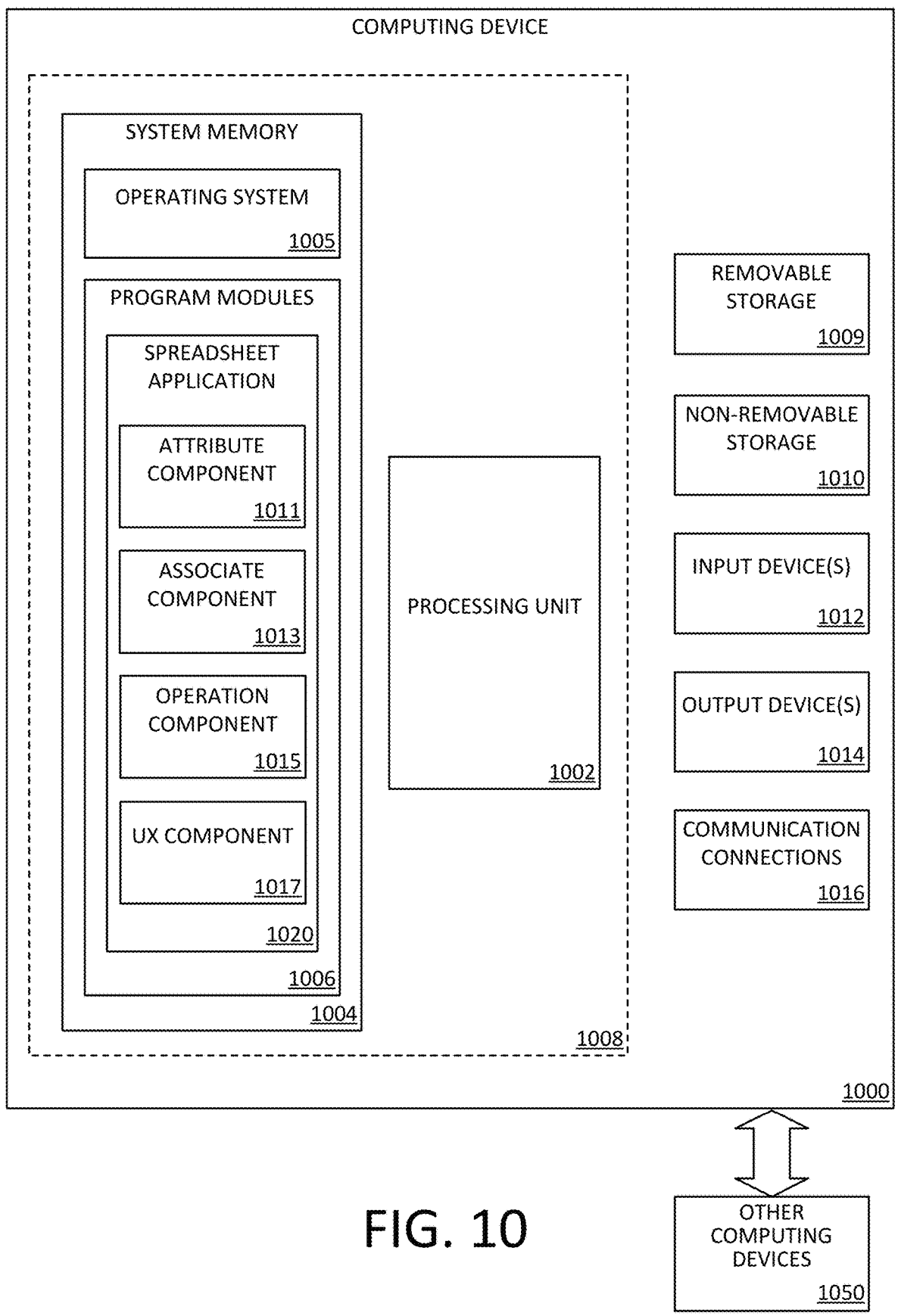
FIG. 10 is a block diagram illustrating example physical components of a computing device with which aspects of the disclosure may be practiced.

FIG. 10 is a block diagram illustrating physical components (e.g., hardware) of a computing device 1000 with which aspects of the disclosure may be practiced. The computing device components described below may have computer executable instructions for implementing a spreadsheet application 1020 on a computing device (e.g., server computing device 108 and/or client computing device 104), including computer executable instructions for spreadsheet application 1020 that can be executed to implement the methods disclosed herein. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 and one or more program modules 1006 suitable for running spreadsheet application 1020, such as one or more components with regard to FIG. 1 and, in particular, attribute component 1011 (e.g., corresponding to attribute component 116), associate component 1013 (e.g., including associate component 112, array component 114, and hybrid component 118), operation component 1015 (e.g., corresponding to operation component 120), and/or UX component 1017 (e.g., corresponding to UX component 122).

The operating system 1005, for example, may be suitable for controlling the operation of the computing device 1000. Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., spreadsheet application 1020) may perform processes including, but not limited to, the aspects, as described herein. Other program modules that may be used in accordance with aspects of the present disclosure, and in particular for associating images with cells of a spreadsheet, may include attribute component 1011, associate component 1013, operation component 1015, and/or UX component 1017, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
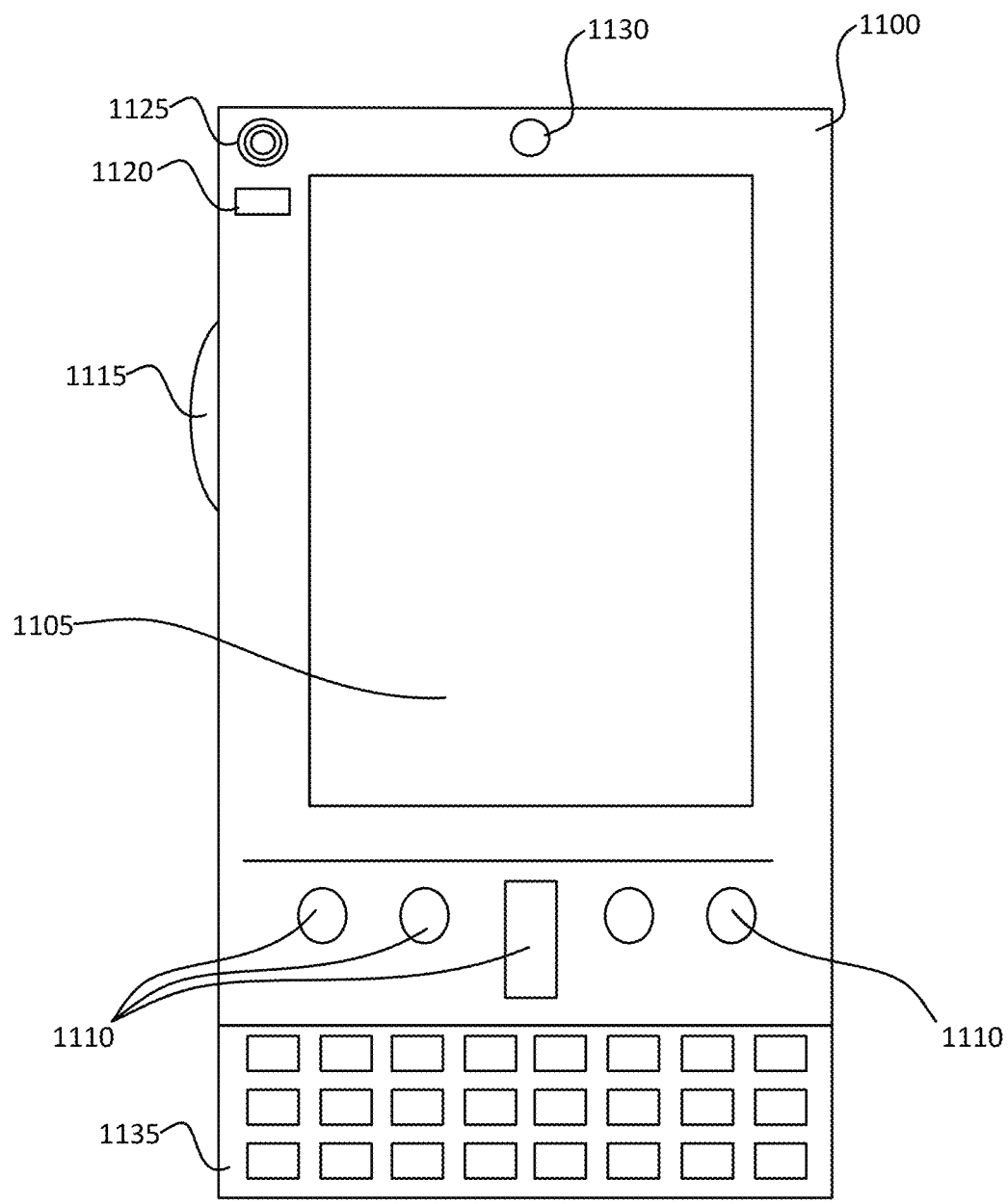
FIGS. 11A and 11B are simplified block diagrams of a mobile computing device with which aspects of the present disclosure may be practiced.
Figure 11B:
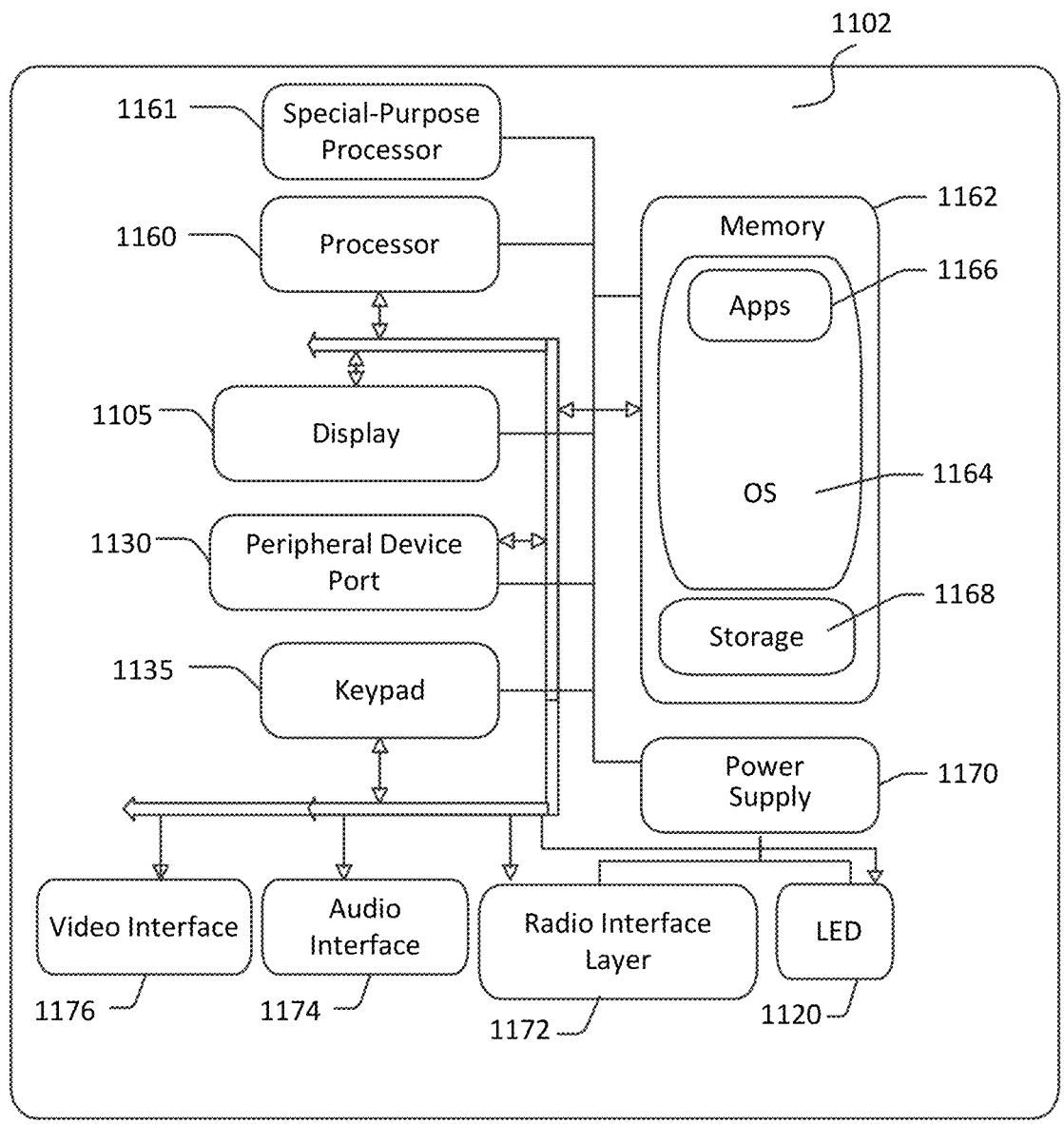

FIGS. 11A and 11B illustrate a mobile computing device 1100, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display). If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some embodiments. In yet another alternative embodiment, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various embodiments, the output elements include the display 1105 for showing a graphical user interface (GUI), a visual indicator 1120 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as email or other messages used by an email application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100, including the instructions for associating one or more images with one or more cells of a spreadsheet as described herein (e.g., attribute component, associate component, array component, hybrid component, operation component, and/or UX component, etc.).

The system 1102 has a power supply 1170, which may be implemented as one or more batteries. The power supply 1170 may further include an external power source, such as an AC adapter or a powered docking cradle that supplements or recharges the batteries. The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via an audio transducer 1125 (e.g., audio transducer 1125 illustrated in FIG. 11A). In the illustrated embodiment, the visual indicator 1120 is a light emitting diode (LED) and the audio transducer 1125 may be a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of peripheral device 1130 (e.g., on-board camera) to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

As should be appreciated, FIGS. 11A and 11B are described for purposes of illustrating the present methods and systems and are not intended to limit the disclosure to a particular sequence of steps or a particular combination of hardware or software components.

Figure 12:
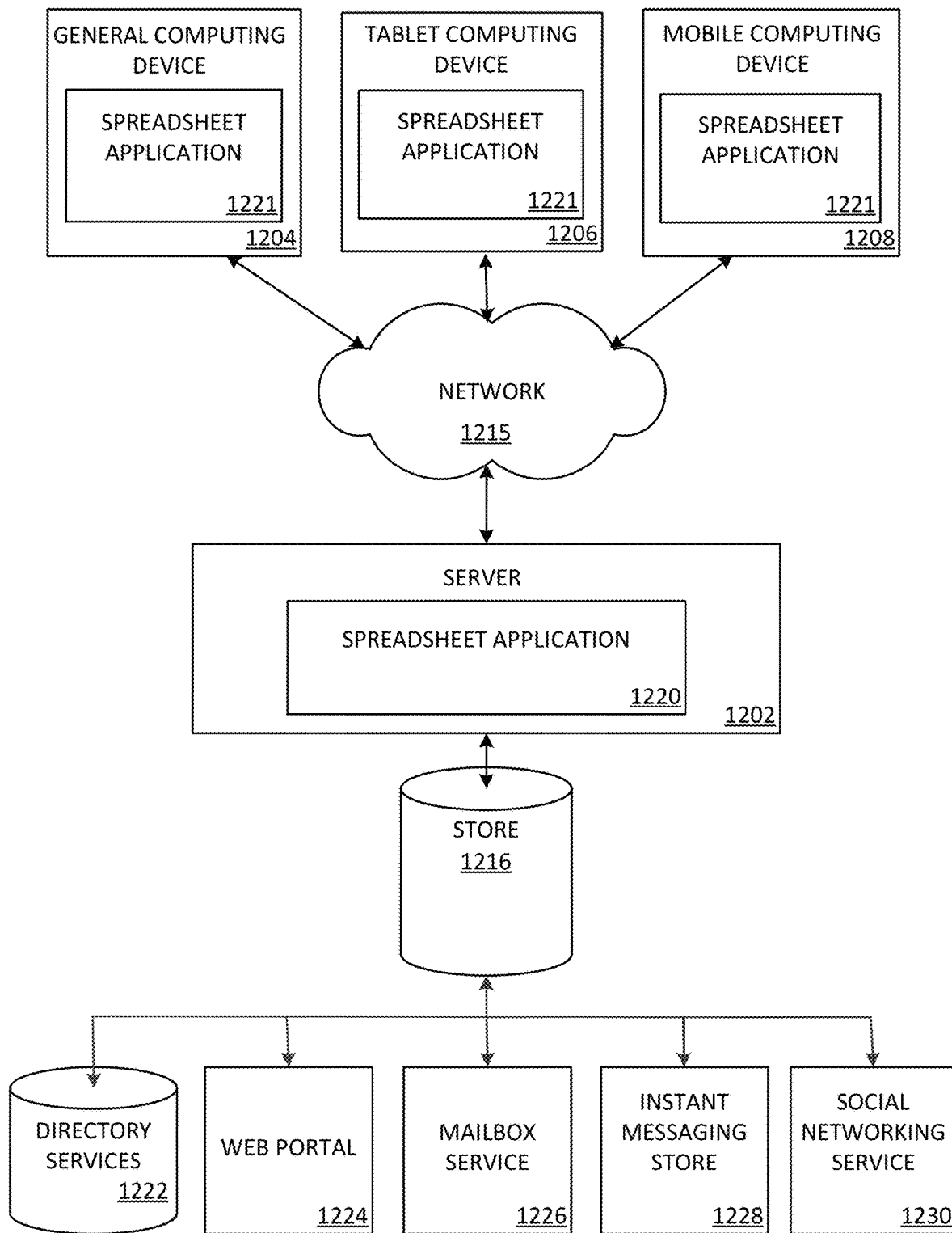
FIG. 12 is a simplified block diagram of a distributed computing system in which aspects of the present disclosure may be practiced.

FIG. 12 illustrates one aspect of the architecture of a system for processing data received at a computing system from a remote source, such as a general computing device 1204 (e.g., personal computer), tablet computing device 1206, or mobile computing device 1208, as described above. Content displayed at server device 1202 may be stored in different communication channels or other storage types. For example, various documents may be stored using a directory service 1222, a web portal 1224, a mailbox service 1226, an instant messaging store 1228, or a social networking service 1230. The spreadsheet application 1221 may be employed by a client that communicates with server device 1202, and/or the spreadsheet application 1220 may be employed by server device 1202. The server device 1202 may provide data to and from a client computing device such as a general computing device 1204, a tablet computing device 1206 and/or a mobile computing device 1208 (e.g., a smart phone) through a network 1215. By way of example, the computer system described above with respect to FIGS. 1-9 may be embodied in a general computing device 1204 (e.g., personal computer), a tablet computing device 1206 and/or a mobile computing device 1208 (e.g., a smart phone). Any of these embodiments of the computing devices may obtain content from the store 1216, in addition to receiving graphical data useable to either be pre-processed at a graphic-originating system or post-processed at a receiving computing system.

As should be appreciated, FIG. 12 is described for purposes of illustrating the present methods and systems and is not intended to limit the disclosure to a particular sequence of steps or a particular combination of hardware or software components.

Figure 13:
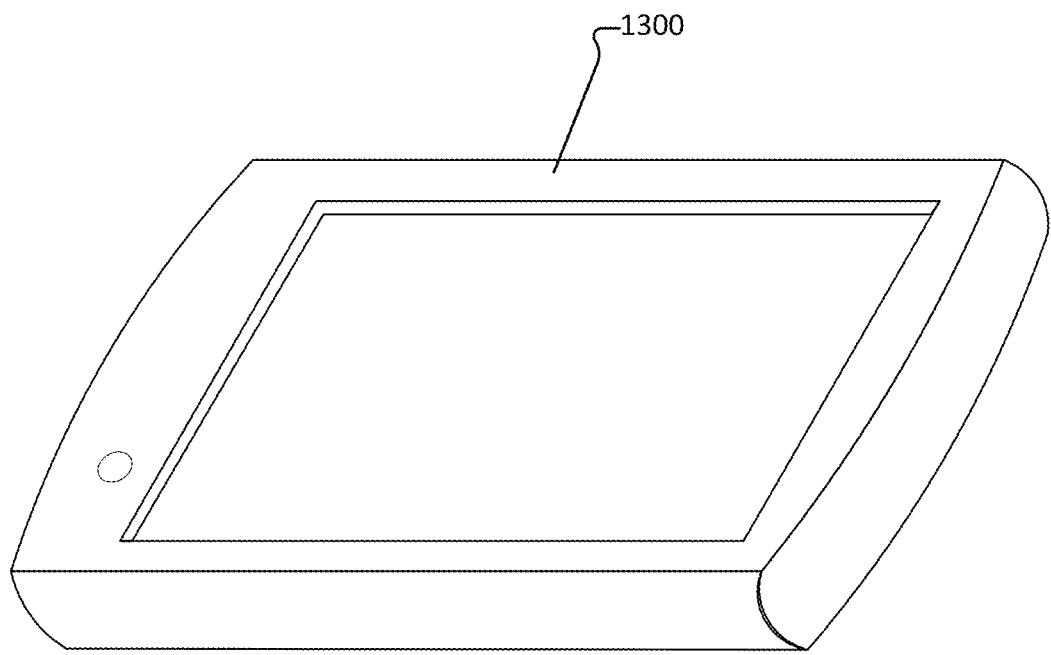
FIG. 13 illustrates a tablet computing device for executing one or more aspects of the present disclosure.

FIG. 13 illustrates an exemplary tablet computing device 1300 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 13 is described for purposes of illustrating the present methods and systems and is not intended to limit the disclosure to a particular sequence of steps or a particular combination of hardware or software components.

Figure 14:
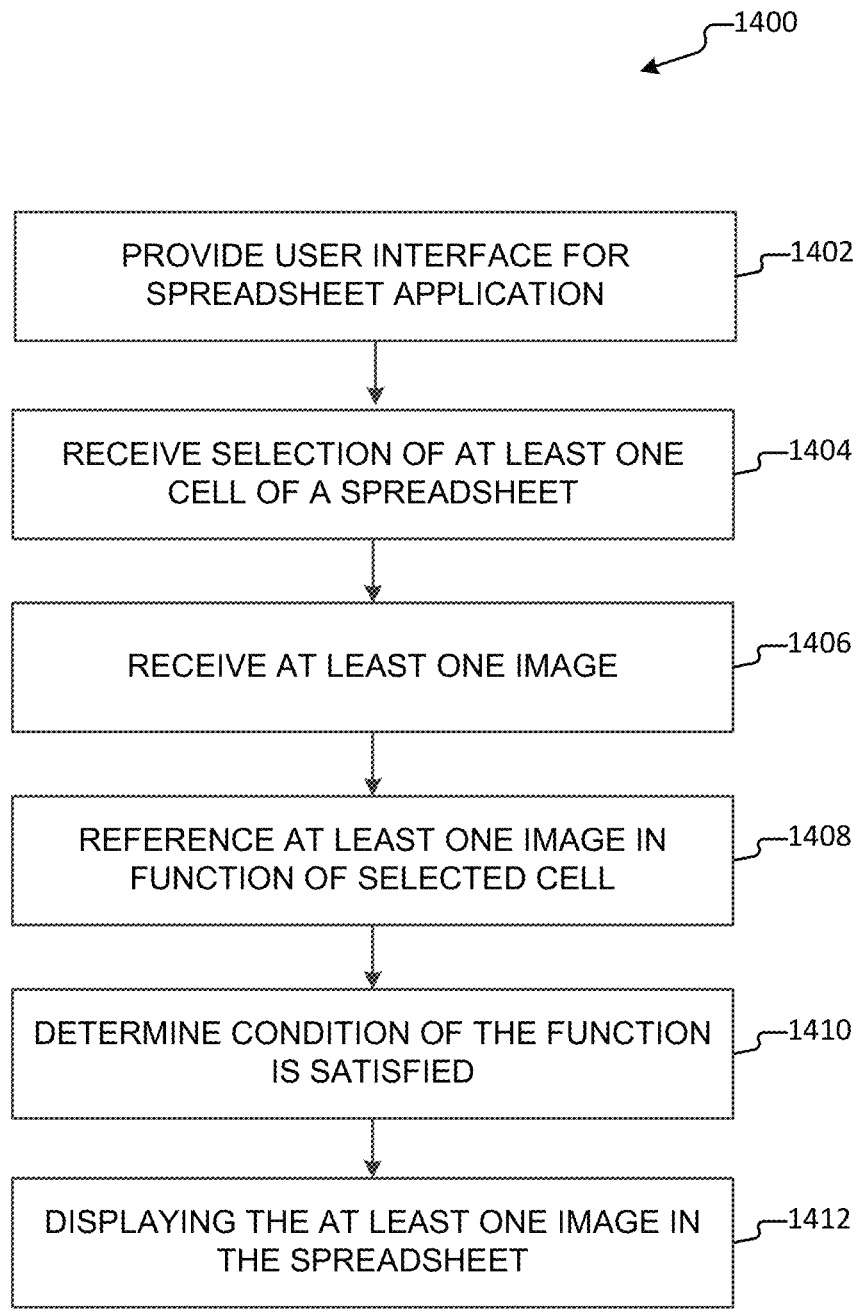
FIG. 14 illustrates a method for referencing one or more images in functions of one or more cells of a spreadsheet, according to an example embodiment.

FIG. 14 illustrates a method for referencing one or more images in functions of one or more cells of a spreadsheet, according to an example embodiment.

Method 1400 begins with provide interface operation 1402, where a spreadsheet application may provide (or cause to be provided) a user interface to a user. For example, a UX component (e.g., UX component 122) may facilitate a user experience (UX) by providing the user interface of a spreadsheet application (e.g., spreadsheet application 110) via a display. Selections and/or inputs may be received by the user interface based on gestures, touch, mouse movements, keyboard input, and the like. The user interface may operate in conjunction or communication with one or more other components of the spreadsheet application (e.g., associate component 112, array component 114, attribute component 116, hybrid component 118, and operation component 120) to reference at least one image in a function of at least one cell of the spreadsheet.

At select cell operation 1404, at least one cell of a spreadsheet may be selected, either automatically (e.g., based on a function) or by user selection. That is, in some aspects, operations may call (or select) a cell without requiring user input, e.g., operations such as 'data refresh,' 'import from such and such data source,' 'copy paste,' etc. In other aspects, cells may be selected by highlighting or otherwise identifying the cell or range of cells using a gesture, touch, mouse click, keyboard input, and the like.

At receive image operation 1406, at least one image may be received for association with the at least one cell, either automatically (e.g., based on a function) or by user selection. In some aspects, in response to a selection of a cell (or a range of cells), a menu may be provided for inserting or associating various objects (including images) with the selected cell (or range of cells). For example, a user may take an image (e.g., via a mobile device) for association with the selected cell. Alternatively, a user may manually enter a cell locator for the at least one image into a function associated with the selected cell. Alternatively, a user may copy and paste the image into the selected cell and/or drag and drop the image into a selected cell. As should be appreciated, the user interface may receive the at least one image by any suitable means.

At reference image operation 1408, the image may be referenced in a function associated with the selected cell. Reference image operation 1408 may be performed by an associate component (e.g., associate component 112) of a spreadsheet application (e.g., spreadsheet application 110). For example, the image may be referenced in the selected cell by entering a URL for the image within a function, e.g., fx=IMAGE("C:\Pictures\elephant1.jpeg") or fx=IMAGE ("http://www.mattspics.com/weather/rainyday.png")).

At determine operation 1410, it may be determined that a condition of the function is satisfied. For instance, the function may specify that "when revenue hits 'X,' display referenced image as background for the cell." In this case, when revenue hits "X" the condition is satisfied. As should be appreciated, any number of conditions may be included in a function and may be satisfied by any suitable means.

At display operation 1412, the image may be displayed in the spreadsheet. In some cases, the at least one image may be displayed in the at least one cell. In other cases, the image may not be displayed in the least one cell but may float over the grid. As should be appreciated, the at least one image may be displayed in any suitable way upon satisfaction of the condition.

As should be appreciated, operations 1402-1412 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
at least one processing unit; and
at least one memory storing computer executable instructions that, when executed by the at least one processing unit, cause the system to perform a method, the method comprising:
receiving a selection of a range of cells of a spreadsheet, wherein an image is displayed within each cell of the range of cells;
extracting a value for a parameter from the image in each cell, wherein the parameter is one of: a resolution, a contrast, a sharpness, a luminance, a color palette, an opacity, a transparency, or an array of pixel values;
causing display of a menu including options for sorting and filtering the range of cells based on the parameter;
in response to receiving a selection from the menu, performing one of sorting or filtering the range of cells based on the extracted value for the parameter of the image in each cell of the range of cells;
automatically performing an operation to adjust a first extracted value for the parameter of a first image in a first cell of the range of cells; and
in response to performing the operation, automatically adjusting display of the first image within the first cell based on the adjusted value for the parameter.

2. The system of claim 1, wherein the parameter comprises the array of pixel values.

3. The system of claim 2, wherein the extracted value for the array of pixel values comprises one or more of:
RGB color space information;
RGBA color space information; or
YUV color space information.

4. The system of claim 1, further comprising:
providing a user interface (UI) for viewing and manipulating the extracted value for the parameter.

5. The system of claim 1, wherein the parameter comprises opacity.

6. The system of claim 1, wherein the parameter comprises the color palette.

7. The system of claim 2, further comprising:
providing a user interface (UI) for viewing and manipulating the array of pixel values.

8. The system of claim 6, further comprising:
providing a user interface (UI) for viewing and manipulating the color palette.

9. The system of claim 1, further comprising:
performing a second operation, wherein the second operation comprises:
fitting a second image to a size of a second cell; and
resizing the second image when the second cell is resized.

10. The system of claim 1, further comprising:
receiving additional data;
creating a compound data type including the additional data and a third image of a third cell of the range of cells; and
associating the compound data type with the third cell.

11. A method for performing operations on a range of cells within a spreadsheet, the method comprising:
receiving a selection of a range of cells within a spreadsheet, wherein each cell of the range of cells is associated with an image;
extracting a value for a parameter of the image in each cell of the range of cells, wherein the parameter is one of: a contrast, a sharpness, a luminance, a color palette, an opacity, a transparency, or an array of pixel values;
causing display of a menu including a plurality of options, wherein each option is associated with performing an operation based at least in part on the extracted value; and
in response to receiving a first selection from the menu, performing a first operation on the extracted value of the image in each cell of the range of cells to adjust at least one of the contrast, the sharpness, the luminance, the color palette, the opacity, the transparency, or the array of pixel values for the image in each cell of the range of cells.

12. The method of claim 11, wherein the parameter is luminance.

13. The method of claim 11, wherein the parameter is transparency.

14. The method of claim 11, further comprising:
in response to receiving a second selection from the menu, performing a second operation, wherein the second operation comprises one of: sorting or filtering the range of cells based at least in part on the adjusted value for the parameter of the image in each cell of the range of cells.

15. The method of claim 11, further comprising:
in response to receiving a second selection from the menu, performing a second operation, wherein the second operation comprises performing conditional formatting on the range of cells based at least in part on the adjusted value for the parameter of the image in each cell of the range of cells.

16. The method of claim 15, wherein the conditional formatting comprises:
displaying a heat map over the range of cells, wherein the heat map is based at least in part on the adjusted value for the parameter of the image in each cell of the range of cells.

17. The method of claim 11, further comprising:
surfacing one or more parameters for each image in each cell of the range of cells in a user interface; and
exposing one or more operations for manipulating the one or more parameters in the user interface.

18. The method of claim 11, further comprising:

in response to performing the first operation on the extracted value of the image in each cell of the range of cells, reordering one or more cells within the range of cells; and moving each image that is associated with a reordered cell.

19. The method of claim 11, further comprising:

performing a second operation automatically upon satisfaction of a condition.

20. A computer-readable storage medium storing computer executable instructions that, when executed by at least one processing unit, cause a computing device to:

receive a selection of at least one cell of a spreadsheet, wherein at least one image is displayed within the at least one cell;

extract a value for one of a contrast, a sharpness, a luminance, a color palette, an opacity, a transparency, or an array of pixel values for the at least one image;

cause display of a user interface (UI) element for displaying the extracted value of the at least one image;

in response to receiving an indication in the UI element, perform a first operation to adjust the extracted value for one of the contrast, the sharpness, the luminance, the color palette, the opacity, the transparency, or the array of pixel values for the at least one image to form at least one adjusted value; and in response to performing the first operation, automatically adjust display of the at least one image within the at least one cell based on the at least one adjusted parameter.

21. The computer-readable storage medium of claim 20, wherein a plurality of images are associated with the at least one cell, the computer executable instructions further causing the computing device to:

perform a second operation, wherein the second operation comprises one of:

inserting an image into the plurality of images;

deleting an image from the plurality of images; or editing an image of the plurality of images.

* * * * *